US005796867A

United States Patent [19]

Chen et al.

[11] Patent Number: 5,796,867
[45] Date of Patent: Aug. 18, 1998

[54] STROKE-NUMBER-FREE AND STROKE-ORDER-FREE ON-LINE CHINESE CHARACTER RECOGNITION METHOD

[75] Inventors: Ju-Wei Chen; Suh-Yin Lee, both of Hsinchu, Taiwan

[73] Assignee: Industrial Technology Research Institute, Hsinchu, Taiwan

[21] Appl. No.: 662,861

[22] Filed: Jun. 12, 1996

[51] Int. Cl.$^6$ .............................. G06K 9/00; G06K 9/64; G06K 9/68

[52] U.S. Cl. .............................. 382/187; 382/217

[58] Field of Search .............................. 382/185, 186, 382/187, 201, 202, 203, 209, 217, 218, 286; 395/10, 11, 50, 54, 60; 704/8, 10; 707/104

[56] References Cited

U.S. PATENT DOCUMENTS

| 4,689,743 | 8/1987 | Chiu | 341/20 |
| 4,718,102 | 1/1988 | Crane et al. | 382/185 |
| 5,212,769 | 5/1993 | Pong | 345/467 |

Primary Examiner—Michael Razavi
Assistant Examiner—Ha Tran Nguyen
Attorney, Agent, or Firm—W. Wayne Liauh

[57] ABSTRACT

A stroke-order-free and stroke-number-free method for the on-line recognition of Chinese characters comprising the steps of: (a) inputting a handwritten input script on an on-line basis, (b) preprocessing the input script to reduce a number of possible matching template characters; (c) performing basic stroke recognition using a database of basic strokes to identify all possible basic strokes contained in the handwritten input script; (d) performing stroke correspondence using a database of stroke correspondence rules to find matching strokes in template characters for the strokes contained in the handwritten input script; and (e) performing computation of discrimination functions using a database of character patterns and a database of spatial relationships between strokes of characters to find one or more template characters with minimum error. Some of the key features of the method include: (a) the strokes recognized during the stroke correspondence are expanded to include fore strokes, back strokes, and points, in which the fore strokes are strokes that actually appear in a character, the back strokes are fictitious strokes provided to allow for stroke connections that should not appear, and the points are provided to allow for truncated back strokes in the input script; and (b) each stroke correspondence rule contains a specific set of stroke information including (i) allowed stroke types, (ii) at least one geometric feature measure, and (iii) criterion for applying the geometric feature measure; the geometric feature measure is a geometrically related characteristic measure, which can be x or y coordinates, length, or distance, associated with a particular stroke, to facilitate stroke recognition. In a preferred embodiment, eight types of stroke correspondences are allowed:(a) fore→fore, (2) back→back, (3) back→fore, (4) back→point, (5) back→null, (6) null→back, (7) fore→null, and (8) null→fore.

18 Claims, 10 Drawing Sheets

Segment order: α -> β -> γ -> δ.

Basic strokes:

| Stroke no. | Shape | String | Stroke type |
|---|---|---|---|
| 1 | — | <α> | 0 |
| 2 | — | <β> | 0 |
| 3 | — | <γ> | 2 |
| 4 | — | <δ> | 0 |

Segment order: a -> b -> c -> d -> e.

Possible basic strokes:

| Stroke no. | Shape | String | Stroke type |
|---|---|---|---|
| 1 | ∠ | <a, b, c> | 10 |
| 2 | ⌐ | <a, b> | 6 |
| 3 | \ | <b, c> | 7 |
| 4 | \| | <a> | 0 |
| 5 | \ | <b> | 1 |
| 6 | \| | <c> | 0 |
| 7 | — | <d> | 2 |
| 8 | \| | <e> | 0 |

Mapping:

$\alpha \rightarrow a$
$(\alpha, \beta) \rightarrow b$
$\beta \rightarrow c$
$(\beta, \gamma) \rightarrow (c, d)$
$\gamma \rightarrow d$
$(\gamma, \delta) \rightarrow (d, e)$
$\delta \rightarrow e$ Segment order: a' -> b' -> c' -> d' -> e' -> f'.

Possible basic strokes:

| Stroke no. | Shape | String | Stroke type |
|---|---|---|---|
| 1 | ⊐ | <a', b', c'> | 6 |
| 2 | N | <d', e', f'> | 10 |
| 3 | ⌐ | <a', b'> | 6 |
| 4 | ⊐ | <b', c'> | 9 |
| 5 | ∧ | <d', e'> | 6 |
| 6 | ∨ | <e', f'> | 7 |
| 7 | \ | <a'> | 0 |
| 8 | — | <b'> | 2 |
| 9 | \| | <d'> | 0 |
| 10 | \ | <e'> | 1 |
| 11 | — | <f'> | 0 |

Mapping:
α -> a'
(α, γ) -> intersection point of a' and b'
γ -> b'
(γ, β) -> c'
β -> d'
(β, δ) -> e'
δ -> f'

(1) Rule of stroke α : the stroke with stroke type 0 or 3, and its center point with the minimum Euclidean to the left-top corner point of the character.

(2) Rule of stroke γ : the stroke with stroke type 2 and the top boundary of its MBR with the maximum y coordinate.

(3) Rule of stroke δ : the stroke with stroke type 0 or 4, and its center point with the minimum Euclidean to the left-bottom corner point of the character.

(4) Rule of stroke β : the stroke with stroke type 0 and the top boundary of its MBR with the maximum y coordinate.

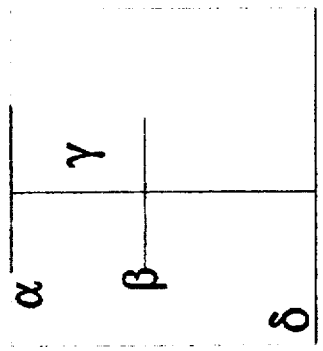

Fig. 3a

Steps of stroke correspondence:

| Rule no. | Mapping | Remaining pattern |
|---|---|---|
| (1) | α → a |  |
| (2) | γ → d |  |
| (3) | δ → e |  |
| (4) | β → c |  |
|  | (α, β) → b |  |

Steps of stroke correspondence:

| Rule no. | Mapping | Remaining pattern |
|---|---|---|
| (1) | α → a' | |
| (2) | γ → b' | |
| (3) | δ → f' | |
| (4) | β → d' | |
| | (γ, β) → c' | |
| | (β, δ) → e' | |

| Rule number | Stk label | Rule type | Stroke types | Geometric measures |
|---|---|---|---|---|
| (1) | α | R2 | 6 | F25 S1 C2, F7 S0 |
| (2) | β | R1 | 0, 1, 2, 3 | F25 S1 |
| (3) | γ | R1 | 0, 1, 2, 3 | F20 S0 |
| (4) | δ | R1 | 6 | F5 S0 |
| (5) | ε | R1 | 0, 1, 2, 3 | F25 S1 |
| (6) | η | R1 | 0, 1, 2, 3 | F6 S1 |
| | | | | F6 S0 |

STROKE-NUMBER-FREE AND STROKE-ORDER-FREE ON-LINE CHINESE CHARACTER RECOGNITION METHOD

FIELD OF THE INVENTION

The present invention relates to an improved on-line Chinese character recognition method without constraints on either the stroke number, the stroke order, or both. More specifically, the present invention relates to a stroke-number-free and stroke-order-free on-line handwritten Chinese character recognition method which is free from the constraints of either the stroke number, the stroke order, or both, of the input script to be recognized, so as to accommodate the wide variations of handwritten Chinese characters that have been accrued over the years.

BACKGROUND OF THE INVENTION

Recently, pen-based approach has attracted great attention in providing human-computer interfaces, especially as an input means. The pen-based approach is similar to the traditional way of using a pen and paper, by which characters or commands are entered into the computer by writing. This approach is particularly appealing for use with Chinese language-based applications because the Chinese language contains a very large number of character categories, and it is very cumbersome to enter Chinese characters via a key board. One of the key elements in providing a pen-based system for Chinese language-based computer applications is to develop an accurate and reliable on-line handwritten Chinese character recognition (OLCCR) method.

One of the major problems in the implementation of an on-line Chinese character recognition system is that there are multitudinous categories of Chinese characters, some with very complicated structures, and that there exist very wide variations in each Chinese character. Chinese characters may be written with large variations in the stroke order, stroke number, as well as shape distortions, and are still readily recognizable by the human eyes. Most of the character recognition methods for the Chinese characters have constraints on the stroke order and/or the stroke number imposed on them, in order to achieve high recognition accuracy on a real-time basis. It is desirable to develop Chinese character recognition methods that can relax or eliminate these constraints.

Wakahara and Umeda proposed a selective stroke linkage method for recognizing Japanese/Chinese characters. This method relieved the constraint on the stroke number; however, the constrain on stroke order still exists with regard to connected strokes. When a hand-written character shows significant pattern distortions, this method often fails to determine the correct stroke correspondences. Subsequently, they also proposed a method of stroke linage rules, based on which possible cursive patterns are generated as the reference patterns for character matching. Each character category may contain more than one cursive pattern; this could cause a substantial increase in the computational time required.

Lin et al. proposed a model-based character recognition approach, using stroke-based features of the characters. They constructed a deviation-expansion model to represent the reference pattern of a character. The reference pattern contains hypothetical knowledge of writing variations. During pattern matching, a matching tree is constructed by combining the knowledge of the reference pattern and input pattern (i.e., input script) together, and the dynamic programming matching (DP) technique and A* algorithm are adapted to obtain the recognition result. In this method, if certain deviations of the handwritten characters are not included in the hypothetical knowledge of writing variations, recognition errors would result. In the worst case, the character matching process can require exponential-time complexity.

One approach to cope with the variations in stroke order is to use the stroke re-ordering strategy. In this approach, the strokes of an input character are rearranged into a pre-determined order based on certain features or pre-defined rules. Ye et al. disclosed a method by which the stroke order of an input character is rearranged by sorting the input strokes according the stroke types. Hidal et al. disclosed a method by which the slants and locations of the strokes are utilized to obtain a stroke correspondence between the input script and a pre-defined template. The stroke re-ordering can be acquired from the result of stroke correspondence. However, due to significant variations in handwritings, there might be deformations in the stroke shape and the connected strokes may be mistakenly recognized as corresponding to another type of stroke or rejected. But most importantly, results from the technique of stroke re-ordering typically are not stable for handwritten characters with potentially large variations.

Ishii, by analyzing the stability of structural relationships among the strokes in handwritten Chinese characters, proposed a method which utilized representative points of strokes for decomposing radical(s) from a character and re-ordering the input strokes. In this method, each character is assigned a protocol for stroke re-ordering which was derived from handwritten samples. The resultant re-order strokes are more stable than the previous methods of re-ordering. Shiau et al. extended the types of representative points and applied Ishii's method to 5,401 character categories. Both methods, however, contain a constraint on fixed stroke numbers.

To cope with the variations in both the stroke number and stroke order, Liu and Tai also adopted the stroke re-ordering strategy. They utilized line segments as character primitives, and proposed a method which involved general rules for 17 types of spatial relationships between any two line segments in the Chinese characters. The stroke re-ordering strategy proposed by Liu and Tai has the advantage that the space required to store the general re-ordering rules is typically substantially less than that required to store separate re-ordering rules for each character. However, the re-ordering strategy developed by Liu and Tai was found to be unstable, especially for those input characters with large structural distortions.

SUMMARY OF THE INVENTION

The primary object of the present invention is to develop an improved on-line method for recognizing handwritten Chinese characters. More specifically, the primary object of the present invention is to develop a novel approach which allows a stroke number- and stroke order-free method for on-line recognition of handwritten Chinese characters to be developed. The method developed in the present invention utilizes a rule-based approach without having constraints on either the stroke number or the stroke order.

Chinese characters are constructed based on a number of basic strokes according to certain structural rules. The present invention thus takes advantage of these structural rules for machine recognition. The method disclosed in the present invention is based, as a part thereof, on the standard patterns of the Chinese characters. To accommodate the handwritten characters, each character "category" in the reference database associated with the character recognition system disclosed in the present invention further includes several handwriting variations (of the same character), such as shape distortion and variations in stroke order and stroke number. The character recognition system also contains certain rules which are predefined in a reference database to effectuate the stroke correspondence (i.e., stroke recognition) between a template character and the input character script to avoid the need for repeating combinatorial exhaustion. For each stroke contained in a template character, one rule is utilized to find its possible matching stroke in the input script.

In the method disclosed in the present invention, basic stroke types and the so-called "geometric feature measures" of strokes are utilized in the design of stroke correspondence rules. When an input character script is entered and to be recognized, all possible strokes in the input character are identified (i.e., isolated) before the invocation of the stroke correspondence rules. Thus, in the method disclosed in the present invention, a constituent stroke is selected, one at a time, from the input script. The selected input stroke is matched against the template strokes, using the stroke correspondence rule for each template stroke, until a matching stroke, if it exists, is found. The connected strokes are segmented, i.e., disconnected, according to their basic stroke types, and the geometric feature measures of the strokes become the invariant features of the strokes in 2-dimensional handwritten characters. By using these invariant features, which are based on the geometric feature measures of the strokes, handwritten characters with wide variations in both the stroke number and stroke order can be successfully recognized. In implementing the method disclosed in the present invention, the computation time required for finding the stroke correspondence between a template character and an input script is in the order of O(n), where n is the stroke number of the template. This is a very distinct advantage over most of the methods disclosed in the prior art, which typically requires a computation time that increases exponentially with the number of template characters. The templates selected during the preliminary classification are taken to match against the input script pattern, stroke by stroke, in the manner described above. The input character is finally identified by using suitable discrimination functions as the template character with the minimum distance (distance is a measure of error between the template character and the input script). When there are more than one template with the same minimum distance, the input character is further identified by traversing a logical tree composed of special structural features.

The method disclosed in the present invention comprises a recognition architecture illustrated in FIG. 1. The recognition architecture includes a set of processing modules and an accompanying database. Each handwritten input script character is first processed using the preprocessing stage. After the basic strokes are identified, the estimated range of possible stroke number and the statistical features of the input character are utilized in the preliminary classification to reduce the number of template characters to be processed in the later stage of structural analysis as disclosed in the present invention. The preprocessing stage is documented in the prior art, and thus will not be elaborated. The processing steps of structural analysis include: (1) stroke correspondence, (2) computation of discrimination functions, and (3) detail recognition. Chinese characters can be written (handwritten or printed) in various "styles" (a style can be considered as equivalent to a "font"). The architecture described in FIG. 1 can be applied to recognize Chinese characters written in various styles. When the style of character to be recognized changes, only the correspondence rules in the reference database that are associated with the strokes need to be changed.

In a preferred embodiment of the present invention, the strokes of the Chinese characters are classified into 14 basic stroke types, as shown in Table 1. A stroke template database is constructed for the recognition system which contains collections of sampled "points" for each stroke obtained from a digitizing tablet using a standard template and several handwriting variations thereof. Each sampled point is described by a vector (x, y, f), wherein x and y are the coordinates of that point and f is a flag, which has a value of "on" or "off", to indicate whether the pen is pressed or lifted. An input stroke contains sequentially contiguous points all with "on" values and terminates at a point with the "off" value. The preprocessing steps include normalization, sampling, and line-segment approximation. Each stroke, or more specifically each basic stroke (i.e., isolated stroke), is represented by a set of string(s) for its underlying line segment(s) in the basic stroke database, which contains variations of the basic strokes to accommodate the handwriting variations in stroke shapes, etc. Each input stroke is approximated by a set of line segment(s) represented by a string, and is recognized by a string matching algorithm.

In the method disclosed in the present invention, before the determination of stroke correspondence, it is necessary to separate a connected stroke into individual basic strokes. This process is called "segmentation". All possible basic strokes existing in a cursive input stroke are recognized which constitute the candidates in the invocation of the stroke correspondence procedure. FIG. 2a illustrates the "standard pattern", and FIGS. 2b and 2c show two different "cursive patterns", respectively, of the character 主. The two cursive patterns shown in FIGS. 2b and 2c vary in both the stroke number and stroke connections relative to the standard pattern shown in FIG. 2a. FIG. 2a also shows the basic strokes of the standard pattern for the character 主. All the possible basic strokes that are contained in the cursive patterns are also shown in FIGS. 2b and 2c. The input cursive character shown in FIG. 2b contains three strokes (as described above, a stroke is considered as consisting of a collection of sequentially connected "on" points), which are composed, collectively, of eight possible basic strokes in a variety of combinations, and the input cursive character shown in FIG. 2c contains only one stroke, from which a total of 11 possible basic strokes can be independently extracted.

In the present invention, to handle the unique structural complexity of the Chinese characters, a Chinese character is considered to be represented by one or more "primitives", which are further classified into three types: fore strokes, back strokes, and points. Fore strokes are those strokes that actually appear in a character pattern (which can be either a template character or an input script). In the standard templates, the fore strokes should not be connected. However, in typical Chinese handwritings, the fore strokes are often connected by "pseudo segments"; these pseudo segments are called "back strokes" in the present invention, meaning that these strokes should not exist in the standard character. In a broader sense, the back strokes are provided in the present invention to allow for imaginary strokes connecting between fore strokes. When a connecting stroke exists as a result of hasty handwriting, a fore stroke may appear in the handwritten script which would correspond to a back stroke in template (i.e., the stroke does not exist in the template). This is shown as stroke "b" shown in FIG. 2b. On the other hand, a back stroke (the imaginary stroke connecting two fore strokes) may also be "simplified" and thus degenerated into an intersection "point", such as the intersection points of a' and b' shown in FIG. 2c. By these designations, the primitives in the character representation can be classified into the three types of fore strokes, back strokes, and points. The designation of these three primitives disclosed in the present invention greatly enhances the efficiency of the character recognition process, and allows clear explanations to be conveyed to the end-users.

The task of stroke matching involves finding a binary relation (designated as "q") between the set of template primitives and the set of input primitives. The binary relation q for stroke matching from set X to set Y is defined as follows:

$$q:X \rightarrow Y$$

where X denotes the set of primitives of a template character, and Y denotes the set of primitives of an input character. For any element $x_i \epsilon X$, if the mapped image (i.e., a matched primitive) $y_i (y_i = q(x_i), y_i \epsilon Y)$ exists, then there exists only one such image $y_i$.

Among the fore strokes, back strokes and points defined in the present invention, there are eight possible types of matches, namely: (1) fore→fore, (2) back→back, (3) back→fore, (4) back→point, (5) back→null, (6) null→back, (7) fore→null, and (8) null→fore, where x→y indicates a matched pair, and fore represents a fore stroke primitive, back represents a back stroke primitive, point represents a point primitive, and null indicates no matched primitive. It should be noted that in this preferred embodiment, the point primitive only exists in the input script. Furthermore, a back primitive (i.e., an imaginary stroke) in the template can be corresponded to a fore stroke, a back stroke, a point in the input script, or no match. This illustrates the wide variations of Chinese handwritings.

The fore strokes of a standard pattern (i.e., a template pattern) are the essential primitives of a character and, generally speaking, they should always exist in the input handwritten patterns, especially for those long or major strokes. A standard pattern is described as a template in the reference database. When strokes are connected in the handwritten characters, back strokes in the templates may appear as fore strokes or may even be reduced to "points" in the input patterns (i.e., scripts). These variations are commonly observed in the handwritten Chinese characters, and thus are accommodated in the method of the present invention for character matching. During the matching process, an input script is matched against the templates of candidate characters selected during preliminary classification. For explaining in the process of the present invention, it can be considered that an input script is matched against a template of the input category, which contains possible variations of a character. The fore strokes in the template characters are first matched with the fore strokes in the input script. The back strokes in the template pattern are obtained by tracing the matched pairs following the input stroke order, which can be obtained as an "on-line" recognition process. A back stroke in the template character may be mapped to a back stroke, a point, or a fore stroke in the input script. FIG. 2b shows the stroke mapping between the standard template and an exemplary cursive pattern. In FIG. 2b, the matched pairs α→a, β→c, γ→d, and δ→e are the matched fore strokes. A back stroke (i, j) is identified between the two fore strokes "i" and "j". Thus, the back strokes (α, β), (β, γ), and (γ, δ) are identified after the above matched pairs of fore strokes are found. By tracing the matched pairs of the fore strokes following the input stroke order, the back strokes (α, β), (β, γ), and (γ, δ) can be mapped to b, (c, d), and (d, e), respectively. FIG. 2c shows another example of such mapping process. In the steps of priliminary identification just described, the back strokes are not contained in the reference template database, rather, they are derived from list of mapping pair of fore strokes. The required information used in such recognition is stored in the database of spatial relationships between strokes. This will be discussed in subsequent sections.

FIGS. 3a–3c illustrate the process of applying the stroke correspondence rule using the examples shown in FIGS. 2a–2c. FIG. 3a shows the stroke correspondence rules for the character 上. The stroke correspondence rules consist of (1) basic stroke types that are "allowed" (i.e., commonly encountered) in the handwriting, and (2) the geometric feature measure(s) of the strokes used in the stroke matching process. Each character category (which includes variations of a standard character) has a set of rules so as to accommodate a number of possible variations. The sequence of applying the rules coincides with the sequence of finding the matched pairs in a template. A handwritten input stroke may consist of one or more basic strokes due to stroke connections (i.e., connections between the basic strokes as a result of handwriting). These connected strokes in the input script are first segmented. The process of stroke correspondence is to find a possible corresponding stroke in the input script for each of the rules (strokes) in the template character. If a possible basic stroke in the input script is found to match with one rule, then this selected basic stroke is removed from the input pattern, and the next stroke correspondence rule is applied onto the remaining strokes of the input pattern until all the rules in the template are exhausted. It is quite likely that some rules in the template character may not find matched strokes in the input character. FIGS. 3b and 3c show the process of applying the stroke correspondence rules for the two cursive patterns in FIGS. 2b and 2c, respectively.

The present invention utilizes the geometric feature measures, which are geometrically related characteristic measures (which can be x and/or y coordinates, lengths, or associated distances) of the strokes, to establish the stroke correspondence rules for character recognition. Chinese characters contain two-dimensional arrangements of basic strokes based on predefined and recognizable geometric configurations. By using one or more of such geometrically related characteristic measures, the variations in stroke order of the handwritten characters can be accommodated in the method disclosed in the present invention.

In a preferred embodiment of the present invention, 27 types of geometric feature measures of strokes are utilized to establish the stroke correspondence rules. These geometric feature measures are listed in Table 2. Before applying the stroke correspondence rules, all possible basic strokes are sorted based on the 27 measures in an increasing order. The sorted sequence for each measure is recorded in an array. Each stroke correspondence rule would contain the information that the matching stroke must have a maximum or minimum value of certain types of geometric feature measures. The matching stroke can then be directly acquired from the array storing the sorted results.

These 27 types of geometric feature measures are summarized in Table 2 and are explained in more detailed descriptions that follow. First, each stroke is considered to be bounded by a minimum bounding rectangle (MBR). The x and y coordinates of the four boundaries and the center point of the MBR of a stroke are designated as geometric feature measures numbered 1 through 6, respectively, i.e., MBR_Xmin, MBR_Ymin, MBR_Xmax, MBR_Ymax, MBR_Xcenter, and MBR_Ycenter. The x and y coordinates of the starting point and end point of the strokes are designated as geometric feature measures numbered 7 through 10, i.e. Sx, Sy, Ex, Ey, respectively. These geometric feature measures are often adequate for relatively simple characters. For complicated characters, additional or auxiliary geometric feature measures can be provided to facilitate speedy and accurate stroke correspondence.

FIG. 4 shows the eight reference points of the bounding rectangle of a character. These eight reference points are: LT (left-top corner point of the rectangle), TC (top-center point of the rectangle), RT (right-top corner point of the rectangle), LC (left-center point of the rectangle), RC (right-center point of the rectangle), LB (left-bottom corner point of the rectangle), BC (bottom-center point of the rectangle), and RB (right-bottom corner point of the rectangle). From these eight reference points, 14 auxiliary geometric feature measures, numbered from 11 through 24, can be derived. They are defined as the Euclidean distances from the starting and end points of a stroke, and the center point of a stroke's MBR to these eight reference points, respectively. Additionally, the length of a stroke is considered as a geometric feature measure, numbered 25. Finally, the geometric feature measure numbered 26 is defined as the "city block" (or block distance) from the left-bottom corner point of a character to the left-bottom corner point of an individual stroke's MBR, and the geometric feature measure numbered 27 is defined as the city block from the left-bottom corner point of a character to the right-top corner point of that same stroke's MBR. Some, if not all, of these additional measures are useful for ensuring stable stroke correspondence for some complicated cases. As it will be discussed below, most of the stroke correspondence rules developed in the present invention require only one geometric feature measure. In other rules, two geometric feature measures are utilized.

After all the possible basic strokes in an input character are identified, the 27 geometric feature measures for each possible basic stroke are computed. All the possible basic strokes are respectively sorted based on the values of the geometric feature measures in an increasing order. During the stroke correspondence step, the matching stroke is selected from these sorted possible basic strokes. Therefore, the computation time required for performing stroke correspondence is in the order of O(n), where n is the number of strokes of the matched template.

In a preferred embodiment of the present invention, stroke correspondence rules are classified into two types: type one rules and type two rules, denoted as R1 and R2, respectively. Both types of rules also contain the information of the possible basic stroke types which are allowed (i.e., often encountered or expected) in the handwriting variations. By using basic stroke types, those strokes in the input script that are impossible as candidates based on stroke shapes are eliminated. The basic stroke information can also be used to dissect connected strokes into separate strokes. A type one rule utilizes one predefined geometric feature measure of strokes to find the matching stroke. In some cases, more information is required to find stroke matching. A type two rule utilizes two geometric feature measures to find the matching stroke. The first geometric feature measure is used to select candidate strokes from the input stroke. Then the second geometric feature measure is further utilized to determine the matching stroke from the candidate strokes.

The application of the stroke correspondence rules can be illustrated by FIGS. 5a and 5b. FIG. 5a shows a standard pattern (template) of character 汉, with its strokes identified and labeled. FIG. 5b lists the stroke correspondence rules. Each stroke correspondence rule contains the rule type, the basic stroke types allowed in considering handwriting variations, and the geometric feature measure(s) of the strokes to be used to find the matching stroke. In FIG. 5b, the geometric feature measure is denoted as Fi (1<i<27), where i is the geometric feature number (i.e., the type of geometric feature measure). For a template stroke, the matching stroke must have the minimum (denoted as S0) or maximum (denoted as S1) value of certain geometric feature measure Fi in the possible basic strokes of the input script. A type one rule utilizes one geometric feature measure denoted by (Fi, Sj) (1<i<27 and j=0 or 1). A type two rule, on the other hand, utilizes two geometric feature measures denoted by (Fi, Sj, Ck; Fi', Sj'), where the meanings of i, i', j, j' are similar to those defined for type one rules, and the value Ck indicates that k candidate strokes, of the basic stroke types allowed in the rule, have been selected from the remaining possible basic strokes of the input script using the first geometric feature measure. The second geometric feature measure is used to determine the matching strokes from the k candidate strokes. The order of applying the stroke correspondence is based on a predefined rule sequence. The rules of strokes α and β in FIG. 5b are taken as examples for explanation. The rule of stroke α belongs to type two, and stroke type 6 is allowed. Based on the first geometric feature measure, (which, in this case, is the stroke length), strokes α and δ are selected as the candidate stokes from FIG. 5a. Next, the matched stroke, with start point of minimum x coordinate (F7), is selected from the two candidate strokes. The handwritings of strokes β, γ, ε, and η in the character 汉, are very close to "written dots", or short strokes. A handwritten short stroke is usually unstable and the stroke type recognized often is not the correct (i.e., original) stroke. Therefore, a number of possible variations (in this case, stroke types 0, 1, 2, and 3) should be taken into consideration and are accommodated in the rule. The rule for stroke β belongs to type one. The only geometric feature measure is the Euclidean distance from the center point of the stroke's MBR to the left-top corner point of the character. From the remaining strokes with the allowed stroke types in the rule, the matched stroke is the stroke with the least value of the geometric feature measure.

After the stroke correspondence finds the matched strokes, the method disclosed in the present invention then utilizes the spatial relationships between strokes, as well as the information of lost strokes, superfluous stokes, and connected strokes to compute the character distance between a template character and an input script, for character discrimination. After the stroke correspondence between a template character and an input character script is accomplished, the matching relation between template strokes and input strokes is then considered to have been obtained. Based on the matching relation, input strokes can be re-ordered following the stroke order of the template character. For an input script, the spatial relationships between the strokes based on the template stroke order are used in character discrimination.

As discussed above, in the present invention, the matching relation between the template and input primitives is a binary relation q: X→Y, where X denotes the set of template primitives and Y denotes the set of primitives of the input script. In other words, one of the key elements in the stroke correspondence process is to exhaust the rules (i.e., stokes)

of the template character. When the input category is the same as the template category, the matching types of fore stroke→fore stroke and back stroke→back stroke are considered correct matchings for fore strokes and back strokes; the matching types of back→point and back→fore can exist in the case of connected strokes; the matching types of back→null and fore→null occur in the case of lost stroke(s); and the matching types of null→back and null→fore can occur in the case involving superfluous stroke(s).

The distance functions used for character discrimination are defined based on the matching type(s), and are explained below. For the matching type of fore→fore, the matched pairs of fore strokes can be re-ordered according to the stroke sequence in the template character. In the input script, the spatial relationships between the fore strokes i and i+1 are described by four vectors: ss(i, i+1), se(i, i+1), es(i, i+1), and ee(i, i+1). These vectors are defined as connecting between the starting point ("s") and the end point ("e"), from stroke i to stroke i+1, as illustrated in FIG. 6. In performing the computation, the directions are quantized to accommodate variations in the handwritings. Thus, function quant_8( ) is defined to quantize the directions of the vectors into eight direction codes. All the possible variations of spatial relationships between handwritten strokes i and i+1 are all accommodated in the reference database, and are denoted by four sets of eight-direction codes: SS(i, i+1), SE(i, i+1), ES(i, i+1), EE(i, i+1). For the matched pairs of fore→fore, the cost function ff_err_ss(i) is defined as:

$$ff\_err\_ss(i) = \left\{ \begin{array}{l} 0 \text{ if quant\_8}(ss(i, i+1)) \in SS(i, i+1) \\ 1 \text{ otherwise} \end{array} \right\}$$

The other cost functions ff_err_se(i), ff_err_es(i), ff_err_ee(i) are similarly defined (i.e., substituting ss(i, i+1) to appropriate vectors). Assuming that the template character has FM strokes, for the matched pairs of the type fore→fore, the distance function related to the spatial relationship between the fore strokes is defined as:

$$f_{ff}(X, Y) = \sum_{i=1}^{FM-1} (ff\_err\_ss(i) + ff\_err\_se(i) + ff\_err\_es(i) + ff\_err\_ee(i))$$

For the matched pairs of the type fore→null, the distance function is defined as:

$$f_{fn}(X, Y) = 5 \times T\_STK \times \sum_{i=1}^{FN} l_i/L_T$$

where FN is the number of matched pairs of the type fore→null, T_STK is the stroke number (i.e., number of strokes) of the template character, $l_i$ is the length of the fore stroke i, and $L_T$ is the summation of stroke lengths in the template. The error cost of one lost stroke is considered as having a weight of 5, which includes the error cost of one fore stroke and four vectors representing the spatial relationships between two contiguous strokes.

For the matched pairs of the type null→fore, the distance function is defined as:

$$f_{nf}(X, Y) = 5 \times I\_STK \times \sum_{j=1}^{NF} l_j/L_I$$

where NF is the number of matched pairs of the type null→fore, I_STK is the middle value of the estimated range of input stroke number, $l_j$ is the length of the fore stroke $j$, and $L_I$ is the total length of all the strokes in the input character.

The matched pairs of the type back→point occur in the case of connected strokes. The distance function is defined as:

$$f_{bp}(X, Y) = \sum_{i=1}^{BP} 1 (=BP)$$

where BP is the number of matched pairs of the type back→point.

The similarity between the template and the input characters is described by the following distance formula:

$$f_d(X, Y) = f_{ff}(X, Y) + f_{fn}(X, Y) + f_{nf}(X, Y) + f_{bp}(X, Y)$$

The candidate character with the minimum distance has the maximum probability of being the correctly recognized character for the input character. When the number of candidate characters with the minimum distance is more than one, then these candidate characters constitute a "similar group". When this occurs, the input character is further recognized by the special structural features of the character in the similar group which are represented by a logical tree. For example, the difference of stroke lengths is used as the discrimination feature in the detailed recognition for characters ( 土 士 ) and ( 末 未 ); whereas the discrimination function for the characters ( 了 子 ) is whether a "hook" exists in the curved stroke.

BRIEF DESCRIPTION OF THE DRAWING

The present invention will be described in detail with reference to the drawings showing the preferred embodiment of the present invention, wherein:

FIGS. 3a–3c illustrate the steps of applying the stroke correspondence rules using the examples shown in FIGS. 2a–2c.

DETAILED DESCRIPTION OF THE PREFERRED EMBODIMENT

Figure 1:
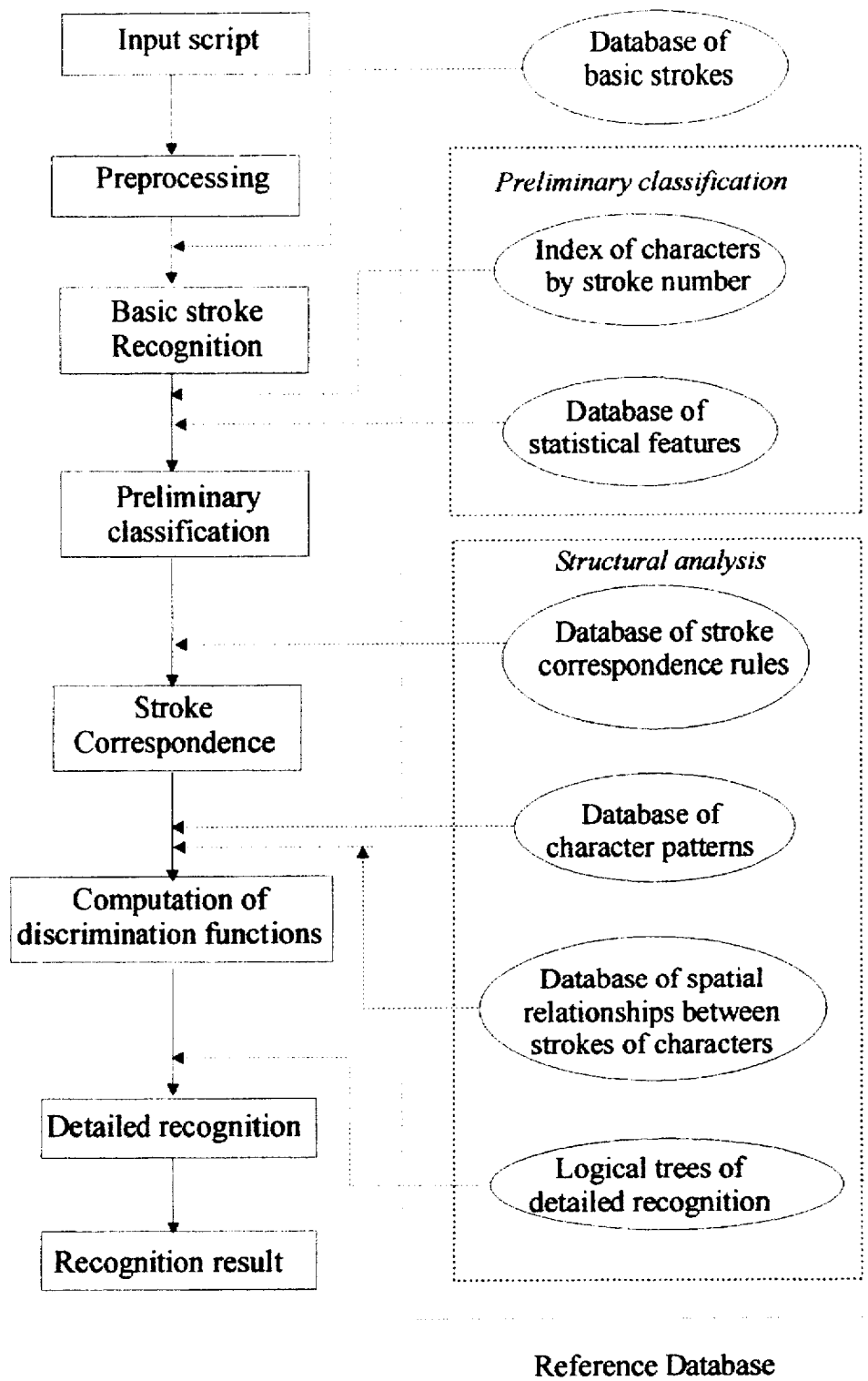
FIG. 1 is a schematic diagram showing the recognition architecture disclosed in a preferred embodiment of the present invention.

The present invention discloses a stroke-order-free and stroke-number-free on-line method for recognizing handwritten Chinese characters. The method disclosed in the present invention mainly comprises the following steps:

(a) obtaining a database of template characters, each template character being represented by a set of stroke correspondence rules for describing its constituent basic strokes;

(b) obtaining a database of spatial relationships between strokes of characters and a database of character patterns;

(c) inputting a handwritten input script on an on-line basis;

(d) preprocessing the input script to select candidate template characters for matching against the input script;

(e) performing a basic stroke recognition procedure to identify all basic strokes contained in the input script using a database of basic strokes;

(f) classifying the strokes into fore strokes, back strokes, and points, wherein the fore strokes are strokes that actually appear in the character, the back strokes are fictitious strokes to allow for stroke connections that should not appear, and points are provided to allow for truncated back strokes in the input script;

(g) for each candidate template character, performing a stroke correspondence for each stroke correspondence rule until all the stroke correspondence rules contained in the template character are exhausted, so as to identify all fore stroke→fore stroke correspondence;

(h) performing stroke matchings according to the input stroke order to find other stroke correspondences, i.e., back→point, back→fore, fore→null, null→fore, back→null, and null→back; and (i) performing computation of discrimination functions to find a template character with a minimum distance.

One of the key elements of the present invention, in addition to the above-listed steps, is that each stroke correspondence rule contains a specific set of stroke information including allowed stroke types, at least one geometric feature measure, and criterion for applying such geometric feature measure; the geometric feature measure is a geometrically related characteristic measure (which can be x or y coordinates, length, distance, etc) associated with a particular stroke, so as to facilitate the stroke correspondence process.

The method disclosed in the present invention may preferably include the step of performing preliminary classification which can be achieved using an estimated range of the stroke number of the input script and a database of statistical features. While this step involves stroke number, this is done only in a very coarse sense, and variations in the stroke number can be accommodated. And the present invention is still classified as a stroke-number-free method.

These steps are described in more detail below.

(a) Obtaining a database of template characters, each template character being represented by a set of stroke correspondence rules for describing its constituent basic strokes:

The method disclosed in the present invention employs a novel rule-based approach for finding stroke correspondence. The stroke correspondence rules employed in the present invention consist of (1) basic stroke types that are allowed in the handwriting, and (2) at least one geometric feature measure associated with the stroke. Each character category (which includes variations of a standard character) has a set of rules, each corresponding to a stroke. The sequence of applying the rules is the same as the sequence of finding the matched pairs in a template. A handwritten input stroke may consist of one or more basic strokes due to stroke connections (i.e., connections between the basic strokes as a result of handwritings). The matching of a template stroke is completed when a possible basic stroke in the input script is selected after it meets one rule. Then, this possible basic stroke is removed from the input pattern, and another application of the stroke correspondence rule is performed onto one of the remaining strokes of the input pattern until all the rules of the template are exhausted. It should be noted that not all of the strokes (expressed as rules) will find their matched fore strokes in the input script. After the rearrangement of the fore strokes in the template character based on the fore stroke matching, other types of matches involving non-fore strokes will be found.

The present invention utilizes one or more of the geometric feature measures, which are geometrically related characteristic lengths of the strokes, to establish the stroke correspondence rules for character recognition. Chinese characters contain two-dimensional arrangements of basic strokes based on predefined and recognizable geometric configuration. By using one or more of such geometrically related characteristic measures, the variations in the stroke order of the handwritten characters can be accommodated in the method disclosed in the present invention.

In a preferred embodiment of the present invention, 27 types of geometric feature measures of strokes are utilized to establish the stroke correspondence rules. The use of the geometric feature measures disclosed in the present invention allows on-line handwritten Chinese characters to be recognized without constraints on either the stroke number or the stroke order, or both. Before applying the stroke correspondence rules, all possible basic strokes are sorted based on the 27 measures in an increasing order. The sorted sequence for each measure is recorded in an array. Each stroke correspondence rule contains the information that the matching stroke must have a maximum or minimum value of a certain type of geometric feature measure. The matching stroke can then be directly acquired from the array storing the sorted results.

In a preferred embodiment of the present invention, after all the possible basic strokes in an input character are identified, all the 27 geometric feature measures for each possible basic stroke are computed. All the possible basic strokes are respectively sorted based on the values of the geometric feature measures in an increasing order. During the stroke correspondence step, the matching stroke is selected from these sorted possible basic strokes. Therefore, the computation time required for performing the stroke correspondence is in the order of O(n), where n is the number of strokes of the matched template.

For some cases, one geometric feature measure is adequate for stroke correspondence. However, in some other cases, typically those involving relatively complicated characters, it is highly desirable to use two or more geometric feature measures, typically two will suffice. Thus, in a preferred embodiment of the present invention, stroke correspondence rules are classified into two types: type one rules and type two rules, denoted as R1 and R2, respectively. Both types of rules also contain the information of the possible types of basic stroke which are allowed in the handwriting variations. A type one rule utilizes one predefined geometric feature measure of strokes to find the matching stroke. In some cases, more information is required to find stroke matching. A type two rule is required which utilizes two geometric feature measures to find the matching stroke; the first geometric feature measure is used to select candidate strokes for the input stroke, then the second geometric feature measure is further utilized to determine the matching stroke from the candidate strokes.

Figure 6:
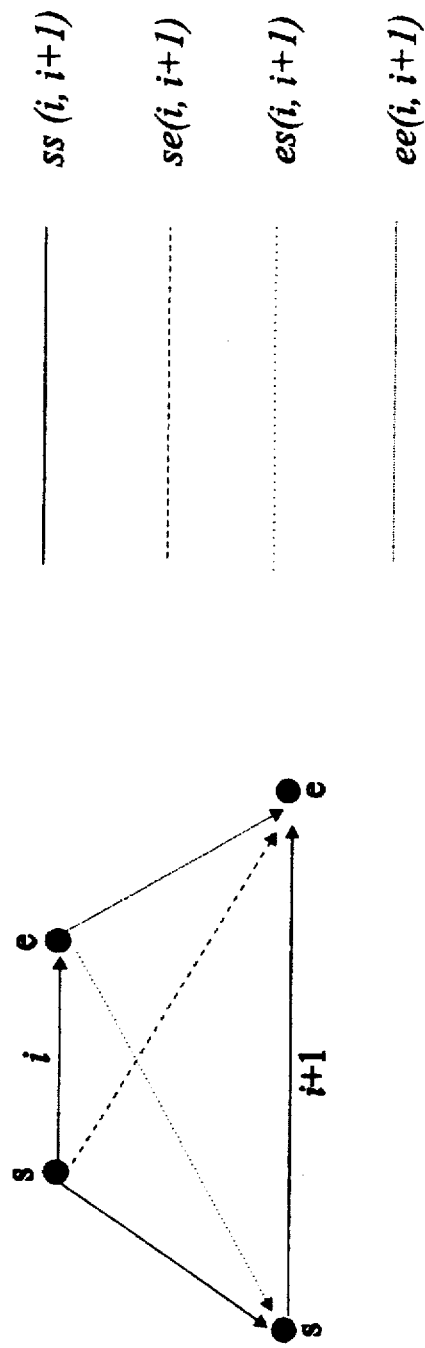
FIG. 6 illustrates the spatial relationships between the fore strokes i and i+1 as described by four vectors: ss(i, i+1), se(i, i+1), es(i, i+1), and ee(i, i+1); these vectors are defined as connecting between the starting point ("s") and the end point ("e"), from stroke i to stroke i+1.

(b) Obtaining a database of spatial relationships between strokes of characters:

A database of spatial relationships between the fore strokes is provided in which the spatial relationships between fore strokes i and i+1 are described by four vectors: ss(i, i+1), se(i, i+1), es(i, i+1), and ee(i, i+1). These vectors are defined as the connections between the starting point ("s") and the end point ("e"), from stroke i to stroke i+1, as illustrated in FIG. 6. The database of spatial relationships between the fore strokes is particularly useful for computing the distance between a template character and an input script.

(c) Inputting a handwritten input script on an on-line basis:

During the input step, the input script is converted into a collection of sampled points, and each sampled point is described by a vector (x, y, f), wherein x and y are the coordinates of that point and f is a flag, which has a value of "on" or "off", to indicate whether the pen is pressed or lifted. An input stroke is defined to contain sequentially contiguous points all with "on" values and terminates at a point with the "off" value.

(d) Preprocessing the input script to select candidate template characters for matching against the input script:

After the input step, the input script is processed with a preprocessing step, which includes normalization, sampling, and line-segment approximation. Each input stroke is approximated by a set of line segment(s), represented by a string, and is recognized by a string matching algorithm. The string matching algorithm is well-known in the art, and thus will not be described here.

(e) Performing a basic stroke recognition procedure to identify all possible basic strokes contained in the input script using a database of basic strokes:

After the preprocessing step, all possible basic strokes that may exist in the input script are identified. Because the basic strokes in a handwritten Chinese character are often connected, an apparent stroke may actually contain several basic strokes. Thus, all of the possible basic strokes (i.e., collectively, partially collectively, as well as individually) are identified. As described above, the apparent stroke in an input script is considered as consisting of a collection of sequentially connected "on" points). Because of the unique structural complexity of the Chinese characters, the strokes are classified in the present invention into three different types of "primitives", i.e., fore strokes, back strokes, and points. Fore strokes are those strokes that actually appear in a character pattern (which can be either a template character or an input script). In the standard templates, the fore strokes should not be connected. However, in reality, the fore strokes are often connected, and the "pseudo segments" may appear as fore strokes. In the present invention, these pseudo segments that connect two contiguous fore strokes are called "back strokes", meaning that these strokes should not exist in the standard character. In a broader sense, the back strokes are fictitious strokes which are provided to connect between fore strokes (i.e., to allow for the situation that the pen never leaves the paper when it should have). When a connecting stroke exists as a result of hasty handwriting, a fore stroke may appear in the handwritten script which would correspond to a fictitiously created back stroke in template. On the other hand, a back stroke (the imaginary stroke connecting two fore strokes) may also be truncated and thus degenerating into an intersection "point". By these designations, the primitives in the character representation can be classified into the three types of fore strokes, back strokes, and points. In summary, in the present invention, "back strokes", which do not actually appear in a character, are created for a template as well as an input character; and "point" primitives, which do not fit into the definition of a stroke, are identified for the input script, so as to accommodate connected strokes. The designation of these three primitives disclosed in the present invention greatly enhances the efficiency of the character recognition process, and offer a logical explanation of the recognition process.

(f) Classifying strokes in the handwritten characters into fore strokes, back strokes, and points, wherein the fore strokes are strokes that actually appear in the character, the back strokes are fictitious strokes to allow for stroke connections that should not appear, and points are provided to allow for truncated back strokes in the input script:

In the present invention, the strokes are classified into three types: fore strokes, back strokes, and points: fore strokes are those strokes that actually appear in a character pattern; back strokes are "pseudo strokes" which are provided in the present invention to allow for imaginary strokes connecting between fore strokes. When a connecting stroke exists as a result of hasty handwriting, a fore stroke may appear in the handwritten script which would correspond to a back stroke in template (i.e., the stroke does not exist in the template). This is shown as stroke "b" shown in FIG. 2b. On the other hand, a back stroke (the imaginary stroke connecting two fore strokes) may also be "simplified" and thus degenerated into an intersection "point", such as the intersection points of segments a' and b' shown in FIG. 2c. By these designations, the primitives in the character representation can be classified into the three types of fore strokes, back strokes, and points. The designation of these three primitives disclosed in the present invention greatly enhances the efficiency of the character recognition process, removes the constraints from the stroke number, makes the explanation of the recognition process easy to understand.

(g) For each candidate template character, performing a stroke correspondence for each stroke correspondence rule until all the stroke correspondence rules contained in the template character are exhausted, so as to identify all fore stroke→fore stroke correspondence:

The step of stroke correspondence performs stroke matching between an input script and a template character; it involves finding a binary relation (designated as "q") between the set of template primitives and the set of input primitives. Because the reference database contains only fore strokes, fore strokes are matched first. As discussed above, a primitive in the present invention is a basic stroke in a broader sense, because not only does it include the conventional fore stroke, it also includes an imaginary back stroke and a "point". The binary relation q for stroke matching from set X to set Y is defined as follows:

$$q: X \rightarrow Y$$

where X denotes the set of primitives of a template character, and Y denotes the set of primitives of an input character. For any element $x_i \in X$, if the mapped image (i.e., a matched primitive) $y_i (y_j = q(x_i), y_i \in Y)$ exists, then there exists only one such image $y_i$.

The process of performing stroke correspondence is to find a possibly corresponding stroke in the input script for each of the rules in the template character. If a possible basic stroke in the input script is found to match with one rule, then this selected basic stroke is removed from the input pattern, and the next stroke correspondence rule is applied onto the remaining strokes of the input pattern until all the rules in the template are exhausted.

(h) Using the above described stroke matching process and the stroke order of the input character to find other strokes correspondences between a fore stroke and a non-fore stroke, a non-fore stroke and a fore stroke, and a non-fore stroke and a non-fore stroke( i.e., back→point, back→fore, fore→null, null→fore, back→null, and null→back):

It is quite likely that some rules in the template character may not find matched strokes in the input character. In a preferred embodiment of the present invention, there are eight possible types of matches, namely: (1) fore→fore, (2) back→back, (3) back→fore, (4) back→point, (5) back→null, (6) null→back, (7) fore→null, and (8) null→fore, where x→y indicates a matched pair, and "fore" represents a fore stroke primitive, "back" represents a back stroke primitive, "point" represents a point primitive, and null indicates no matched primitive. It should be noted that in this preferred embodiment, the point primitive only exists in the input script. Furthermore, a back primitive (i.e., an imaginary stroke) in the template can be corresponded to a fore stroke, a back stroke, a point in the input script, or no match. The ubiquity of back strokes demonstrates its importance in recognizing Chinese handwritings.

The fore strokes of a template character are the essential primitives of a character, and, most of them are expected to exist in the input handwritten patterns, especially for those long or major strokes. A template in the reference database described the standard pattern of a character. When the strokes are connected in the handwritten characters, back strokes in the templates may appear as fore strokes or may even be reduced to "points" in the input patterns (i.e., scripts). These variations are commonly observed in the handwritten Chinese characters, and thus are accommodated in the method of the present invention for character matching. During the matching process, if an input script is matched against a template of the input category (i.e., possible variations of a character), the fore strokes in the template character are first matched with the fore strokes in the input script. The back strokes in the template pattern are obtained by tracing the matched pairs following the input stroke order, which is stored during the input step as part of the on-line recognition process. A back stroke in the template character may be mapped to a back stroke, a point, a fore stroke in the input script, or no match.

(i) Performing computation of discrimination functions to find a template character with a minimum distance:

After the step of stroke correspondence, which finds the matched strokes, a set of discrimination functions using a database of character patterns and a database of spatial relationships between strokes of characters are computed to find the best matching character(s). In the method disclosed in the present invention, the spatial relationships between strokes, as well as the information of lost strokes, superfluous strokes, and connected strokes, are utilized to compute the character distance between a template character and an input script, for character discrimination.

After the stroke correspondence between a template character and an input character script is accomplished, the matching relation between template strokes and input strokes is now considered to have been obtained. Based on the matching relation, input strokes are re-ordered in accordance with the stroke order of the template character. For an input script, the spatial relationships between the strokes based on the template stroke order are used in character discrimination.

As discussed above, the matching relation between the template and input primitives is a binary relation $q: X \rightarrow Y$, where X denotes the set of template primitives and Y denotes the set of primitives of the input script. The matching types of fore stroke→fore stroke and back stroke→back stroke are considered correct matchings for both fore strokes and back strokes. The matching types of back→point and back→fore also exist in the case of connected strokes. The matching types of back→null and fore→null occur in the case of lost stroke(s). And the matching types of null→back and null→fore can occur in the case involving superfluous stroke(s).

The distance functions used for character discrimination are defined as the sum of the distances calculated in the various matching type(s). For the matching type of fore→fore, the matched pairs of fore strokes are re-ordered according to the stroke sequence in the template character. In the input script, the spatial relationships between the fore strokes i and i+1 are described by four vectors: ss(i, i+1), se(i, i+1), es(i, i+1), and ee(i, i+1). These vectors are defined as the connections between the starting point ("s") and the end point ("e"), from stroke i to stroke i+1, as illustrated in FIG. 6. In performing the computation, the directions are quantized to accommodate variations in the handwritings. Thus, function quant_8( ) is defined to quantize the directions of the vectors into eight direction codes. All the possible variations of spatial relationships between handwritten strokes i and i+1 are all accommodated in the reference database, and are denoted by four sets of eight-direction codes: SS(i, i+1), SE(i, i+1), ES(i, i+1), EE(i, i+1). For the matched pairs of fore→fore, the cost function ff_err_ss(i) is defined as:

$$ff\_err\_ss(i) = \left\{ \begin{array}{l} 0 \text{ if quant\_8}(ss(i, i+1)) \in SS(i, i+1) \\ 1 \text{ otherwise} \end{array} \right\}$$

The other cost functions ff_err_se(i), ff_err_es(i), ff_err_ee(i) are similarly defined (i.e., substituting ss(i, i+1) with appropriate vectors). Assuming that the template character has FM strokes, for the matched pairs of the type fore→fore, the distance function related to the spatial relationship between the fore strokes is defined as:

$$f_f(X, Y) = \sum_{i=1}^{FM-1} (ff\_err\_ss(i) + ff\_err\_se(i) + ff\_err\_es(i) + ff\_err\_ee(i))$$

For the matched pairs of the type fore→null, the distance function is defined as:

$$f_{fn}(X, Y) = 5 \times T\_STK \times \sum_{i=1}^{FN} 1_i/L_T$$

where FN is the number of matched pairs of the type fore→null, T_STK is the number of strokes of the template character, $l_i$ is the length of the fore stroke i, and $L_T$ is the total lengths of all the strokes in the template character. The error cost of one lost stroke is considered as having a weight of 5, which includes the error cost of one fore stroke and four vectors representing the spatial relationships between two contiguous strokes.

For the matched pairs of the type null→fore, the distance function is defined as:

$$f_{nf}(X, Y) = 5 \times I\_STK \times \sum_{j=1}^{NF} 1_j/L_I$$

where NF is the number of matched pairs of the type null→fore, I_STK is the middle value of the estimated range of input stroke number, $l_j$ is the length of the input fore stroke j, and $L_i$ is the total length of all the strokes in the input character.

The matched pairs of the type back→point occur in the case of connected strokes. The distance function is defined as:

$$f_{bp}(X, Y) = \sum_{i=1}^{BP} 1 (=BP)$$

where BP is the number of matched pairs of the type back→point.

The similarity between the template and the input characters is described by the following distance formula:

$$f_d(X,Y) = f_f(X,Y) + f_{fn}(X,Y) + f_{nf}(X,Y) + f_{bp}(X,Y)$$

The candidate character with the minimum distance has the maximum probability of being the correctly recognized character for the input character. When the number of candidate characters with the minimum distance is more than one, then these candidate characters constitute a "similar group". When this occurs, the input character is further recognized by the special structural features of the character in the similar group which are represented by a logical tree. Many methods disclosed in the prior art can be used for this detailed recognition and thus will not be repeated here.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

EXAMPLE 1

Database of Basic Strokes

In this Example, the strokes of the Chinese characters are classified into 14 basic stroke types, as shown in Table 1. These data are useful in the stroke correspondence rules disclosed in the present invention.

EXAMPLE 2

Stroke Correspondences for Two Different Cursive Patterns

Figure 2A:
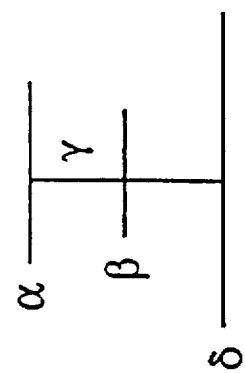
FIGS. 2a–2c show all the possible basic strokes existing in the "standard pattern", and two different "cursive patterns", respectively, of the character 上.
Figure 2B:
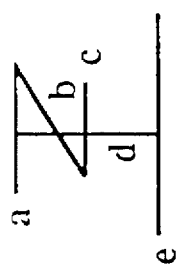
Figure 2C:
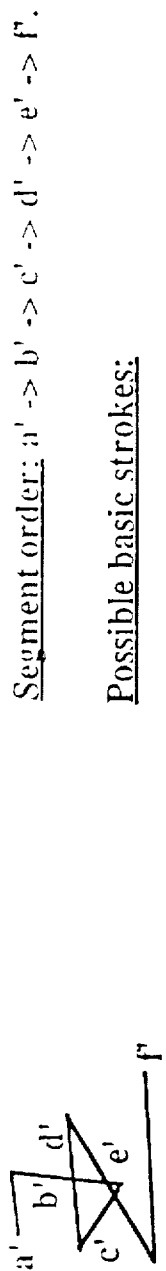

FIG. 2a illustrates the "standard pattern", and FIGS. 2b and 2c show two different "cursive patterns", respectively, of the character 土. The two cursive patterns shown in FIGS. 2b and 2c vary in both the stroke number and stroke connections relative to the standard pattern shown in FIG. 2a. FIG. 2a also shows the basic strokes of the standard pattern for the character 土. All the possible basic strokes that are contained in the cursive patterns are also shown in FIGS. 2b and 2c. The input cursive character shown in FIG. 2b contains three strokes, which consist, collectively, of eight possible basic strokes in a variety of combinations, and the input cursive character shown in FIG. 2c contains only one stroke, from which 11 possible basic strokes can be independently extracted. When a connecting stroke exists as a result of hasty handwriting, a fore stroke may appear in the handwritten script which would correspond to a back stroke in template. This is shown as stroke "b" in FIG. 2b. On the other hand, a back stroke may also be "simplified" and thus degenerating into an intersection "point", such as the intersection points of a' and b' as shown in FIG. 2c.

EXAMPLE 3

Application of Stroke Correspondence Rules

Figure 3B:
Figure 3B:
Figure 3B:
Figure 3B:
Figure 3B:
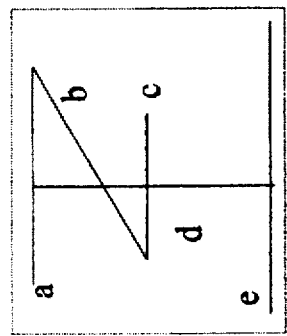
Figure 3C:
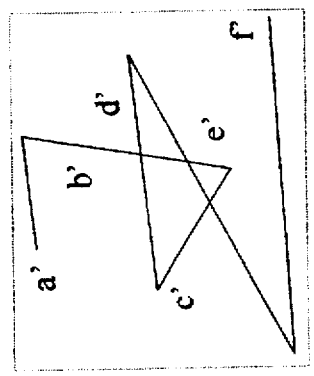

FIGS. 3a–3c illustrate the process of applying the stroke correspondence rule using the examples shown in FIGS. 2a–2c. FIG. 3a shows the stroke correspondence rules for the characters 土. The stroke correspondence rules consist of (1) basic stroke types that are "allowed" (i.e., commonly encountered) in the handwriting, and (2) the geometric feature measure(s) of the strokes used in the stroke matching process. Each character category (which includes variations of a standard character) has a set of rules, which accommodate a range of possible variations. The sequence of applying the rules is the same as the sequence of finding the matched pairs for the template character. A handwritten input stroke may consist of one or more basic strokes due to stroke connections (i.e., connections between the basic strokes as a result of handwriting). In matching against a template stroke, a possible basic stroke in the input script is first selected based on one rule. Then, this selected basic stroke is removed from the input pattern, and another stroke correspondence rule is applied onto one of the remaining strokes of the input pattern until all the rules in the template character are applied. FIGS. 3b and 3c show the process of applying the stroke correspondence rules for the two cursive patterns in FIGS. 2b and 2c, respectively.

EXAMPLE 4

Definition of Geometric Feature Measures 27 types of geometric feature measures of strokes are utilized to establish the stroke correspondence rules. These geometric feature measures are listed in Table 2. Before applying the stroke correspondence rules, all possible basic strokes are sorted based on the 27 measures in an increasing order. The sorted sequence for each measure is recorded in an array. Each stroke correspondence rule would contain the information that the matching stroke must have a maximum or minimum value of certain type of geometric feature measures. The matching stroke can then be directly acquired from the array storing the sorted results.

Each geometric feature measure is considered a special geometrically related characteristic length associated with a stroke to aid stroke recognition. First, each stroke is considered to be bounded by a minimum bounding rectangle (MBR). The x and y coordinates of the four boundaries and the center point of the MBR of a stroke are designated as geometric feature measures numbered 1 through 6, respectively, i.e., MBR_Xmin, MBR_Ymin, MBR_Xmax, MBR_Ymax, MBR_Xcenter, and MBR_Ycenter. The x and y coordinates of the starting point and end point of the strokes are designated as geometric feature measures numbered 7 through 10, i.e. Sx, Sy, Ex, Ey, respectively. These geometric feature measures are often adequate for simple strokes. For complicated strokes, additional or auxiliary geometric feature measures are provided to facilitate the stroke correspondence.

Figure 4:
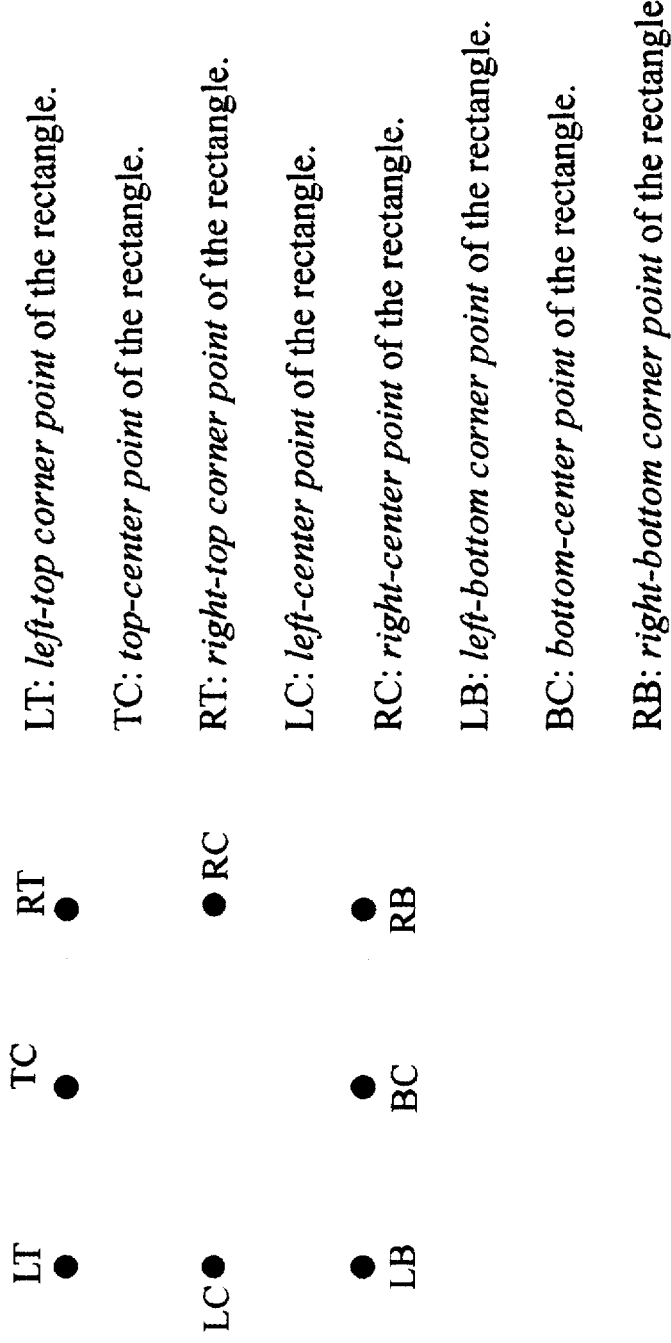
FIG. 4 shows the eight reference points of the bounding rectangle of a character in defining geometric feature measures numbered from 11 through 24.

FIG. 4 shows the eight reference points of the bounding rectangle of a character. These eight reference points are: LT (left-top corner point of the rectangle), TC (top-center point of the rectangle), RT (right-top corner point of the rectangle), LC (left-center point of the rectangle), RC (right-center point of the rectangle), LB (left-bottom corner point of the rectangle), BC (bottom-center point of the rectangle), and RB (right-bottom corner point of the rectangle). From these eight reference points, 14 auxiliary geometric feature measures, numbered from 11 through 24, can be derived. They are defined as the Euclidean distances from the starting point, end point, and center point of a stroke's MBR to these eight reference points, respectively. Additionally, the length of a stroke is considered as a geometric feature measure, numbered 25. Finally, the geometric feature measure numbered 26 is defined as the "city block" (or block distance) from the left-bottom corner point of a character to the left-bottom corner point of an individual stroke's MBR, and the geometric feature measure numbered 27 is defined as the city block from the left-bottom corner point of a character to the right-top corner point of that same stroke's MBR. Some, if not all, of these additional measures are useful for ensuring stable stroke correspondence for some complicated cases. Most of the strokes correspondence rules developed in the present invention require only one geometric feature measure. In other rules, two geometric feature measures are utilized.

EXAMPLE 5

Application of Stroke Correspondence Rules for the Character

Figures 5A, 5B:
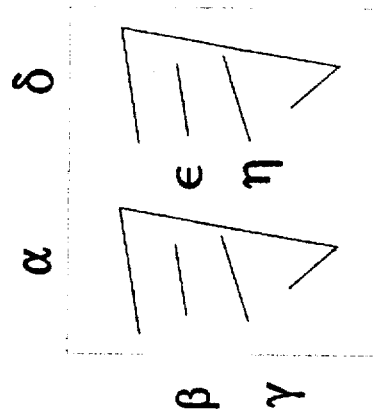
FIGS. 5a and 5b show an example of the application of the stroke correspondence rules for the Chinese character 小.

The application of the stroke correspondence rules can be illustrated by FIGS. 5a and 5b. FIG. 5a shows a standard pattern (template) of character, with its strokes identified and labeled. FIG. 5b lists the stroke correspondence rules. Each stroke correspondence rule contains the rule type, the basic stroke types allowed in considering handwriting variations, and the geometric feature measure(s) of the strokes to be used to find the matching stroke. In FIG. 5b, the geometric feature measure is denoted as Fi ($1 \leq i \leq 27$), where i is the geometric feature number (i.e., the type of geometric feature measure). For a template stroke, the matching stroke must have the minimum (denoted as S0) or maximum (denoted as S1) value of certain geometric feature measure Fi in the possible basic strokes of the in script. A type one rule utilizes one geometric feature measure denoted by (Fi, Sj) ($1 \leq i \leq 27$ and j=0 or 1). A type two rule, on the other hand, utilizes two geometric feature measures denoted by (Fi, Sj, Ck; Fi', Sj'), where the meanings of i, i', j, j' are similar to those defined for type one rules, and the value Ck indicates that k candidates strokes, of the basic stroke types allowed in the rule, have been selected from the remaining possible basic strokes of the input script based on the first geometric feature measure. The second geometric feature measure is used to determine the matching strokes from the k candidates strokes. The order of applying the stroke correspondence is based on a predefined rule sequence. The rules of strokes α and β in FIG. 5b are taken as examples for explanation. FIG. 5a shows that the rule for stroke a belongs to type two, and stroke type 6 is allowed. Based on the first geometric feature measure, (which, in this case, is the stroke length), strokes α and δ are selected as the candidate strokes from FIG. 5a. Next, the matched stroke, with start point of minimum x coordinate (F7), is selected from the two candidate strokes.

The handwritings of strokes β, γ, ε, and η in the character η are very close to "written dots", or short strokes. A handwritten short stroke is usually unstable and the stroke type recognized often is not the correct (i.e., original) stroke. Therefore, a number of possible variations (in this case, stroke types 0, 1, 2, and 3) should be taken into consideration and are accommodated in the rule. The rule for stroke β belongs to type one. The only geometric feature measure is the Euclidean distance from the center point of the stroke's MBR to the left-top corner point of the character. From the remaining strokes with the allowed stroke types in the rule, the matched stroke is the stroke with the least value of the geometric feature measure. A source code describing the above examples is provided in the Appendix.

EXAMPLE 6

On-Line Recognition of Handwritten Chinese Characters

Two studies were performed to verify the effectiveness of the method disclosed in the present invention. One study verified the performance of the structural analysis in the recognition process, including the recognition accuracy and the speed. The other study verified the effectiveness of the preliminary classification included in the process of the present invention.

Two databases of handwritten samples were established. One database contained on-line handwritten samples of Chinese characters, designated as ITRI-OLCCR database. The ITRI-OLCCR database contained data which are pen tracks of handwritten Chinese characters; it contained 5,401 character categories (a character category contains the standard character as well as a variety of "allowed" handwritten variations) of most frequent used everyday Chinese characters, written by 230 persons via a tablet. For each character category, there are 23 samples written by different persons. The other database contained off-line handwritten Chinese characters, designated as ITRI-HCCR database.

The ITRI-HCCR database contained handwriting samples from more than 2,600 persons. For each character category, the number of character samples ranged from 214 to 284. During the collection of the character samples, each character was written within a square, sized 11 mm by 12 mm, on an A4-sized sheet using a pencil or a ball-point pen. The written samples were then transformed into bit-patterns using a 300 dpi scanner. The ITRI-HCCR database was used as the training set for the database of statistical features in the recognition system.

In Example 6, 1,225 character categories were selected from the 5,401 categories of the ITRI-OLCCR database as the testing sample set. In these 1,225 character categories, their stroke numbers ranged from 1 to 21. Eleven testing samples per character category were taken from the ITRI-OLCCR database. In this study, only the estimated range of the input stroke number was used in the preliminary classification. The average number of candidate characters after the preliminary classification was 274. Table 3 shows the overall recognition rate of this study, in which the input character was recognized within ranks 1 through 5. The input was said to be recognized within rank k, if the corresponding reference character was among the top k most similar characters to the input. Consequently, an Lth rank cumulative recognition rate was defined as the recognition rate at which the correct reference character of an input sample appeared with the first L ranked candidates. The Lth column indicated that the Lth rank cumulative recognition rate. Altogether, the average first rank recognition rate was 93.51%, and the average 5th rank cumulative recognition rate reached 98.16%. In a separate study, the recognition rate was improved when more handwriting variations were included in the reference database. The simulation was implemented using a program written in C language on a PC/AT-486 personal computer. The average recognition speed was about 0.8 seconds for each character. When all the 5,401 character categories were used in the reference database of a recognition system, the recognition speed could become an important factor to be concerned. The number of candidate characters selected during the preliminary classification could become an important factor affecting the recognition speed

EXAMPLE 7

On-Line Recognition of Handwritten Chinese Characters

The second study of Example 7 involved performing a preliminary classification for a reference database containing all the 5,401 character categories. The estimated range of possible input stroke number and the statistical features were utilized in the preliminary classification to reduce the number of candidate characters to be used in the later stages of structural analysis. Six statistical features were used in this study including: stroke density function, stroke density distribution, contour line length, peripheral background area, background area, and gradient feature. The database of the statistical features was trained by 100 samples per character category taken from the ITRI-HCCR database. A K-means algorithm was utilized to cluster the 5,401 categories into 80 clusters. A character category may appear in more than one cluster, resulting in overlapped clusters. The statistical feature vector of an input character was first computed. Then, the 80 distances, measured between the vector and the mean feature vectors of the 80 clusters, respectively, were computed. From these 80 clusters, the five clusters with the shortest distances (i.e., within the first five ranks) were selected and combined into a set of candidate characters. The templates of the candidate characters were processed in the later stages of structural analysis. In this study, 23 testing samples per character category were also taken from ITRI-OLCCR database. The recognition rate of preliminary classification were defined as the "hit rate". On the average, when the statistical features alone were used, the hit rate was 99.61%, and the number of candidate characters was 1,480. On the other hand, when the estimated range of input stroke number alone was used, the average hit rate was 98.41%, and the number of candidate characters was 1,040. When both the statistical features and the estimated range of input stroke number were used, the number of candidate characters was reduced to only 353, and the hit rate was 98.05%. The main cause of the hit errors was attributed to the erroneous testing samples. Thus, the present invention represents an excellent character recognition method for Chinese characters which can be accomplished on a real-time basis even for a very large reference character set. The recognition speed can be further improved by utilizing additional features in the preliminary classification step.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

TABLE 1

| Code | Shape |
|---|---|
| 0 | |
| 1 | |
| 2 | |
| 3 | |
| 4 | |
| 5 | |
| 6 | |
| 7 | |
| 8 | |
| 9 | |

TABLE 1-continued

| Code | Shape |
|---|---|
| 10 | |
| 11 | |
| 12 | |
| 13 | |

TABLE 2

| No. | Geometric feature measure | Remarks |
|---|---|---|
| 1 | MBR_Xmin | Coordinates of the four boundaries of |
| 2 | MBR_Ymin | a stroke's MBR and the center point |
| 3 | MBR_Xmax | of a stroke's MBR. |
| 4 | MBR_Ymax | |
| 5 | MBR_Xcenter | |
| 6 | MBR_Ycenter | |
| 7 | Sx | X and y coordinates of the start |
| 8 | Sy | and end points of a strokes. |
| 9 | Ex | |
| 10 | Ey | |
| 11 | $ED^1$ ($S^2$, LB) | Euclidean distance from a stroke's |
| 12 | ED (S, LT) | start point to one corner point of |
| 13 | ED (S, RT) | a decomposed component's MBR. |
| 14 | ED ($E^3$, LB) | Euclidean distance from a stroke's |
| 15 | ED (E, RB) | end point to one corner point of |
| 16 | ED (E, RT) | a decomposed component's |
| 17 | ED ($C^4$, LB) | The Euclidean distance from the center |
| 18 | ED (C, RB) | point of a stroke's MBR to one corner |
| 19 | ED (C, RT) | point of a decomposed component's |
| 20 | ED (C, LT) | MBR. |
| 21 | ED (C, LC) | Euclidean distance from the center point |
| 22 | ED (C, BC) | of a stroke's MBR to the center point of |
| 23 | ED (C, RC) | one boundary of a decomposed |
| 24 | ED (C, TC) | component's MBR. |
| 25 | L | Length of a stroke. |
| 26 | MBR_Xmin + MBR_Ymin | City block measures of the left-bottom |
| 27 | MBR_Xmax + MBR_Ymax | and right-top corner points of a stroke. |

[1] ED, (a, b) indicates Euclidean distance of point a to b.
[2] S indicates the start point of a stroke.
[3] E indicates the end point of a stroke.
[4] C indicates the center point of a stroke's MBR.

TABLE 3

| Rank | 1 | 2 | 3 | 4 | 5 |
|---|---|---|---|---|---|
| Overall recognition rate | 93.51 | 96.33 | 97.47 | 97.86 | 98.16 |

APPENDIX

```
/***********************************************************************
 *
 * AUTHOR:  Ju-Wei Chen
 *
 *-----------------------------------------------------------------
 *
 * Data type definitions and global variable declarations
 *
 ***********************************************************************/

/***********************************************************************/
/* File Name: \olccrpda\define.h                                       */
/***********************************************************************/

/*----------------- PC and SUN data transform ----------------------*/ define   PC_MSC  1 ifndef PC_MSC
define   PC_MSC  1
endif if  PC_MSC
define short_convert(in)
#define long_convert(in)

#else
#define short_convert(in)                        \
        (in) = ( ( ((in) & 0x00ff) << 8 )        \
           | ( ((in) & 0xff00) >> 8 ) )

#define long_convert(in)                                      \
        (in) = ( ((in & (unsigned long)0x000000ff) <<24)      \
           | ((in & (unsigned long)0x0000ff00) << 8)          \
           | ((in & (unsigned long)0x00ff0000) >> 8)          \
           | ((in & (unsigned long)0xff000000) >>24) )
endif /*----------------- BIG5 code buffer ----------------------------*/ define   SIZE_OF_CHAR_BIG5       5401
define   CATEGORY          5401

/*----------------- Character structure ------------------------*/ define   MAX_COMPNO_IN_CHAR         10
```

```
/*---------------- Raw data buffers ----------------------------*/ define  SIZE_RAW_BUF    1100

/*---------------- Stroke segment buffer -----------------------*/ define  SIZE_SEG_BUF    50

/*---------------- Stroke table --------------------------------*/ define  SIZE_tb_stroke   150
define  SIZE_tb_ls       450

/*---------------- Stroke recognition --------------------------*/ define  SIZE_OF_INP_STK    35 define  SIZE_OF_POSS_STK   80 define  SIZE_char_blk      800
define  SIZE_idx_stk    35
#define  SIZE_idx_seg       40

/*---------------- preclassification ---------------------------*/ define f_nrg_su(in)                \
        (in) = (in)

#define f_nl(in)                    \
        (in) = (unsigned char) ( ((in) + 1) /2 )

#define f_nu(in)         \
        (in) = (in)

/*---------------- Stroke correspondence -----------------------*/ define  SIZE_correspond_feature   32

/*---------------- Charcter description arrays -----------------*/ define SIZE_CHAR_DSP     6400
define SIZE_COMP_ELM          18000

/*---------------- Component description arrays ----------------*/ define SIZE_IDX_COMP_ARRAY      20
define SIZE_COMP_PATT_ARRAY    800
```

```
#define   SIZE_COMP_RULE_ARRAY   2000
#define   SIZE_COMP_PATT_LS      5000
#define   SIZE_COMP_CRULES       4200

/*---------------- Character structural frame arrays  -------------*/ define   SIZE_IDX_ST_FRAME_ARRAY   10
define   SIZE_ST_FRAME_TYPE        500
#define   SIZE_ST_FRAME_DRULE       2000
#define   SIZE_COMP_SYN             3000

/*---------------- spatial relationships ------------------------*/ define   SIZE_COMP_STK     3500
define   SIZE_COMP_STR     100

/*---------------- Character candidate buffer -------------------*/ define   SIZE_2ND_CAND     10
define   SIZE_3RD_CAND     20 define   NoMatch            0
define   Matched            1
define   ONE_CHAR_SIZE      100 define   FORE_FORE          1
define   BACK_FORE          2
#define   NULL_FORE          4
#define   BACK_BACK          6
#define   BACK_POINT         10
#define   FORE_NULL          13
#define   RESTRICT_BACK_FORE    0
#define   RESTRICT_BACK_BACK    0
#define   OLD_PROGRAM           0
define   SIZE_PRIM_MAP         100 define   MAX_ELE_NO         10 define   ALIAS_TABLE_SIZE   1000 define   MAX_STROKE_IN_A_RADICAL   19
define   LASTSORT          (SIZE_2ND_CAND - 1)
#define   NORMALIZE_SIZE             64
#define   PI         3.141592653
#define   PI_DEGREE    180
#define   CIRCLE_DEGREE    360
#define   MAX_DIST    32760
```

```
#define  SIZE_ALL_CATEGORY    800
#define  YES               1
#define  NO                0
//#define SIZE_COMP_ARRAY   800
#define  DEBUG             0
#define COMP_ELM_XMS       0
#define COMP_PATT_LS_XMS   0
#define COMP_CRULES_XMS    0
#define COMP_SYN_XMS       0
#define CHAR_DSP_XMS       0
#define ST_FRAME_DRULE_XMS 0

/******************************************************************/
/* File Name  \olccrpda\typedef.h                                 */
/******************************************************************/

/*---------------- Raw data buffer ----------------------------*/ typedef  struct {
        unsigned char  x;
        unsigned char  y;
        char     flag;
        } OLCR_POINT;

/*---------------- Stroke segment buffer ----------------------*/ typedef  struct {          /* corrdinate structure */
        unsigned char   x, y;
        } COORD;

typedef  struct {

COORD     start_pt,    /* coordinates of start point */
        COORD     end_pt;      /* coordinates of end point   */

/* the following is optional */ short      direction;
        unsigned char  length;
        char      flag;

unsigned char  dir_Sc;
        unsigned char  n_turn;

} SEGMENT_STRUCT_1;
```

```
typedef struct {
        COORD    start_pt;      /* coordinates of start point */
        COORD    end_pt;        /* coordinates of end point  */

/* the following is optional */ short    direction;
        unsigned char  length;

} SEGMENT_STRUCT_2;

typedef struct {
        COORD    left_cornor;
        COORD    right_cornor;
} RECTANGLE;
```

/*---------------- Stroke table --------------------------------*/

```
typedef struct stktb { unsigned char  stk_type;
        unsigned char  lscnt;
        short          lssp;

} STKTB;

typedef struct ls { unsigned char  dir_8c;
        unsigned short poss_ratio;

unsigned char  pn_turn;

} LS;
```

/*---------------- Stroke recognition -------------------------*/

```
typedef struct stroke
{
   unsigned char   fv_sp, fv_ep;
   char            stroke_type;
```

} INPUT_STROKE_STRUCT;

```c
typedef struct
{
  char      status;
  unsigned char  input_stroke_no;
  unsigned char  fv_sp, fv_ep;
  unsigned char  length;
  char      stroke_type;
  unsigned char  feature[SIZE_correspond_feature];

}   POSSIBLE_STROKE_RECORD;

typedef struct { unsigned char   stroke_id;
      char      stroke_type,

}  SUBSTRING_RECORD;

/*---------------- Preclassification arrays ----------------------*/ typedef struct { short     count;
      short     bk_cnt;
      short     s_bk;
      unsigned char   cand_code [SIZE_char_blk];

}  CAND_RD_STRUCT;

typedef struct { unsigned char   stk_cnt;
      unsigned char   stk_seg_cnt [SIZE_OF_INP_STK];
      unsigned char   stroke_code [SIZE_OF_INP_STK];

}  R_STK_RCG_STRUCT,

/*---------------- Chrarcter description arrays -------------------*/ typedef struct { short     tot_length;
      short     TotalScore;
```

```
              unsigned short   sp_comp_elm;    /* Point of comp_elm []    */
                                               /* In final implementation,    */
                                               /* it will be address of comp_array. */ unsigned long    st_frame_code;  /* address of st_frame_array */
                                               /* in final implementation   */
                                               /* and short type enough     */
        }   CHAR_DESCRIPTION;

typedef  struct {
        unsigned short   comp_code;
        }   CHAR_COMP_ELM;

/*----------------- Index arrays --------------------------------*/ typedef  struct {
        unsigned char   count;
        unsigned char   sp.
        }   IDX1.

typedef  struct {
        unsigned char   count;
        short           sp;
        }   IDX2.

typedef  struct {
        unsigned short  count;
        short           sp;
        }   IDX3.

/*----------------- Component description arrays ------------------*/ typedef  struct { short    RuleCode;
        char     TuneMark;

}   PATT_MAP_RECORD;

typedef  struct {
        short    Comp_PattCode;
        PATT_MAP_RECORD  Comp [17],

}   PATT_MAP_STRUCT;
```

```
typedef  struct { unsigned char  ls_cnt;
        short          ls_ptr;      /* point of comp_patt_ls */ unsigned char  stk_cnt;
        short          crule_ptr;   /* point of comp_crules */

}  COMPONENT_STRUCT;

typedef  struct { unsigned char  xs;
        unsigned char  xe;
        unsigned char  ys;
        unsigned char  ye;
        char           flag;

}  COMP_PATT_LS_STRUCT;

typedef  struct { unsigned char  Rule_Stk_idx;    /*-- The 8th, 7th, 6th bits store rule number. --*/
                                        /*-- The lower 5 bits store stroke index.      --*/
        unsigned short bit_stk_type;    /*-- Bitwise representation for stroke type.   --*/
        unsigned char  ScanSeq_FeaType [2]; /*-- The 8th bit stores scan sequence index --*/
                                        /*-- The lower 7 bits store rule number.--*/
        unsigned char  CandNum [2];     /*-- The number of first k candidate strokes --*/
                                        /*-- according to the indicated feature value. --*/

}  COMP_CRULES_STRUCT;

/*----------------- Character structural frame arrays  -------------*/ typedef  struct {
        unsigned short d_set_cnt;
        short          drule_sp;

unsigned short s_set_cnt;
        short          comp_syn_sp;

}  RULE_SET_ST_FRAME_STRUCT;
```

```
typedef  struct { unsigned char   lc_x, lc_y;
        unsigned char   num_x_reduce, den_x_reduce;
        unsigned char   num_y_reduce, den_y_reduce;

}  COMP_SYN_STRUCT;

typedef  struct { unsigned char   comp_ord_idx;
        unsigned char   CutFea_x, CutFea_y;
        unsigned char   xmin, xmax, ymin, ymax;

}  ST_FRAME_DECOMP_RULE;

/*-- Arrays storing the knowledge of cutting sequence and position --*/
/*-- of components -----------------------------------------------*/ typedef  struct { unsigned char   CutSeqCnt;
        short           CutSeqPtr;

} PTR_COMP_CUT_KNW_STRUCT;

typedef  struct { unsigned char   CompIdx [SIZE_IDX_ST_FRAME_ARRAY];
        unsigned char   Position [SIZE_IDX_ST_FRAME_ARRAY];

}  CUT_SEQ_POSITION_STRUCT;

/*----------------- Database staticstics -------------------------*/ typedef  struct { short           occur_cnt;

}  STATICS_STRUCT;

/*----------------- Tools ----------------------------------------*/ typedef struct {
    unsigned long       poss_stk_id [4];
```

} CUT_POSSIBLE_STK_RECORD;

```
typedef   struct { unsigned short bit_stk_type;     /*-- Bitwise representation for stroke type. --*/

}   TEMP_COMP_STK_STRUCT;

typedef   struct { unsigned char   Rule_Stk_idx;   /*-- The 8th, 7th, 6th bits store rule number. --*/
                                        /*-- The lower 5 bits store stroke index.      --*/
        unsigned char   ScanSeq_FeaType [2]; /*-- The 8th bit stores scan sequence index.--*/
                                        /*-- The lower 7 bits store rule number        --*/
        unsigned char   CandNum [2],    /*-- The number of first k candidate strokes --*/

}   TEMP_COMP_FCR_STRUCT;
                        /*-- according to the indicated feature value. --*/

/*----------------- spatial relationships -------------------------*/ typedef   struct { unsigned char   es;
        unsigned char   ee;
        unsigned char   ss;
        unsigned char   se;

}   SRA_STRUCT;

typedef   struct { short       sra_ptr;

}   COMPONENT_SRA_STRUCT;

typedef   struct { unsigned char   a;
        unsigned char   b;
        unsigned char   c;
        unsigned char   d;

}   COMP_STR_STRUCT;
```

11

```
typedef   struct { short     struct_ptr;

}  CHAR_COMP_STRUCT;

typedef   struct { char     LB_x;
        char     LB_y;
        char     RT_x;
        char     RT_y;

}  COMP_RP_STRUCT;

typedef struct
{
  short  direction;
  short  length;
  short  xe, ye, xs, ys;
}  DP_STRUCT;

typedef   char*              LPSTR;
typedef   unsigned char*     LPBYTE;

/*---------------- Character candidate buffer --------------------*/ typedef   struct { short  char_code;
        long   distance;

}  SEC_STAGE_CAND;

typedef   struct { unsigned char   primitive_type;
        unsigned char   ref_comp1, ref_stk1;
        unsigned char   ref_comp2, ref_stk2;
        unsigned char   inp_no1, inp_no2;

}  PRIMITIVE_MAP_STRUCT,
```

```
typedef   struct { short    char_code;
    short    distance_value;

}   THIRD_STAGE_CAND;

/*----------------- Recognition rates    ----------------------------*/ typedef   struct { long      tot_cnt;
    long      corr_cnt;
    float     rcg_rate;

} RATE_STRUCT;

/**********************************************************************/
/* File Name \olccrpda\ global.c                */
/**********************************************************************/ include "define.h"
include "typedef.h"

/*----------------- Mask buffers ---------------------------------*/ unsigned char     c_BIT     [9];
unsigned short    s_BIT     [16];
unsigned long     l_BIT     [32];

/*----------------- Raw data buffers ----------------------------*/

OLCR_POINT        bfl [SIZE_RAW_BUF];
short             l_bfl;

/*----------------- Input stroke segment buffer -------------------*/

RECTANGLE         range [1];
SEGMENT_STRUCT_1  f_seg [SIZE_SEG_BUF];

/*----------------- Stroke table ---------------------------------*/

STKTB             tb_stroke  [SIZE_tb_stroke];
LS                tb_ls      [SIZE_tb_ls];
short             lp_tb_stroke;
```

```
short            lp_tb_ls;

/*---------------- Stroke recognition -------------------------*/

INPUT_STROKE_STRUCT  input_stroke [SIZE_OF_INP_STK];
unsigned char        inp_stk_cnt = 0;
POSSIBLE_STROKE_RECORD  poss_stk_rd[SIZE_OF_POSS_STK];
SUBSTRING_RECORD     stk_substring [SIZE_SEG_BUF][SIZE_SEG_BUF], /*---------------- preclassification --------------------------*/ unsigned char  F_SL   [19] = { 1, 1, 1, 1, 1, 1, 1, 1, 1, 1,
                               1, 1, 1, 1, 1, 2, 3, 2, 3 };

unsigned char  F_SU   [19] = { 1, 1, 1, 1, 1, 1, 2, 2, 2, 2,
                               2, 3, 3, 2, 2, 2, 3, 3, 3 };

CAND_RD_STRUCT       idx_stk [SIZE_idx_stk],
CAND_RD_STRUCT       idx_seg [SIZE_idx_seg];

unsigned char  delta_S1=0, delta_S2=0, delta_S3=0,

/*---------------- Character description array ------------------*/

CHAR_DESCRIPTION     char_dsp[SIZE_CHAR_DSP];
unsigned short       lp_char_dsp = 0;

CHAR_COMP_ELM        comp_elm  [SIZE_COMP_ELM];
unsigned short       lp_comp_elm =0;

/*---------------- Component description array ------------------*/

IDX3            idx_comp_patt_array [SIZE_IDX_COMP_ARRAY];
PATT_MAP_STRUCT      Patt_to_Rule_Map [SIZE_COMP_PATT_ARRAY].
unsigned long   Comp_Position        [SIZE_COMP_PATT_ARRAY];

IDX3            idx_comp_rule_array [SIZE_IDX_COMP_ARRAY];

COMPONENT_STRUCT     comp_rule_array [SIZE_COMP_RULE_ARRAY];
COMPONENT_STRUCT     comp_patt_array [SIZE_COMP_PATT_ARRAY].

short           Rule_to_PattCode [SIZE_COMP_RULE_ARRAY];
unsigned short  lp_comp_rule_array = 0.

COMP_PATT_LS_STRUCT  comp_patt_ls [SIZE_COMP_PATT_LS];

COMP_CRULES_STRUCT   comp_crules [SIZE_COMP_CRULES];
```

```
/*---------------- Character structural frame description arrays --*/

IDX2            idx_st_frame_array[SIZE_IDX_ST_FRAME_ARRAY];

RULE_SET_ST_FRAME_STRUCT RuleSet_st_frame_array [SIZE_ST_FRAME_TYPE];
unsigned short      lp_RuleSet_st_frame_array = 0;

ST_FRAME_DECOMP_RULE   st_frame_drule[SIZE_ST_FRAME_DRULE];
unsigned short      lp_st_frame_drule = 0;

COMP_SYN_STRUCT  comp_syn [SIZE_COMP_SYN];
unsigned short      lp_comp_syn = 0;

/*---------------- Database staticstics ------------------------*/

STATICS_STRUCT       comp_rule_statics [SIZE_COMP_RULE_ARRAY];
STATICS_STRUCT       st_frame_statics [SIZE_ST_FRAME_TYPE];

/*---------------- Spatial relationships ------------------------*/

SRA_STRUCT          comp_sra     [SIZE_COMP_STK];
COMPONENT_SRA_STRUCT   comp_sra_array [SIZE_COMP_PATT_ARRAY];
SRA_STRUCT          input_sra    [SIZE_OF_POSS_STK][SIZE_OF_POSS_STK];
COMP_STR_STRUCT  comp_str     [SIZE_COMP_STR];
CHAR_COMP_STRUCT    char_str_array [SIZE_ST_FRAME_TYPE];
COMP_RP_STRUCT       comp_rp [MAX_COMPNO_IN_CHAR];
COMP_STR_STRUCT  input_comp_str [MAX_COMPNO_IN_CHAR];

float        f_seg_ratio   [SIZE_SEG_BUF];

/*---------------- Load component information from database ------*/

INPUT_STROKE_STRUCT   ref_stroke[SIZE_OF_INP_STK];
SEGMENT_STRUCT_2     ref_f_seg[SIZE_SEG_BUF];

/*---------------- Character candidate buffer -------------------*/

CAND_RD_STRUCT       first_stage_cand_buf;
SEC_STAGE_CAND       second_stage_cand_char [SIZE_2ND_CAND];
PRIMITIVE_MAP_STRUCT  primitive_map [SIZE_PRIM_MAP];

unsigned char     PossibleStrokeCount;
unsigned char     sort_stroke_id [SIZE_correspond_feature][SIZE_OF_POSS_STK];
unsigned char     relation_sort_stroke_id
[SIZE_correspond_feature][SIZE_OF_POSS_STK];
```

```
unsigned char    Sp_sort_stroke_id [SIZE_correspond_feature];
unsigned char    Ep_sort_stroke_id [SIZE_correspond_feature], unsigned char    RefMapToInput[10][20];      /* RefMapToInput
[component_idx][stroke_idx] = possible stroke id. */
unsigned char    RS_StkMapRecord [10][20];
short            UsedCRulePtr[10][20];   /* RefMapToInput [component_idx][stroke_idx]
= possible stroke id. */
CUT_POSSIBLE_STK_RECORD CutPossStk[10];

short            LineUsed[SIZE_SEG_BUF];     /* LineUsed[SIZE_SEG_BUF] = 1 or 0 -
- used or not.   */

/*---------------- Tools ---------------------------------*/

TEMP_COMP_STK_STRUCT    StkBuf [20];

TEMP_COMP_FCR_STRUCT    FcrBuf [20];

unsigned char    sel_charcode [SIZE_char_blk], short       AliasTable[ALIAS_TABLE_SIZE] =
{
/*   0   1   2   3     4    5    6     7    8    9 */
   303, 443, 508, 548, 673, 701, 142, 127, 192, 182,
   193, 251, 261, 143, 284, 305, 690, 691, 692,1062,
  1063,1064,1065,1066,1067,1068,1069,1070,1071,1072,
  1073,1074,1075,1076,1077,1152,1431,1432,1433,1434,
  1435,1436,1437,1438,1439,1440,1441,1442,1443,1444,  /* 5450 */
  1445,1446,1447,1448,1449,1450,1451,1452,1866,1867,
  1868,1869,1870,1871,1872,1873,1874,1875,1876,1877,
  1878,1879,1880,1881,1882,1883,1966,1992,2339,2340,
  2341,2342,2343,2344,2345,2346,2347,2348,2349,2350,
  2351,2352,2353,2354,2355,2356,2569,2631,2779,2780,  /* 5500 */
  2781,2782,2783,2784,2785,2786,2787,2788,2789,2790,
  2791,2792,2793,2794,2795,2796,2797,2798,2799,2800,
  2801,2802,2803,2804,2938,2968,3002,3006,3021,3022,
  3032,3062,3120,3161,3208,3209,3210,3211,3212,3213,
  3214,3215,3216,3217,3218,3219,3220,3221,3222,3223,  /* 5550 */
  3224,3410,3417,3429,3444,3468,3512,3559,3631,3632,
  3633,3634,3635,3636,3637,3638,3639,3640,3641,3642,
  3643,3644,3645,3646,3774,3781,3805,3828,3829,3847,
  3869,3872,3880,3929,3991,3996,3997,3998,3999,4000,
  4001,4002,4003,4004,4005,4006,4007,4008,4009,4010,  /* 5600 */
  4157,4175,4215,4220,4270,4323,4324,4325,4326,4327,
  4328,4329,4330,4331,4332,4343,4354,4364,4453,4478,
  4484,4493,4508,4517,4524,4540,4574,4615,4616,4617,
  4618,4619,4620,4621,4622,4623,4624,4625,4630,4631,
```

```
    4647,4673,4682,4743,4745,4772,4806,4807,4808,4809,   /* 5650 */
    4810,4811,4812,4813,4814,4815,4823,4909,4919,4938,
    4941,4950,4960,4961,4962,4963,4964,4965,4966,4976,
    4989,5045,5054,5074,5092,5093,5094,5095,5096,5097,
    5098,5099,5107,5113,5159,5170,5171,5172,5173,5177,
    5181,5226,5235,5236,5249,5271,5283,5300,5301,5312,   /* 5700 */
    5331,5365,5372,5379,5384,5398, 439, 399, 701,1466,
    1467,1629,1915,1946,2848,2849,2850,3688,3689,4062,
    4063,4660, 781,2050,2116,2215,2626,5207,2795,3119,
    3831,3886,4829,5218,5043, 434,5259, 546, 563, 574,
     602, 657, 935, 952,1307,1368,1825,1947,1972,2065,   /* 5750 */
    2220,2449,2571,2624,2684,2697,2703,2893,2985,3047,
    3367,4082,4298,4352,4399,4427,4511,4898,5008,5041,
    5043,5056,5061,5141,5237,5289,5290,5298,5304,5306,
    5337,5371,5396,2923,4996,5359,2716,3762,2536,3346,
    5316,4234,2020,3438,3122,2923,3161,2279,2447,1954,   /* 5800 *//**/
    3572,4719,4254,5068,5177,4144,4145,4439,4440,4441,
    4442,4443,4444,4715,4716,4892,4893,4894,5036,5037,
    5038,5039,5040,5214,5215,5216,5217,5255,5277,5278,
    5321,5352,5353,5394,5398,5399,2918,2919,2948,2981,
    3362,3363,3364,3547,3746,3949,3985,4127,4128,4129,   /* 5850 */
    4130,4131,4132,4133,4134,4188,4294,4335,4430,4431,
    4432,4709,4710,4856,4880,5029,5030,5128,5129,5130,
    5131,5205,5206,5207,5208,5269,5270,5312,5313,5314,
    5332,5348,5380,5381,5396,3227,3043,2787,3781,4215,
    4220,4976,4231,1146,5055,4364,4049,4779,4461,5042,   /* 5900 */
    3572,4719,4254,5068,5177,3978,2927,3309,5235,5201,
    4965,4841,4202,1526,1093,2889,3615,5015,2429,2887,
    2007,1943,3757,4515,4159,1993,5205,4835,3888,3892,
    1988,4741,5086,4599,3825,1618,3191,3246,5355,3516,
    3388,4900,4421,3433,4861,4601,4802,5015, 574,5017,   /* 5950 */
    4751,4209,5248,4609,4953,2706,4701,5354,5136,5192,
    5361,5292,2357,4863,3815,4959,3627,3627,3762,5232,
    5303,5285,3405,3406,1498,4150,3693,3179,1630,4997,
    3283,4836,5365,5236,4719,4718,4089,4449,4262,4902,
    4196,3770,2920,3819,4222,4263,4557,4728,4734,4766,   /* 6000 */
    4786,4912,5073,5374,3189,2499,1491,1494,1701,1968,
    2456,2535,2759,2778,2908,3213,3305,3629,3836,3971,
    4022,4088,4252,4265,4349,4379,4552,4556,4697,4994,
    5319,5322, 601,1182,1367,2573,2574,2648,3212,3560,
    4375,4695, 637, 678, 995,1078,2014,2338, 707, 708,   /* 6050 */
     709, 710, 711,1083,1084,1085,1471,1472,1473,1474,
    1475,1476,1477,1478,1479,1921,1922,1923,1924,1925,
    1926,1927,1928,1929,1930,2402,2403,2404,2405,2406,
    2407,2408,2409,2410,2411,2412,2413,2414,2415,2416,
    2417,2863,2864,2865,2866,2867,2868,3299,3300,3301,   /* 6100 */
    3302,3303,3304,3305,3306,3307,3308,3309,3310,3311,
    3312,3313,3696,3697,3698,3699,3700,3701,3702,3703,
```

```
            3704,4083,4084,4085,4086,4087,4214,4378,4379,4380,
            4381,4382,4383,4670,4671,4672,4673,4674,4675,4838,
            4839,4840,4997,4998,5304,5305, 821, 243, 244, 245,   /* 6150 */
            246, 247, 248, 249, 250, 251, 252, 253, 254, 255,
            256, 257, 258, 259, 260, 261, 262, 263, 264, 265,
            266, 267, 268, 269, 270, 271, 272, 273, 274, 275,
            276, 277, 278, 279, 280, 281, 282, 283, 284, 285,
            286, 287, 288, 289, 290, 291, 292, 293, 294, 295,   /* 6200 */
            296, 297, 298, 299, 300, 301, 302, 303, 304, 305,
            306, 307, 308, 309, 310, 311, 312, 313, 314, 315,
            316, 317, 318, 319, 320, 321, 322, 323, 324, 325,
            326, 327, 328, 329, 330, 331, 332, 333, 334, 335,
            336, 337, 338, 339, 340, 341, 342, 343, 344, 345,   /* 6250 */
            346, 347, 348, 349, 350, 351, 352, 353, 354, 355,
            356, 357, 358, 359, 360, 361, 362, 363, 364, 365,
            366, 367, 368, 369, 370, 371, 372, 373, 374, 375,
            376, 377, 378, 379, 380, 381, 382, 383, 384, 385,
            386, 387, 388, 389, 390, 391, 392, 393, 394, 395,   /* 6300 */
            2787,3781,4220
};

SEC_STAGE_CAND    struct_cand_char [SIZE_2ND_CAND];
CAND_RD_STRUCT    idx_buf;
short             InpAllLength;
short             RefStrokeLength;

/*---------------- Recognition rates   ----------------------------*/

RATE_STRUCT    rcg_result     [SIZE_2ND_CAND];
RATE_STRUCT    tot_rcg_result [SIZE_2ND_CAND];

/****************************************************************
 *
 * MODULE NAME: Preprocessing
 *
 ****************************************************************
 *
 * FILE NAME: olccr.c
 *
 ****************************************************************/ include <stdio.h>
include <stdlib.h> define MAX_POINTS       150
define MAX_SEGMENT_NO    80
#define NORMAL_SIZE       64
```

```
#define TH1          65
#define TH2          65
#define TH3          155
#define TH4          160
#define TH5          25
#define NOISE_1      15
#define NOISE_2      10
#define NOISE_4      9
#define NOISE_3      6
#define S_NOISE      150
#define CLKWISE      0
#define CCLKWISE     1
#define THE_SAME     2
#define AREA_DIVISOR 50    /* each sections about 50 degree */
#define PI_DEGREE    180
#define DATABASE     1
#define POINT_CLOSE 4
#define SKIP         0
#define SAVE         1
#define JOIN_THRESHOLD 35
define NEW_MERGE    1 struct OLCR_POINT {
   unsigned char x;
   unsigned char y;
   char    flag;
};

struct    COORD       /* corrdinate structure */
{
   unsigned char  x, y;
};

struct    SEGMENT_STRUCTURE {
   struct COORD   start_pt;   /* index to OLCR_POINT */
   struct COORD   end_pt;     /* index to OLCR_POINT */
   /* the following is optional */
   short   direction;
   unsigned char  length;
   char    flag;

unsigned char  dir_8c;
       unsigned char  pn_turn;

};

struct RECTANGLE {
```

```
   struct COORD   left_cornor;
   struct COORD   right_cornor;
};

short            nsegment_no;
extern  short            xmin, xmax, ymin, ymax;
static struct COORD    point[MAX_POINTS];
extern void      recognize_gfx();
extern short     cal_slope();
extern short     cal_ang_dif();
extern short     cal_distance();
extern short     filter();
struct   SEGMENT_STRUCTURE  tsegment[MAX_SEGMENT_NO];

void seg_extract ( olcr_pt_no, olcr_pt, segment_no, segment, range )

short            olcr_pt_no;
struct OLCR_POINT    *olcr_pt;
short            *segment_no;
struct SEGMENT_STRUCTURE  *segment;
struct RECTANGLE     *range;
{
   short  i, j, k, l, ll;
   struct SEGMENT_STRUCTURE *q, *p;
   char   buf[50];
   short  no;
   short  x1, x2, y1, y2;
   short  xx, yy, xnorm, ynorm;
   short  t1, t2;
   short  mm;

*segment_no = no = 0;
   p = tsegment;
   k = 0;
   xx = range->right_cornor.x - range->left_cornor.x + 1;
   yy = range->right_cornor.y - range->left_cornor.y + 1;
   t1 = range->left_cornor.x;
   t2 = range->left_cornor.y;
   xnorm = ynorm = NORMAL_SIZE;

if ( xx > yy ) ynorm = yy * NORMAL_SIZE / xx;
   else xnorm = xx * NORMAL_SIZE / yy;
     mm = olcr_pt_no - 1;
     for ( i = j = 0; i < olcr_pt_no; i++ ) {
        if ( (olcr_pt[i].flag != 0) && (j < mm) && (i != mm) ) {
           point[j].x = (unsigned char)(((short)olcr_pt[i].x - t1) * xnorm / xx);
           point[j].y = (unsigned char)(((short)olcr_pt[i].y - t2) * ynorm / yy);
```

```
#if DATABASE
        l = abs((point[j].x - point[j-1].x)) + abs((point[j].y - point[j-1].y));
        if ( l < POINT_CLOSE ) continue;
#else
        if ( connect(&point[j], &point[j-1]) ) continue;
#endif
        ll = 0;
        j++;
        if ( j == MAX_POINTS ) j--;
      }
      else {
        if ( (i <= mm)) {
          point[j].x = (unsigned char)(((short)olcr_pt[i].x - t1) * xnorm / xx);
          point[j].y = (unsigned char)(((short)olcr_pt[i].y - t2) * ynorm / yy);
          j++;
        }
        if ( j == 1 ) {
          j = 0;
          continue;
        }
        recognize_gfx(j, &point[0], p, &no);
        *segment_no += no;
#ifdef LIN_TEST
        for ( j = 0; j < no; j++, p++ ) {
          olcr_pt[k].x = p->start_pt.x;
          olcr_pt[k].y = p->start_pt.y;
          olcr_pt[k].flag = 4;
          k++;
        }
        p--;
        olcr_pt[k].x = p->end_pt.x;
        olcr_pt[k].y = p->end_pt.y;
        olcr_pt[k].flag = 0;
        k++;
#endif
        p += no;
        j = 0;
      }
    }
    seg_post(segment_no, tsegment, segment);
} short connect(p1, p2)
struct    COORD *p1, *p2;
{
    if ( (p1->x == p2->x) && (p1->y == p2->y) ) return 1;
    return 0;
```

```
}
seg_post(noadd, segment, nsegment)
short    *noadd;
struct SEGMENT_STRUCTURE   *segment;
struct SEGMENT_STRUCTURE   *nsegment;
{
   struct SEGMENT_STRUCTURE *p, *q, *r, temp, t1;
   short  i, j, k, xx, yy, n, no;
   short  scrn;
   char buf[50];
   char   flag_1, flag_2, f1, f2;

p = segment;
   n = 0;
   no = *noadd;
   for ( i = 0; i < no; i++, p++) {
      if ( n == 0 ) flag_1 = 0;
      else    flag_1 = nsegment[n-1].flag;
      flag_2 = p->flag;
      if ( p->length < NOISE_1 ) {
         if ( (p->length < NOISE_2) && (flag_1 == 0) ) {
            q = p+1;
            if ( (i != (no-1)) && flag_2 &&
                ((cal_ang_dif(p->direction, q->direction) < TH1)
                || ((p->length < NOISE_3) && (q->length > NOISE_1)))) {
               if ( p->length < q->length ) connect_next(p, q);
               else {
                  connect_last(p, q);
                  if ( q->flag ) {
                     (q+1)->start_pt = p->end_pt;
                  }
                  else p->flag = 0;
                  *q = *p;
               }
               continue;
            }
         }
         else if ( (p->length < NOISE_4) && ((i == (no-1)) || (flag_2 == 0)) ) {
            q = &nsegment[n-1];
            if ( flag_1
                && ((cal_ang_dif(p->direction, q->direction) < TH1)
                || ((p->length < NOISE_3) && (q->length > NOISE_1))) {
               connect_last(q, p);
               q->flag = 0;
               continue;
            }
         }
      }
```

```
      else if ( flag_1 && flag_2 ) {
         q = &nsegment[n-1];
         j = q->direction;
         r = p+1;
         f1 = (char) scan_dir(j, (p->direction / AREA_DIVISOR));
         f2 = (char) scan_dir(j, (r->direction / AREA_DIVISOR));
         if ( (f1 == THE_SAME) || (f2 == THE_SAME) ) f1 = f2;
         k = cal_ang_dif(q->direction, r->direction);
         if ( f1 == f2 ) {
            if ( ((k > TH2) || (k < TH5)) &&
                ((k < TH3) || (p->length <= NOISE_3)) ) {
               merge_pts(q, r, p);
               continue;
            }
         }
      }
   }
   if ( (flag_1 == 0) && flag_2 ) {
      q = p+1;
      if ( cal_ang_dif(p->direction, q->direction) < JOIN_THRESHOLD ) {
         connect_next(p, q);
         continue;
      }
   }
   else if ( flag_1 && (flag_2 == 0) ) {
      q = &nsegment[n-1];
      j = cal_ang_dif(p->direction, q->direction);
      if ( (j < JOIN_THRESHOLD) || ((p->length < NOISE_4) &&
          (j > S_NOISE)) ) {
         connect_last(q, p);
         q->flag = 0;
         continue;
      }
   }
   nsegment[n++] = *p;
 }
 *noadd = n;
} merge_pts(p1, p2, r)
struct SEGMENT_STRUCTURE *p1, *p2, *r;
{
 short i, j, k;
 short xx, yy;

xx = (int)p1->end_pt.x - (int)p1->start_pt.x;
 yy = (int)p1->end_pt.y - (int)p1->start_pt.y;
 k = cal_ang_dif(p1->direction, p2->direction);
```

```
    if ( k > 90 ) k = 90;
    k = k * 10 / 90;
    if ( k == 0 ) k = 1;
    xx = (short) ((short) p1->end_pt.x + ((xx * (short) r->length) / k / (short) p1->length));
    yy = (short) ((short) p1->end_pt.y + ((yy * (short) r->length) / k / (short) p1->length));
    if ( ( (xx < 0 ) || (xx >= 64) || (yy < 0) || (yy >= 64) ) {
        p1->end_pt.x = (unsigned char) ((r->start_pt.x + r->end_pt.x) >> 1);
        p1->end_pt.y = (unsigned char) ((r->start_pt.y + r->end_pt.y) >> 1);
    }
    else {
        p1->end_pt.x = (unsigned char) xx;
        p1->end_pt.y = (unsigned char) yy;
    }
    p2->start_pt = p1->end_pt;
    p1->direction = cal_slope(&p1->start_pt, &p1->end_pt);
    p1->length = (unsigned char) cal_distance(&p1->start_pt, &p1->end_pt);
    p2->direction = cal_slope(&p2->start_pt, &p2->end_pt);
    p2->length = (unsigned char) cal_distance(&p2->start_pt, &p2->end_pt);
} connect_next(p1, p2)
struct SEGMENT_STRUCTURE *p1, *p2;
{
    short   i, j, k;
    short   xx, yy;

#if NEW_MERGE
    p2->start_pt = p1->start_pt;
#else
    xx = (int)p2->start_pt.x - (int)p2->end_pt.x;
    yy = (int)p2->start_pt.y - (int)p2->end_pt.y;
    xx = p2->start_pt.x + (xx * p1->length / p2->length);
    yy = p2->start_pt.y + (yy * p1->length / p2->length);
    if ( ( (xx < 0 ) || (xx >= 64) || (yy < 0) || (yy >= 64) ) {
        p2->start_pt.x = (p1->start_pt.x + p1->end_pt.x) >> 1;
        p2->start_pt.y = (p1->start_pt.y + p1->end_pt.y) >> 1;
    }
    else {
        p2->start_pt.x = xx;
        p2->start_pt.y = yy;
    }
#endif
    p2->direction = cal_slope(&p2->start_pt, &p2->end_pt);
    p2->length = (unsigned char) cal_distance(&p2->start_pt, &p2->end_pt);
} connect_last(p1, p2)
struct SEGMENT_STRUCTURE *p1, *p2;
```

```c
{
  short   i, j, k;
  short   xx, yy;

#if NEW_MERGE
   p1->end_pt = p2->end_pt;
#else
   xx = (int)p1->end_pt.x - (int)p1->start_pt.x;
   yy = (int)p1->end_pt.y - (int)p1->start_pt.y;
   xx = p1->end_pt.x + (xx * p2->length / p1->length);
   yy = p1->end_pt.y + (yy * p2->length / p1->length);
   if ( (xx < 0 ) || (xx >= 64) || (yy < 0) || (yy >= 64) ) {
      p1->end_pt.x = (p2->start_pt.x + p2->end_pt.x) >> 1;
      p1->end_pt.y = (p2->start_pt.y + p2->end_pt.y) >> 1;
   }
   else {
      p1->end_pt.x = xx;
      p1->end_pt.y = yy;
   }
#endif
   p1->direction = cal_slope(&p1->start_pt, &p1->end_pt);
   p1->length = (unsigned char) cal_distance(&p1->start_pt, &p1->end_pt);
} scan_dir(s, e)
short   s, e;
{
   short   x, j;

if ( e == s ) return THE_SAME;
   if ( e > s ) {
      if ( (e - s) > PI_DEGREE ) return CCLKWISE;
      else return CLKWISE;
   }
   else {
      if ( (s - e) > PI_DEGREE ) return CLKWISE;
      else return CCLKWISE;
   }
}

/*****************************************************************
 *
 * FILE NAME: latan.c
 *
 *****************************************************************/
```

```c
#include <stdio.h>
define MAX_VALUE   71500 static char atan_tab[]={
  0,  1,  2,   3,  4,  5,   6,  7,  9, 10, 11, 12, 13, 14, 15, 16, 17, 18, 19, 20,
 21, 22, 23,  24, 25, 26, 27, 28, 29, 30, 30, 31, 32, 33, 34, 34, 35, 36, 37, 37,
 38, 39, 40,  40, 41, 41, 42, 43, 43, 44, 45, 46, 47, 48, 50, 51, 52, 53, 54, 55,
 56, 57, 57,  58, 59, 60, 60, 61, 62, 62, 63, 63, 64, 65, 65, 66, 66, 66, 67, 67,
 68, 69, 70,  72, 73, 74, 74, 75, 76, 76, 77, 77, 78, 78, 79, 79, 80, 80, 80, 80,
 81, 83, 85,  85, 86, 86, 87, 87, 87, 88,
};

static short cut_pt[]= { 0, 100, 250, 650, 3150, -1 };
static short interval[] = { 2, 5, 20, 250 };
static char  index[] = {0, 50, 80, 100 };

char em_atan();

char em_atan(degree)
short     degree;
{
   short i, j, k;

if ( degree == 0 ) return 0;
   if ( degree < 0 ) {
      k = -1;
      degree = -degree;
   }
   else k = 1;
   for ( i = 0; cut_pt[i] != -1; i++ ) {
      if ( degree < cut_pt[i] ) break;
   }
   if ( cut_pt[i] == -1 ) degree = 90;
   else {
      i--;
      degree = atan_tab[index[i] + ((degree - cut_pt[i])/interval[i])];
   }
   return ( (char) (degree * k));
}

/**********************************************************************
 *
 * FILE NAME  extract.c
 *
 **********************************************************************/ include <stdio.h>
```

```c
#include <stdlib.h>
include <math.h> define GFX_BUFFER      300     /* maximum buffer */
define SLOPE_THRESHOLD 25      /* slope tolerant threshold */
#define JOIN_THRESHOLD  35      /* slope tolerant threshold */
#define LINE_THRESHOLD  15      /* line tolerant threshold */
#define POINT_CLOSE 3           /* for merge points */
#define CIRCLE_THRESHOLD 60     /* circle tolerant threshold  (unit % )*/

/* #define PI       3.14159      PI */
#define PI_DEGREE   180
#define MARK_SIZE   8           /* divide 360 into 8 sections */
#define AVG_AREA    4           /* 360/MARK_SIZE/2 */
#define AREA_DIVISOR    50      /* each sections about 50 degree */
#define ARC_THRESHOLD 20        /* arc tolerant threshold */
#define NOISE_THRESHOLD 4       /* distance for remove points */
#define ARC_NOISE   75          /* threshold for arc detection */
#define MAX_LINE_SEGMENT 30     /* maximum line segments allowable */
#define CLOSE_THRESHOLD 12      /* the threshold for pts close or not */
#define CLOSE_THRESHOLD_2 18    /* the threshold for pts close or not */
#define OVER_THRESHOLD  4       /* the last points process threshold */
#define CLKWISE     0
#define CCLKWISE    1
#define THE_SAME    2
#define CIRCLE_DEGREE 360
define NORMAL_SIZE     64 struct   COORD          /* corrdinate structure */
{
   unsigned char x, y;
};

struct   SEGMENT_STRUCTURE {
    struct COORD   start_pt,    /* index to OLCR_POINT */
    struct COORD   end_pt;      /* index to OLCR_POINT */
    /* the following is optional */
    short   direction;
    unsigned char   length,
    char    flag;

unsigned char  dir_8c;
        unsigned char  pn_turn,

};
```

```
struct    GFX_STRUCTURE    { /* gfx intermediate structure */
   short    index;       /* index to original points */
   short    slope,       /* slope between last point */
};

static    short            gfx_ptr;
static    struct GFX_STRUCTURE gfx[GFX_BUFFER];
static    char             area_mark[MARK_SIZE];   /* mark area for circle dectection */
static    struct COORD    *gfx_pt;
static    short            turn[100], turn_index;  /* 轉折點儲存區 */
static    short            previous_mark ;
static    short            fail_circle;
static    unsigned char    xx1, xx2, yy1, yy2, short cal_slope();
short cal_ang_dif();
short noise_check(),
short cal_distance();
void  organize_pt(),
void  find_circle_boundary();
void  arc_line_test();
short arc_detect();
short closure();
void  recognize_gfx();
short check_arc_dir();

short check_arc_dir(s, e)
short s, e;
{
   if ( e == s ) return THE_SAME,
   if ( e > s ) {
      if ( (e - s) > AVG_AREA ) return CCLKWISE,
      else return CLKWISE;
   }
   else {
      if ( (s - e) > AVG_AREA ) return CLKWISE;
      else return CCLKWISE;
   }
} short cal_distance(cor1, cor2)
struct    COORD *cor1, *cor2;
{
   long    dis;
```

```
    short    xx, yy;

xx = (short) cor1->x - (short) cor2->x;
    yy = (short) cor1->y - (short) cor2->y;
    dis = (long)xx * xx + (long)yy * yy;
    return ((short)sqrt((float)dis));
} short cal_slope(cor1, cor2)
struct    COORD *cor1, *cor2;
{
short    xx, yy, i, j;
short    temp;

xx = cor2->x - cor1->x;
    yy = cor2->y - cor1->y;
    if ( xx != 0 ) {
       temp = em_atan((short) ( (long)yy * 100 / xx));
       if ( (xx*yy) >= 0 ) {
          if ( xx < 0 ) temp += PI_DEGREE;
       }
       else {
          if ( yy < 0 ) temp += PI_DEGREE + PI_DEGREE;
          else temp += PI_DEGREE;
       }
    }
    else temp = (yy >= 0) ? (90) : (270);
    return((short)temp);
} short cal_ang_dif(t1, t2)
short    t1, t2;
{
short    i;

i = abs(t1 - t2);
    return ((i < 180) ? (i) : (CIRCLE_DEGREE - i));
} short noise_check(cor1, cor2)
struct    COORD *cor1, *cor2;
{ if ( (abs(cor2->x - cor1->x) < NOISE_THRESHOLD) &&
         (abs(cor2->y - cor1->y) < NOISE_THRESHOLD)) return 1;
    else return 0;
}
```

```
void organize_pt(no)
short     no;
{
   short    i, j, k, n;
   struct COORD  q;
   short    dir;
   char     buf[40];
   short    err1, err2;

gfx[0].index = 0; /* initiate the original points */
   xx1 = yy1 = 127;
   xx2 = yy2 = 0;
   gfx[0].slope = 0;
   q = gfx_pt[0];
   previous_mark = -1;
   fail_circle = 0;
   err1 = err2 = 0;
   n = 0;
   gfx_ptr = 1; /* reset the pointer to 1 because of original pt */
   for ( i = 1; i < no; i++ ) {
       /* skip the same coordinate pts */
       j = abs((gfx_pt[i].x - gfx_pt[n].x)) + abs((gfx_pt[i].y - gfx_pt[n].y));
       if ( j < POINT_CLOSE ) continue;
       else n = i;

/* calculate slope */
       if ( gfx_pt[i].x < xx1 ) xx1 = gfx_pt[i].x;
       if ( gfx_pt[i].x > xx2 ) xx2 = gfx_pt[i].x;
       if ( gfx_pt[i].y < yy1 ) yy1 = gfx_pt[i].y;
       if ( gfx_pt[i].y > yy2 ) yy2 = gfx_pt[i].y;
       gfx[gfx_ptr].slope = cal_slope(&q, &gfx_pt[i]);
       gfx[gfx_ptr].index = i;
       /* for CIRCLE dectection --- used in arc_line_test() */
       j = gfx[gfx_ptr].slope / AREA_DIVISOR;
       area_mark[j] = 1;
       if ( gfx_ptr >= 6 ) {
          if ( gfx_ptr == 6 ) {
             dir = check_arc_dir((gfx[3].slope / AREA_DIVISOR), j);
          }
          else {
             if ( (previous_mark != j) &&
                (dir != check_arc_dir(previous_mark, j)) ) err1++;
          }
       }
#ifdef lose_pts
       if ( previous_mark != -1 ) {
          k = j - previous_mark;
```

```
        k = abs(k);
        if ( k > AVG_AREA ) k = 8 - k;
        if ( k > 2 ) err2++;
    }
#endif
    previous_mark = j;
    q = gfx_pt[i];
    gfx_ptr++;
  }
  sprintf(buf, "err1=%2d, gfx_ptr=%2d", err1, gfx_ptr);
  fail_circle = err1 + err2 + 1;
} void find_circle_boundary(begin, end, p)
short    begin, end;
struct   SEGMENT_STRUCTURE *p;
{
  short   i, j;
  short   x1, x2, y1, y2;

x1 = x2 = gfx_pt[gfx[begin].index].x;
  y1 = y2 = gfx_pt[gfx[begin].index].y;
  for ( i = begin; i < end; i++ ) {
      if ( (short) gfx_pt[gfx[i].index].x < x1 ) x1 = (short) gfx_pt[gfx[i].index].x;
      if ( (short) gfx_pt[gfx[i].index].x > x2 ) x2 = (short) gfx_pt[gfx[i].index].x;
      if ( (short) gfx_pt[gfx[i].index].y < y1 ) y1 = (short) gfx_pt[gfx[i].index].y;
      if ( (short) gfx_pt[gfx[i].index].y > y2 ) y2 = (short) gfx_pt[gfx[i].index].y;
  }
  p->start_pt.x = (unsigned char) x1;
  p->start_pt.y = (unsigned char) y1;
  p->end_pt.x = (unsigned char) x2;
  p->end_pt.y = (unsigned char) y1;
  p->direction = (short) 0;
  p->length = (unsigned char) (x2 - x1);
  p++;
  p->start_pt.x = (unsigned char) x2;
  p->start_pt.y = (unsigned char) y1;
  p->end_pt.x = (unsigned char) x2;
  p->end_pt.y = (unsigned char) y2;
  p->direction = (short) 270;
  p->length = (unsigned char) (y2 - y1);
  p++;
  p->start_pt.x = (unsigned char) x2;
  p->start_pt.y = (unsigned char) y2;
  p->end_pt.x = (unsigned char) x1;
  p->end_pt.y = (unsigned char) y2;
  p->direction = (short) 180;
```

```c
    p->length = (unsigned char) (x2 - x1);
    p++;
    p->start_pt.x = (unsigned char) x1;
    p->start_pt.y = (unsigned char) y2;
    p->end_pt.x = (unsigned char) x1;
    p->end_pt.y = (unsigned char) y1;
    p->direction = (short) 90;
    p->length = (unsigned char) (y2 - y1);
} void arc_line_test(no, p, seg_no)
short      no;
struct     SEGMENT_STRUCTURE  *p;
short      *seg_no;
{
    short    i, j, k;
    short    initial_slope;
    short    tslope[100];
    char     tmp[3];
    short    temp, arc_flag, mark_flag;
    char     buf[50];

turn_index = arc_flag = mark_flag = 0;  /* initiate */
    turn[turn_index++] = gfx[0].index;

/* compute the 360 degree travelling flag */
    for ( i = 0; i < MARK_SIZE; i++ ) if ( area_mark[i] ) mark_flag++;
    /* calculate the turn points first time */
    for ( i = 1; i < (gfx_ptr-1); i++ ) {
        k = cal_slope( &gfx_pt[turn[turn_index-1]], &gfx_pt[gfx[i].index]);
        if ( (cal_ang_dif(gfx[i].slope, gfx[i+1].slope) > SLOPE_THRESHOLD) ||
            ( cal_ang_dif(gfx[i-1].slope, k) > SLOPE_THRESHOLD) ) {
            /* possible turn point */
            if ( noise_check(&gfx_pt[gfx[i].index],&gfx_pt[turn[turn_index-1]]) )
                continue; /* if noise => not turn points */
                          /* otherwise => accept */
            tslope[turn_index] = k;
                    /* record the slope in this segment */ turn[turn_index++] = gfx[i].index;   /******/
                    /* record the turn coordinate pointer */
                    /* turn 存轉換過指標 */
        }
    }
    if ( turn_index == 1 ) {
        tslope[turn_index] = cal_slope( &gfx_pt[turn[turn_index-1]],
                        &gfx_pt[gfx[gfx_ptr-1].index]);
        turn[turn_index++] = gfx[gfx_ptr-1].index;
```

```c
}
    /* the following is to adjust the end points */
    if ( cal_distance(&gfx_pt[gfx_ptr-1].index], &gfx_pt[turn[turn_index-1]]) >
        OVER_THRESHOLD ) {
        tslope[turn_index] = cal_slope(&gfx_pt[turn[turn_index-1]],
                        &gfx_pt[gfx[gfx_ptr-1].index]);
        turn[turn_index++] = gfx[gfx_ptr - 1].index;
    }
    else {
        turn[turn_index-1] = gfx[gfx_ptr-1].index;
        tslope[turn_index-1] = cal_slope(&gfx_pt[turn[turn_index-2]],
                        &gfx_pt[gfx[gfx_ptr-1].index]);
    }
    tslope[0] = tslope[1];   /* 為計算方便 */ j = turn_index;
    tslope[turn_index] = tslope[turn_index-1] - JOIN_THRESHOLD * 3;
    if ( tslope[turn_index] > CIRCLE_DEGREE ) tslope[turn_index] -= CIRCLE_DEGREE;
    /* 預留下面 do-loop 之結束條件 */
    turn[turn_index] = gfx[gfx_ptr-1].index;
    turn_index = 0;
    i = 0;
    do {   /* merge segments to larger ones and detect arc condition */
        k = i;
        while ( cal_ang_dif(tslope[i+1], tslope[k]) < JOIN_THRESHOLD ) {
            i++;
            tslope[k] = cal_slope(&gfx_pt[turn[k]], &gfx_pt[turn[i]]);
        }
        if ( arc_detect(turn[k], (turn[i+1]-1), tslope[k]) ) {
            /* if ARC type => count the points in arc_flag */
            arc_flag += turn[i+1] - turn[k] + 1;
        }
        turn[++turn_index] = turn[i];
        i++;
    } while ( i < j );

/* check circle condition */
    sprintf(buf, "arc=%3d, no=%3d, close=%ld, mark=%ld", arc_flag, no, closure(),
mark_flag);

#define TEST_ARC 1
#ifdef TEST_ARC
    if ( ((arc_flag*100 / no) > CIRCLE_THRESHOLD) ) {
        if ( (mark_flag >= 6) && (fail_circle < 5) && closure() ) {
            /* calculate the boundary of CIRCLE */
            find_circle_boundary(0, gfx_ptr, p);
            *seg_no = 4;
            return ;
```

33

```c
        }
    }
#endif
    if ( turn_index >= MAX_LINE_SEGMENT ) {
        *seg_no = -1;
        return ;
    }
    *seg_no = turn_index;
    for ( i = 0; i < turn_index; i++ ) {
        j = cal_slope(&gfx_pt[turn[i]], &gfx_pt[turn[i+1]]);
        p->start_pt.x = (unsigned char) gfx_pt[turn[i]].x;
        p->start_pt.y = (unsigned char) gfx_pt[turn[i]].y;
        p->end_pt.x = (unsigned char) gfx_pt[turn[i+1]].x;
        p->end_pt.y = (unsigned char) gfx_pt[turn[i+1]].y;
        p->direction = (short) j;
        p->length = (unsigned char) cal_distance(&gfx_pt[turn[i]], &gfx_pt[turn[i+1]]);
        p->flag = (char) 4;
        p++;
    }
    (p-1)->flag = 0;
} short arc_detect(begin, end, slope)
short      begin, end, slope;
{
    struct GFX_STRUCTURE *p;
    short    cnt, sum;
    short    i, j;

if ( end == begin ) return 0;   /* omit the error */
    p = &gfx[begin];
    cnt = sum = 0;  /* sum --- difference */
                    /* cnt --- number of difference */
    for ( i = begin; i <= end; i++, p++) {
        j = cal_ang_dif(p->slope, slope);
        if ( j > ARC_NOISE ) continue;   /* remove noise */
        sum += j;
        cnt++;
    }
    if ( cnt != 0 ) sum /= cnt; /* avoid divide by zero */
    else sum = ARC_THRESHOLD + 1;
    if ( sum > ARC_THRESHOLD ) return 1;
    else return 0;
} short closure()
{
    struct COORD   *p, q;
```

```
  short  i, j, k;
  short  th1, th2;

k = xx2 - xx1;
  j = yy2 - yy1;
  if (k > j) j = k;
  th1 = CLOSE_THRESHOLD * j / NORMAL_SIZE;
  th2 = CLOSE_THRESHOLD_2 * j / NORMAL_SIZE;
  p = &gfx_pt[0];
  k = gfx_ptr - (gfx_ptr / 5);  /* the last 1/5 points */
  for ( i = k; i < gfx_ptr; i++ ) {
    if ( cal_distance(p, &gfx_pt[gfx[i].index]) < CLOSE_THRESHOLD) {
      if ( cal_distance(&gfx_pt[gfx[i].index], &gfx_pt[gfx[gfx_ptr-1].index]) <
        CLOSE_THRESHOLD_2 ) return 1;
    }
    q.x = (unsigned char) ((gfx_pt[gfx[i].index].x - gfx_pt[gfx[i-1].index].x ) >> 1);
    q.y = (unsigned char) ((gfx_pt[gfx[i].index].y - gfx_pt[gfx[i-1].index].y ) >> 1);
    if ( cal_distance(p, &q) < CLOSE_THRESHOLD) {
      if ( cal_distance(&q, &gfx_pt[gfx[gfx_ptr-1] index]) <
        CLOSE_THRESHOLD_2 ) return 1;
    }
  }
  return 0;
} void recognize_gfx(no, pt_buf, p, seg_no)
short    no;
struct   COORD *pt_buf;
struct   SEGMENT_STRUCTURE *p;
short    *seg_no;
{
  short  i, j, k;

memset(area_mark, 0, MARK_SIZE);
  gfx_pt = pt_buf;
  organize_pt(no);
  arc_line_test(no, p, seg_no);
}

/*************************************************************************
 */
/* File Name: PPROC.C                                        */
/*---------------------------------------------------------------*/
/* MBR_char       ( olcr_pt_no, olcr_pt, range )             */
/* NormalizeSize()                                           */
```

```
/*----------------------------------------------------------------*/
/* quant_and_merge_coll_neighbor ( seg1_a, seg1_a_cnt, delta_dir ) */
/* stroke_info_construction    ( input_stroke, f_seg_cnt, f_seg)   */
/*----------------------------------------------------------------*/
/* length         ( xs, ys, xe, ye)                     */
/* orientation    ( xs, ys, xe, ye)                     */
/* quantize       ( dir, cycle, tot_quantization )      */
/* counter_clock  ( cycle, half_cycle, di, dj)          */
/*****************************************************************
*/ include <stdio.h>
include <stdlib.h>
include <math.h>
include <errno.h> include "extern.c"

/*----------------------------------------------------------------*/
/* MBR_char : Computing the minimum bounding rectangle for each character */
/*----------------------------------------------------------------*/ void MBR_char ( olcr_pt_no, olcr_pt, range )
short          olcr_pt_no;
OLCR_POINT     *olcr_pt;
RECTANGLE      *range;
{
unsigned char  max_x, min_x, max_y, min_y;
short          i;

olcr_pt [olcr_pt_no].flag = (char) 0;

max_x=0; min_x=255; max_y=0; min_y=255;
    for( i=0; i<olcr_pt_no; i++)
       {
       if (olcr_pt [i].x > max_x)   max_x = olcr_pt [i].x;
       if (olcr_pt [i].x < min_x)   min_x = olcr_pt [i].x;

if (olcr_pt [i].y > max_y)   max_y = olcr_pt [i].y;
       if (olcr_pt [i].y < min_y)   min_y = olcr_pt [i].y;
       } range->left_cornor.x  = min_x;
    range->left_cornor.y  = min_y;
    range->right_cornor.x = max_x;
    range->right_cornor.y = max_y;
```

```
void NormalizeSize()
{
   short   i;
   short   XMin, XMax, YMin, YMax;
   float   XRatio, YRatio, x, y;

XMin = (short )255;
   YMin = (short )255;
   XMax = (short )0;
   YMax = (short )0;
   for (i = input_stroke[1].fv_sp; i <= (int )input_stroke[inp_stk_cnt].fv_ep; i++)
   {
      if ((short )f_seg[i].start_pt.x > XMax) XMax = (short )f_seg[i].start_pt.x;
      if ((short )f_seg[i].start_pt.y > YMax) YMax = (short )f_seg[i].start_pt.y;
      if ((short )f_seg[i].start_pt.x < XMin) XMin = (short )f_seg[i].start_pt.x;
      if ((short )f_seg[i].start_pt.y < YMin) YMin = (short )f_seg[i].start_pt.y;
      if ((short )f_seg[i].end_pt.x > XMax)   XMax = (short )f_seg[i].end_pt.x;
      if ((short )f_seg[i].end_pt.y > YMax)   YMax = (short )f_seg[i].end_pt.y;
      if ((short )f_seg[i].end_pt.x < XMin)   XMin = (short )f_seg[i].end_pt.x;
      if ((short )f_seg[i].end_pt.y < YMin)   YMin = (short )f_seg[i].end_pt.y;
   }
   XRatio = (float )63.0 / (float )(XMax - XMin);
   YRatio = (float )63.0 / (float )(YMax - YMin);
   for (i = (short )input_stroke[1].fv_sp; i <= (short )input_stroke[inp_stk_cnt].fv_ep; i++)
   {
      x = (float)(f_seg[i].start_pt.x - XMin);
      x = x * XRatio;
      y = (float)(f_seg[i].start_pt.y - YMin);
      y = y * YRatio;
      f_seg[i].start_pt.x = (unsigned char )(x);
      f_seg[i].start_pt.y = (unsigned char )(y);

x = (float)(f_seg[i].end_pt.x - XMin);
      x = x * XRatio;
      y = (float)(f_seg[i].end_pt.y - YMin);
      y = y * YRatio;
      f_seg[i].end_pt.x = (unsigned char )(x);
      f_seg[i].end_pt.y = (unsigned char )(y);
   }
}

/*------------------------------------------------------------------*/
/*  quant_and_merge_coll_neighbor : quantize and merge collinear neighbor  */
/*     stroke segments in seg1_a, and store the results into seg2_b.       */
```

```c
/*--------------------------------------------------------------*/
short quant_and_merge_coll_neighbor ( f_seg, f_seg_cnt, cycle, tot_quantization )

SEGMENT_STRUCT_1    *f_seg;
short               f_seg_cnt;
short               cycle, tot_quantization;
{
short       i1, i, j1, j;
short       dir_8c;

/*----------------------------------------------*/
    /* Eliminate the segment with zero length.     */
    /*----------------------------------------------*/ for (i=0; i<f_seg_cnt; i++)
    {
       if ( (f_seg [i].start_pt.x == f_seg [i].end_pt.x) &&
            (f_seg [i].start_pt.y == f_seg [i].end_pt.y) )
       {
          if ((f_seg [i].flag == 0) && (i > 0))
             f_seg [i-1].flag = f_seg [i].flag;

for (j1=i, j=i+1; j<f_seg_cnt; j++, j1++)
          {
             f_seg [j1].start_pt.x = f_seg [j].start_pt.x;
             f_seg [j1].start_pt.y = f_seg [j].start_pt.y;
             f_seg [j1].end_pt.x   = f_seg [j].end_pt.x;
             f_seg [j1].end_pt.y   = f_seg [j].end_pt.y;
             f_seg [j1].flag       = f_seg [j].flag;

f_seg [j1].direction  = f_seg [j].direction;
             f_seg [j1].length     = f_seg [j].length;

} i--;
          f_seg_cnt --;
       }
    }

/*--------------------------------------------------------*/
    /* Compute the quantized direction.                      */
    /*--------------------------------------------------------*/ for (i=0; i<f_seg_cnt; i++)
```

38

```
{
dir_8c = quantize   ( f_seg [i].direction, cycle, tot_quantization );
f_seg [i].dir_8c  = c_BIT [dir_8c];
}

/*------------------------------------------------------------*/
/* Merge the segments with collinear quantized direction. */
/*------------------------------------------------------------*/ for (i=1, i1=0; i<f_seg_cnt; i++)
  {
  if ( f_seg [i1].flag != 0 )
      { if ( f_seg [i1].dir_8c == f_seg [i].dir_8c )
         {   /*   merge   */ f_seg [i1].end_pt.x    = f_seg [i].end_pt.x;
         f_seg [i1].end_pt.y    = f_seg [i].end_pt.y;
         f_seg [i1].flag        = f_seg [i].flag;

f_seg [i1].direction   = orientation (f_seg [i1].start_pt.x,
           f_seg [i1].start_pt.y, f_seg [i1].end_pt.x, f_seg [i1].end_pt.y);

dir_8c = quantize    ( f_seg [i].direction, cycle, tot_quantization );
         f_seg [i1].dir_8c  = c_BIT [dir_8c];

f_seg [i1].length   = (unsigned char) length (f_seg [i1].start_pt.x,
           f_seg [i1].start_pt.y, f_seg [i1].end_pt.x, f_seg [i1].end_pt.y);

for ( j1=i, j=i+1; j<f_seg_cnt; j++, j1++ )
            {
            f_seg [j1].start_pt.x = f_seg [j].start_pt.x;
            f_seg [j1].start_pt.y = f_seg [j].start_pt.y;
            f_seg [j1].end_pt.x   = f_seg [j].end_pt.x;
            f_seg [j1].end_pt.y   = f_seg [j].end_pt.y;
            f_seg [j1].flag       = f_seg [j].flag;

f_seg [j1].direction = f_seg [j].direction;
            f_seg [j1].dir_8c    = f_seg [j].dir_8c;

f_seg [j1].length    = f_seg [j].length;
            } f_seg_cnt --;
         i --;
         }
```

```
            else {
                i1 = i;
            }
        }
        else {
            i1 = i;
        }
    } return (f_seg_cnt);

} short stroke_info_construction (input_stroke, f_seg_cnt, f_seg)

short              f_seg_cnt;
INPUT_STROKE_STRUCT  *input_stroke;
SEGMENT_STRUCT_1     *f_seg;

{
short     inp_stk_cnt, inp_stk_idx;
short     i, i1, c_fg;

for (i=0, i1=-1, inp_stk_idx=1, input_stroke [1] fv_sp=0,
         i<f_seg_cnt; i++)
    { if ( (i1 >= 0) && (f_seg [i1].flag != 0) )
        {
            c_fg = counter_clock  ( 360, 180, f_seg [i1].direction, f_seg [i].direction);
            f_seg [i1].n_turn = c_BIT [c_fg];
        } if ( f_seg [i].flag == 0 )
        {
            input_stroke [inp_stk_idx].fv_ep= (unsigned char) i;

inp_stk_idx ++;
            input_stroke [inp_stk_idx].fv_sp= (unsigned char) (i+1);

f_seg [i].n_turn = (unsigned char) 0;
            f_seg [i].n_turn |= c_BIT [0];
```

```
        f_seg [i].n_turn |= c_BIT [1];
        } i1 = i;
    } inp_stk_cnt = inp_stk_idx - 1;

return (inp_stk_cnt);
}
```

```
/*------------------------------------------------------------*/
/* Function Name: length (xs, ys, xe, ye)                     */
/*------------------------------------------------------------*/
/* Description of Arguments:                                  */
/*        xs, ys:   the location of the start point           */
/*        xe, ye:   the location of the end point             */
/*------------------------------------------------------------*/
/* Description: evaluate the Euclidean distance of two points */
/*------------------------------------------------------------*/ float length (xs, ys, xe, ye)
short       xs, ys, xe, ye;
{
extern double sqrt ();
    long   sdx, sdy;
    double val;
    float  rval;

sdx = xs - xe ;
    sdx *= sdx ;
    sdy = ys - ye ;
    sdy *= sdy;
    val = sdx + sdy;
    rval= (float) sqrt ( (double) val);
    return (rval);
}
```

```
/*------------------------------------------------------------*/
/* Function Name: orientation   (xs, ys, xe, ye)              */
/*------------------------------------------------------------*/
/* Description of Arguments                                   */
/*        xs, ys:   the location of the start point           */
/*        xe, ye:   the location of the end point             */
/*------------------------------------------------------------*/
/* Description: evaluate orientation of two points            */
```

```
/*-----------------------------------------------------------*/ short orientation (xs, ys, xe, ye)
short          xs, ys, xe, ye;
{
define  PI   3.141592653 extern double atan2 ();
    double deta_x, deta_y;
    double radian;      /* -pi <= radian < pi */
    double df_degree;
    short  degree;      /* 0 <= degree < 360; degree==500 --> nonexist */ deta_x = xe - xs;
  deta_y = ye - ys;

if (deta_x == 0)
     {
     if (deta_y > 0)   { degree = 90; goto rt; }
     if (deta_y < 0)   { degree =270; goto rt; }
     if (deta_y == 0)  { degree =500, goto rt; }
     } if (deta_y == 0)
     {
     if (deta_x > 0)   { degree =  0; goto rt; }
     if (deta_x < 0)   { degree =180; goto rt; }
     } radian = atan2 (deta_y, deta_x);

df_degree = radian * 180.0 / PI;
  degree = (short) df_degree;

if (degree < 0)   degree += 360;

rt: return (degree);
} short quantize   ( dir, cycle, tot_quantization )
short            dir, cycle, tot_quantization;
{
float  step, t_quant;
short  quant;

step = (float) cycle / (float) tot_quantization;
  t_quant = (float) dir / step + 0.5;
```

```
    quant = (short) t_quant;

if (quant == tot_quantization)    quant = 0;

return (quant);
} short counter_clock    ( cycle, half_cycle, di, dj)
short                  cycle, half_cycle, di, dj;
{
short      del_d, abs_d;

del_d = dj - di;
    abs_d = abs (del_d);

if ( abs_d >= half_cycle )
       {
         if ( del_d > 0 )
            del_d = del_d - cycle;
         else del_d = del_d + cycle;
       } if ( del_d > 0 )
       return (1);      /*  counterclockwise    */
    else return (0);    /*  clockwise           */
}

/****************************************************/
/*  MODULE NAME: Basic Stroke Recognition           */
/*--------------------------------------------------*/
/*  File Name: stk_reg.c                            */
/****************************************************/ include <stdio.h>
include "extern.c"

short      quantize ();

/*--------------------------------------------------*/
/*  Reg_stroke : recognize the stroke of an input character  */
/*--------------------------------------------------*/ unsigned char    Reg_stroke (max_accept_code, start_idx, end_idx, f_seg, result)
```

43

```
unsigned char   max_accept_code;
short           start_idx, end_idx;
SEGMENT_STRUCT_1 *f_seg;
short           result [2];
{
 typedef struct vector {
        short       direction;
        unsigned char   dir_8c;     /* dir */
        unsigned char   pn_turn;
            char    ratio;
        unsigned short  b_ratio;
        } VECTOR;

VECTOR     a [20];

short      fv_idx, a_lp, a_idx;
 short      i, lsptr;
 unsigned char  j;
 short      fno1, fno2, fno3;
 short      tot_stk_length, error_count, perror;
 unsigned char  error_location, min_error_location;
 short      c_fg;
 short      min;
 short      tb_stroke_entry_no;
 unsigned char  stroke_code;
 char       delete_TH;
 char       flag_resegment;

/*---------------------------------------------------------*/
/* compute the total length of segments in the input stroke */
/*---------------------------------------------------------*/ for (fv_idx=start_idx, tot_stk_length=0; fv_idx<=end_idx; fv_idx++)
    tot_stk_length += (short) f_seg [fv_idx].length;

/*---------------------------------------------------------*/
/* compute the ratio of each segment in the input stroke. */
/*---------------------------------------------------------*/ fno2 = tot_stk_length;
 for (fv_idx=start_idx, a_idx=0; fv_idx <= end_idx; fv_idx ++)
    {
    fno1 = (short) f_seg [fv_idx].length;
    fno3 = (fno1 * (short) 160 / fno2 + (short) 5) / (short) 10;
```

```
    if (fno3 != 0)
        {
        a [a_idx].direction = f_seg [fv_idx].direction;
        a [a_idx].dir_8c   = f_seg [fv_idx].dir_8c;
        a [a_idx].ratio    = (char) fno3;
        a [a_idx].b_ratio  = s_BIT [fno3-1];

if (a_idx == (short) 0 )
            {
            a [a_idx].pn_turn = (unsigned char) 0x0c;
            }
        else {
            a [a_idx].pn_turn = (unsigned char) ((a [a_idx-1].pn_turn << 2) & 0x0c);
            }
        a [a_idx].pn_turn |= f_seg [fv_idx].n_turn;

a_idx ++;
        } else {
        if ( (a_idx != (short) 0 ) && (fv_idx != end_idx))
            {
            c_fg = counter_clock ( 360, 180, a [a_idx-1].direction, f_seg [fv_idx-1].direction);
            a [a_idx-1].pn_turn = (unsigned char) ((a [a_idx-1].pn_turn & 0x0c) | c_BIT
[c_fg]);
            }
        }
    }
 a_lp=a_idx-1;

perror = (short) 0; flag_resegment=(short) 0;

/*------------------------------------------------------------*/
/* Start stroke recognition.                      */
/*------------------------------------------------------------*/
/* The input stroke are matched with the stroke table entries. */
/* Each entry represents one stroke type vector representation */
/*------------------------------------------------------------*/ stk_rcg:

for (i=0, min = 18, tb_stroke_entry_no = 200; i<=lp_tb_stroke; i++)
        {

/*--------------------------------------------*/
```

45

```
/* Compare the linesegment string of the input */
/* stroke with one entry of the stroke table   */
/*--------------------------------------------*/ for (j= (unsigned char) 1, error_count=perror, error_location=0, a_idx=0,
lsptr=tb_stroke [i].lssp;
        j<=tb_stroke [i].lscnt; j ++, lsptr ++)
        {
        /*---------------------------*/
        /* necessary condition search */
        /*---------------------------*/ while (1)
            {
            if ( ( (a [a_idx].dir_8c & tb_ls [lsptr].dir_8c) != 0) &&
                ( (a [a_idx].b_ratio & tb_ls [lsptr].poss_ratio) != 0)    &&
                ( (a [a_idx].pn_turn & tb_ls [lsptr].pn_turn & 0x0c) != 0) &&
                ( (a [a_idx].pn_turn & tb_ls [lsptr].pn_turn & 0x03) != 0) )
                break;

else {
                error_count += a [a_idx].ratio;

if ( j == 1)
                    error_location |= c_BIT [0];
                else error_location |= c_BIT [1];

a_idx++;
                if (a_idx > a_lp) break;
                }
            } if (a_idx > a_lp)
            {
            error_count=16; break;
            }
        else {
            if (a_idx == a_lp)
                {
                if (j != tb_stroke [i].lscnt)     error_count=16;
                break;
                }
            else {
                if (j == tb_stroke [i].lscnt)
                    while (a_idx < a_lp)
                        {
                        a_idx++;
                        error_count += a [a_idx].ratio;
```

```
                        error_location |= c_BIT [2];
                        }
                    else a_idx ++;
                    }
                }
            } if (error_count < min)
            {
            min = error_count;
            tb_stroke_entry_no = i;
            min_error_location = error_location;
            } if (min == 0) break;
        }

/*------------------------------------------------------------*/
/*  stroke resegmentation if necessary.                       */
/*------------------------------------------------------------*/ if ((min > (short) 4) && (flag_resegment == (char) 0 ) )
    { if (a_lp < 2)
            delete_TH = 0;

else if (a_lp == 2)
            delete_TH = 2;

else if (a_lp >= 3)
            delete_TH = 1;

for (a_idx=1, perror=(short) 0; a_idx<a_lp; a_idx++)
        {
        if (a [a_idx].ratio <= delete_TH)
            {
            flag_resegment=1;
            perror += (short) a [a_idx].ratio;

c_fg = counter_clock ( 360, 180, a [a_idx-1].direction, a [a_idx+1].direction);
            a [a_idx-1].pn_turn = (unsigned char) ( 0x0c | c_BIT [c_fg]);
            a [a_idx].pn_turn = (unsigned char) (((a [0].pn_turn << 2) & 0x0c) | 0x03);
            for (i=a_idx; i<a_lp; i++)
                {
                a [i].direction = a [i+1].direction;
                a [i].dir_8c    = a [i+1].dir_8c;
```

```
                a [i].ratio    = a [i+1].ratio;
                a [i].b_ratio  = a [i+1].b_ratio;
                } a_idx --;
            a_lp --;
            }
        } if (flag_resegment == (char) 1 )   goto stk_rcg;
    } if (min > 4)
    stroke_code = 30;
else {
        if ( (min != 0) && ((min_error_location & c_BIT [2]) != 0) &&
            ((tb_stroke [tb_stroke_entry_no].stk_type == 8) ||
             (tb_stroke [tb_stroke_entry_no].stk_type == 9)) )
            stroke_code = 30;
        else if ( (min >= 3) && ((min_error_location & c_BIT [0]) != 0) &&
             (tb_stroke [tb_stroke_entry_no].stk_type == 10) )
             stroke_code = 30;
        else if ( (min >= 2) && ((min_error_location & c_BIT [2]) != 0) &&
             (tb_stroke [tb_stroke_entry_no].stk_type == 10) )
             stroke_code = 30;
        else stroke_code = tb_stroke [tb_stroke_entry_no].stk_type;
        } result [0] = tb_stroke_entry_no;
result [1] = min;

if (stroke_code > max_accept_code)   stroke_code = 30;

return (stroke_code);
}

/*******************************************************/
/* File Name: poss_stk.c                               */
/* Including:                                          */
/*   1. the procedure for recognizing the possible basic strokes   */
/*   2. the procedures for computing the geometric features       */
/*-----------------------------------------------------*/
/* initial_stk_substring ( inp_stk_cnt )               */
/* clear_stk_substring   ( inp_stk_cnt )               */
```

```
/* rcg_all_poss_stks (inp_stk_cnt)                  */
/*--------------------------------------------------*/
/* MBR_xmin (start, end)                            */
/* MBR_xmax (start, end)                            */
/* MBR_ymin (start, end)                            */
/* MBR_ymax (start, end)                            */
/* Stk_length (start, end)                          */
/****************************************************/ include    <stdio.h>
include    <process.h>
#include    <stdlib.h>
include    <graph.h> include    "extern.c"

void            exit            (),
unsigned char   Rcg_stroke              ();
unsigned short  kb_read                 (),
void            screen_clear            ();
void            crt_srcp        ();
void            window                  ();
void            wndrst                  ();
void            crt_line        ();
void            bf_disp         ();
void            seg_disp        ();

float length    (),
unsigned char MBR_xmin(unsigned char, unsigned char);
unsigned char MBR_xmax(unsigned char, unsigned char);
unsigned char MBR_ymin(unsigned char, unsigned char);
unsigned char MBR_ymax(unsigned char, unsigned char);
unsigned char Stk_length ();

unsigned char rcg_all_poss_stks(unsigned char);
void          initial_stk_substring().

/*--------------------------------------------------*/
/*   initialize stk_substring array                 */
/*--------------------------------------------------*/ void initial_stk_substring ()
{
  unsigned char   i;
  SUBSTRING_RECORD *q;

for ( i=0; i< SIZE_SEG_BUF; i++)
    {
```

```
            q = &stk_substring[i][i];
            q->stroke_id   = 0;
            q->stroke_type = -1;
            }
    }

/*------------------------------------------------------------------*/
/*    clear stk_substring array                                     */
/*------------------------------------------------------------------*/ void clear_stk_substring ( inp_stk_cnt )
unsigned char        inp_stk_cnt;
{
    unsigned char    stk_idx, fv_sp, fv_ep;
    unsigned char    i, j;
    INPUT_STROKE_STRUCT   *p;
    SUBSTRING_RECORD      *q;

for ( stk_idx=1; stk_idx <= inp_stk_cnt; stk_idx++ )
    {
        p = &input_stroke[stk_idx];
        fv_sp = p->fv_sp;
        fv_ep = p->fv_ep;

for ( i=fv_sp; i<=fv_ep; i++ )
        {
            for ( j=i; j<=fv_ep; j++ )
            {
                q = &stk_substring[i][j];
                q->stroke_id   = 0;
                q->stroke_type = -1;
            }
        }
    }
}

/*------------------------------------------------------------------*/
/*    Recognize all possible strokes in input character             */
/*------------------------------------------------------------------*/ unsigned char reg_all_poss_stks (inp_stk_cnt)
unsigned char        inp_stk_cnt;
{
    unsigned char        stk_idx;
```

```
            unsigned char       current_stk_id;
            short               result [2];
            unsigned char       fv_sp, fv_ep;
            unsigned char       string_length, string_start, string_end, idx_e;
            char                stk_type;
            short               seq_no;
            INPUT_STROKE_STRUCT    *p;
            POSSIBLE_STROKE_RECORD *r;
            short               kb_code;
            unsigned char       i_s, i_e, j_s, j_e;
            unsigned char       i, j;

for ( stk_idx=(unsigned char) 1, current_stk_id=(unsigned char) 0, stk_idx <= inp_stk_cnt;
            stk_idx ++ )
                {
                p = &input_stroke[stk_idx];
                fv_sp = p->fv_sp;
                fv_ep = p->fv_ep;

p->stroke_type = Rcg_stroke ( 18, fv_sp, fv_ep, f_seg, result);

for (string_length= (fv_ep-fv_sp+(unsigned char) 1), seq_no=(short) 1;
                    string_length >=1; string_length -- )
                    {
                    idx_e = fv_ep - string_length + (unsigned char) 1;
                    for ( string_start=fv_sp; string_start<=idx_e; string_start++, seq_no++ )
                        {
                        string_end = string_start + string_length - (unsigned char) 1;
                        stk_type = Rcg_stroke ( 14, string_start, string_end, f_seg, result);

if ( stk_type != 30 )
                            {
                            i_s = input_stroke [stk_idx] fv_sp;
                            i_e = string_start;
                            j_s = string_end;
                            j_e = input_stroke [stk_idx] fv_ep;

current_stk_id ++;

stk_substring [string_start][string_end].stroke_id   = (unsigned char)
            current_stk_id;
                            stk_substring [string_start][string_end].stroke_type = stk_type;

r = &poss_stk_rd [current_stk_id];
                            r->status         = 0;
                            r->input_stroke_no = stk_idx;
```

```
              r->stroke_type   = stk_type;
              r->fv_sp         = string_start;
              r->fv_ep         = string_end;

for (i=string_start, r->length=0; i<=string_end; i++)   r->length += f_seg
      [i].length;

r->feature [0]   = MBR_xmin(string_start, string_end);
              r->feature [1]   = MBR_ymin(string_start, string_end);
              r->feature [2]   = MBR_xmax(string_start, string_end);
              r->feature [3]   = MBR_ymax(string_start, string_end);
              r->feature [4]   = (unsigned char) ((r->feature[0] + r->feature[2]) / 2);
              r->feature [5]   = (unsigned char) ((r->feature[1] + r->feature[3]) / 2);

r->feature [6]   = f_seg[string_start].start_pt.x;
              r->feature [7]   = f_seg[string_start].start_pt.y;
              r->feature [8]   = f_seg[string_end].end_pt.x;
              r->feature [9]   = f_seg[string_end].end_pt.y;

r->feature [10]  = (unsigned char) length (f_seg[string_start].start_pt.x,
      f_seg[string_start].start_pt.y, 0, 0);
              r->feature [11]  = (unsigned char) length (f_seg[string_start].start_pt.x,
      f_seg[string_start].start_pt.y, 0, 63);
              r->feature [12]  = (unsigned char) length (f_seg[string_start].start_pt.x,
      f_seg[string_start].start_pt.y, 63, 63);

r->feature [13]  = (unsigned char) length (f_seg[string_end].end_pt.x,
      f_seg[string_end].end_pt.y, 0, 0);
              r->feature [14]  = (unsigned char) length (f_seg[string_end].end_pt.x,
      f_seg[string_end].end_pt.y, 63, 0);
              r->feature [15]  = (unsigned char) length (f_seg[string_end].end_pt.x,
      f_seg[string_end].end_pt.y, 63, 63);

r->feature [16]  = (unsigned char) length (r->feature[4], r->feature[5], 0, 0);
              r->feature [17]  = (unsigned char) length (r->feature[4], r->feature[5], 63, 0);
              r->feature [18]  = (unsigned char) length (r->feature[4], r->feature[5], 63, 63);
              r->feature [19]  = (unsigned char) length (r->feature[4], r->feature[5], 0, 63);

r->feature [20]  = (unsigned char) length (r->feature[4], r->feature[5], 0, 31);
              r->feature [21]  = (unsigned char) length (r->feature[4], r->feature[5], 31, 0);
              r->feature [22]  = (unsigned char) length (r->feature[4], r->feature[5], 63, 31);
              r->feature [23]  = (unsigned char) length (r->feature[4], r->feature[5], 31, 63);

r->feature [24]  = Stk_length (string_start, string_end);
              r->feature [25]  = r->feature[0] + r->feature[1];
              r->feature [26]  = r->feature[2] + r->feature[3];
      }
```

52

```
next:
        }
      }
    } return (current_stk_id);

} unsigned char MBR_xmin(start, end)
unsigned char start, end;
{
    unsigned char i;
    unsigned char minx;
    SEGMENT_STRUCT_1 *p;

minx = 0xff;
    for (i = start; i <= end; i++)
    {
        p = &f_seg[i];
        if (p->start_pt.x < minx)   minx = p->start_pt.x;
        if (p->end_pt.x   < minx)   minx = p->end_pt.x;
    }
    return(minx);
} unsigned char MBR_xmax(start, end)
unsigned char start, end;
{
    unsigned char i;
    unsigned char maxx;
    SEGMENT_STRUCT_1 *p;

maxx = 0x0;
    for (i = start; i <= end; i++)
    {
        p = &f_seg[i];
        if (p->start_pt.x > maxx)   maxx = p->start_pt.x;
        if (p->end_pt.x > maxx)     maxx = p->end_pt.x;
    }
    return(maxx);
} unsigned char MBR_ymin(start, end)
unsigned char start, end;
{
    unsigned char i;
    unsigned char miny;
```

```
    SEGMENT_STRUCT_1  *p;

miny = 0xff;
    for (i = start; i <= end; i++)
    {
      p = &f_seg[i];
      if (p->start_pt.y < miny)   miny = p->start_pt.y;
      if (p->end_pt.y  < miny)   miny = p->end_pt.y;
    }
    return(miny);
} unsigned char MBR_ymax(start, end)
unsigned char start, end;
{
    unsigned char i;
    unsigned char  maxy;
    SEGMENT_STRUCT_1  *p;

maxy = 0x0;
    for (i = start; i <= end; i++)
    {
      p = &f_seg[i];
      if (p->start_pt.y > maxy)   maxy = p->start_pt.y;
      if (p->end_pt.y > maxy)     maxy = p->end_pt.y;
    }
    return(maxy);
} unsigned char Stk_length (start, end)
unsigned char start, end;
{
    unsigned char i;
    unsigned char  length;
    SEGMENT_STRUCT_1  *p;

length = (unsigned char) 0;
    for (i = start; i <= end; i++)
    {
      p = &f_seg[i];
      length += p->length;
    }
    return(length);
}

/*************************************************************/
```

```
/* File Name: stk_sort.c                                                 */
/*----------------------------------------------------------------------*/
/* void ArrangeFeature (index, PossibleStrokeCount, fea_buf, sort_stroke_id) */
/*----------------------------------------------------------------------*/
/* quick_sort ( feature_no, fea_buf, sort_stroke_id, start_ptr, end_ptr ) */
/* partition ( feature_no, fea_buf, sort_stroke_id, start_ptr, end_ptr )  */
/* void PosRelationSortStroke( FeaType, sort_stroke_id,                   */
/*            relation_sort_stroke_id, PossibleStrokeCount )              */
/* void NegRelationSortStroke( FeaType, sort_stroke_id,                   */
/*            relation_sort_stroke_id, PossibleStrokeCount )              */
/* void TunePositionForStrokeType( FeaType, sort_stroke_id,               */
/*            relation_sort_stroke_id, PossibleStrokeCount )              */
/************************************************************************/ include <stdio.h>
include <dos.h>
include <stdlib.h> include "extern.c"

unsigned short   kb_read();
void             partition();
void             quick_sort ();

/*----------------------------------------------------------------------*/
/* Loading the feature value of the possible strokes for sorting.       */
/*----------------------------------------------------------------------*/ void ArrangeFeature(index, PossibleStrokeCount, fea_buf, sort_stroke_id)
unsigned char index;
unsigned char PossibleStrokeCount;
unsigned char fea_buf[SIZE_OF_POSS_STK];
unsigned char sort_stroke_id[SIZE_OF_POSS_STK];
{
unsigned char i;

for (i = 1; i <= PossibleStrokeCount; i++)
   {
      fea_buf[i] = poss_stk_rd[i].feature[index];
      sort_stroke_id[i] = i;
   }
}

/*----------------------------------------------------------------------*/
```

55

```c
/* Quicksort the possible strokes based on feature values.              */
/*----------------------------------------------------------------------*/ void quick_sort ( feature_no, fea_buf, sort_stroke_id, start_ptr, end_ptr )
unsigned char    fea_buf        [SIZE_OF_POSS_STK];
unsigned char    sort_stroke_id [SIZE_correspond_feature][SIZE_OF_POSS_STK];
unsigned char    feature_no, start_ptr, end_ptr;
{
   unsigned char   j;

if ( start_ptr < end_ptr )
   {
      j = (unsigned char) (end_ptr + 1);

partition ( feature_no, fea_buf, sort_stroke_id, &start_ptr, &j );

quick_sort ( feature_no, fea_buf, sort_stroke_id, start_ptr, (j-1) );

quick_sort ( feature_no, fea_buf, sort_stroke_id, (j+1), end_ptr );

}
} void partition ( feature_no, fea_buf, sort_stroke_id, start_ptr, end_ptr )
unsigned char   fea_buf        [SIZE_OF_POSS_STK];
unsigned char   sort_stroke_id [SIZE_correspond_feature][SIZE_OF_POSS_STK];
unsigned char   feature_no, *start_ptr, *end_ptr;
{
   unsigned char   i, p, partition_value, part_position, temp;

partition_value = fea_buf [*start_ptr];
   part_position   = sort_stroke_id [feature_no][*start_ptr];

i = *start_ptr;
   p = *end_ptr;

while (1)
   {
      while (1)
      {
         i++;
         if ( fea_buf[i] >= partition_value )   break;
      } while (1)
      {
         p--,
```

```
      if ( fea_buf[p] <= partition_value )   break;
   } if (i < p)
   {
      temp    = fea_buf [i];
      fea_buf [i] = fea_buf [p];
      fea_buf [p] = temp;

temp              = sort_stroke_id [feature_no][i];
      sort_stroke_id [feature_no][i] = sort_stroke_id [feature_no][p];
      sort_stroke_id [feature_no][p] = temp;
   }
   else break;
} fea_buf [*start_ptr] = fea_buf [p];
fea_buf [p]   = partition_value;

sort_stroke_id [feature_no][*start_ptr] = sort_stroke_id [feature_no][p];
sort_stroke_id [feature_no][p]      = part_position;

*end_ptr = p;

} void PosRelationSortStroke( FeaType, sort_stroke_id, relation_sort_stroke_id,
PossibleStrokeCount )
unsigned char FeaType;
unsigned char sort_stroke_id [SIZE_correspond_feature][SIZE_OF_POSS_STK];
unsigned char relation_sort_stroke_id[SIZE_correspond_feature][SIZE_OF_POSS_STK];
unsigned char PossibleStrokeCount;
{
unsigned char i, poss_stk_idx, poss_stk_idx1;

for ( i=(unsigned char) 1; i < PossibleStrokeCount; i ++ )
      {
      poss_stk_idx  = sort_stroke_id[FeaType][i];
      poss_stk_idx1 = sort_stroke_id[FeaType][i+1];
      if ( poss_stk_rd [poss_stk_idx].feature[FeaType] < poss_stk_rd
[poss_stk_idx1].feature[FeaType] )
            relation_sort_stroke_id[FeaType][i]=0x00;
      else relation_sort_stroke_id[FeaType][i]=0x01;
      }
   relation_sort_stroke_id[FeaType][i]=0x00;
}
```

```
void NegRelationSortStroke( FeaType, sort_stroke_id, relation_sort_stroke_id,
PossibleStrokeCount )
unsigned char FeaType;
unsigned char sort_stroke_id [SIZE_correspond_feature][SIZE_OF_POSS_STK];
unsigned char relation_sort_stroke_id[SIZE_correspond_feature][SIZE_OF_POSS_STK];
unsigned char PossibleStrokeCount;
{
unsigned char i, poss_stk_idx, poss_stk_idx1;

for ( i=PossibleStrokeCount; i > (unsigned char) 1; i-- )
        {
        poss_stk_idx  = sort_stroke_id[FeaType][i];
        poss_stk_idx1 = sort_stroke_id[FeaType][i-1];
        if ( poss_stk_rd [poss_stk_idx1].feature[FeaType] == poss_stk_rd
[poss_stk_idx].feature[FeaType] )
            {
            relation_sort_stroke_id[FeaType][i] |= 0x02;
            }
        }
} void TunePositionForStrokeType( FeaType, sort_stroke_id, relation_sort_stroke_id,
PossibleStrokeCount )
unsigned char FeaType;
unsigned char sort_stroke_id [SIZE_correspond_feature][SIZE_OF_POSS_STK];
unsigned char relation_sort_stroke_id[SIZE_correspond_feature][SIZE_OF_POSS_STK];
unsigned char PossibleStrokeCount;
{
unsigned char i, j, js, je, j_cnt, k;
unsigned char max_idx, poss_stk_id, temp_poss_stk_id;
unsigned char      max_length;

for ( i=(unsigned char) 1; i < PossibleStrokeCount; i++ )
        {
        if ( (relation_sort_stroke_id[FeaType][i] & c_BIT [0]) != 0x00)
            {
            js=i;
            while ((relation_sort_stroke_id[FeaType][i] & c_BIT [0]) != 0x00)
                {
                if (i == PossibleStrokeCount)       break;
                i++;
                }
            je = i;

/*-- Selection sort --*/
```

```
            j_cnt=(unsigned char) (je-js+1);
            for (k=0; k< (j_cnt-1); k++)
               {
               max_length = 0;
               for (j=js+k; j<=je; j++)
                  {
                  poss_stk_id = sort_stroke_id[FeaType][j];
                  if (max_length < poss_stk_rd[poss_stk_id].length)
                     {
                     max_length = poss_stk_rd[poss_stk_id].length;
                     max_idx = j;
                     }
                  }

/* Change position */ temp_poss_stk_id = sort_stroke_id[FeaType][js+k];
               sort_stroke_id[FeaType][js+k] = sort_stroke_id[FeaType][max_idx];
               sort_stroke_id[FeaType][max_idx] = temp_poss_stk_id;
               }

}
      }
}
/*************************************************************************
 *
 * MODULE NAME: Preliminary Classification
 *
 *************************************************************************/

/***********************************************************************/
/* File Name: pcls.c                                                  */
/*--------------------------------------------------------------------*/
/* t_Range_stk_cnt  ( delta_S1, delta_S2, delta_S3, S_L, S_U, stk_cnt, */
/*                   ptr_rcg_bf )                                     */
/***********************************************************************/ include <stdio.h>
include "define.h"

#include "extern.c"

/*--------------------------------------------------------------------*/
/* Estimate the lower and upper bound of stroke number.          */
/*--------------------------------------------------------------------*/
```

```
void t_Range_stk_cnt    ( delta_S1, delta_S2, delta_S3, S_L, S_U, inp_stk_cnt)
unsigned char       delta_S1, delta_S2, delta_S3;
unsigned char       *S_L, *S_U, inp_stk_cnt;
{
unsigned char   i, stroke_code, stk_seg_cnt;
unsigned char   stk_low_bound, stk_upper_bound;
unsigned char  F_SL    [19] = { 1, 1, 1, 1, 1, 1, 1, 1, 1, 1,
                   1, 1, 1, 1, 1, 2, 2, 2, 3 };

unsigned char  F_SU    [19] = { 1, 1, 1, 1, 1, 1, 2, 2, 2, 2,
                   2, 3, 3, 2, 2, 2, 3, 3, 3 };

stk_low_bound  = 0;
   stk_upper_bound = 0;
   for (i = 1; i <= inp_stk_cnt; i++)
   {
      stroke_code = input_stroke[i].stroke_type;

if ( stroke_code < 19 )
        {
        stk_low_bound    += F_SL [stroke_code];
        stk_upper_bound  += F_SU [stroke_code];
        } else {
         stk_seg_cnt = (input_stroke[i].fv_ep-input_stroke[i].fv_sp + 1);
         stk_low_bound   ++;
         stk_upper_bound += stk_seg_cnt;
         }
   } if ( delta_S1 > delta_S3 )
      stk_low_bound = stk_low_bound - delta_S1;
   else stk_low_bound = stk_low_bound - delta_S3;

stk_upper_bound += delta_S2;

*S_L = stk_low_bound ;
   *S_U = stk_upper_bound ;
}

/*************************************************************/
/* File Name: manu_idx.c                                     */
/*-----------------------------------------------------------*/
/* rd_stk_no ()                                              */
```

```
/*-----------------------------------------------------------------*/
/* clear_idx      (ptr_idx_array)                                  */
/* initial_idx    (idx_array, size)                                */
/* f_read_idx_bin (fname, idx_array)                               */
/* f_write_idx_bin (fname, idx_array, size)                        */
/* f_write_idx_txt (fname, idx_array, size)                        */
/* check_idx      (idx_array, index_range_start, index_range_end, code ) */
/*-----------------------------------------------------------------*/
/* intersect_index ( ptr_idx_a, ptr_idx_b, ptr_idx_o )             */
/* union_index     ( ptr_idx_a, ptr_idx_b, ptr_idx_o )             */
/*-----------------------------------------------------------------*/
/* read_exclude_set ( fname, ptr_exclude_set )                     */
/*                                                                 */
/******************************************************************/ include <stdio.h>
include <memory.h>
include <stdlib.h>
#include "define.h"
#include "extern.c"

/*-----------------------------------------------------------------*/
/* clear index buffer                                              */
/*-----------------------------------------------------------------*/ void clear_idx ()
{
  short  j;

for (j = 0; j < SIZE_ALL_CATEGORY; j++)
  {
    idx_buf.cand_code[j] = (unsigned char) 0;
  }
}

/*-----------------------------------------------------------------*/
/* Read index information from binary file and store into array.   */
/*-----------------------------------------------------------------*/ void f_read_idx_bin   (fname)
char          *fname;
{
  FILE   *fi;
  unsigned char a, b;
  short  index_entry, read_num;
  short  i;

for (i = 0; i < SIZE_idx_stk; i++)
```

```
    {
       memset(idx_stk[i].cand_code, 0, SIZE_ALL_CATEGORY);
    } fi = fopen(fname, "rb");
    if (fi == NULL)
    {
       fprintf(stderr, " File %s open error !\n", fname);
       exit(0);
    }
    printf ("Reading index information into binary file: %s\n", fname);

while (1)
    {
       fread(&a, 1, 1, fi);
       fread(&b, 1, 1, fi);
       index_entry = (short) ((unsigned int)b * 256 + (unsigned int)a);
       if (feof (fi) != 0)    break;
       if ((index_entry < 0) || (index_entry >= SIZE_idx_stk)) continue;

fread(&a, 1, 1, fi);
       fread(&b, 1, 1, fi);
       idx_stk[index_entry].count = (short) ((unsigned int)b * 256 + (unsigned int)a);
       fread(&a, 1, 1, fi);
       fread(&b, 1, 1, fi);
       idx_stk[index_entry].bk_cnt = (short) ((unsigned int)b * 256 + (unsigned int)a);
       fread(&a, 1, 1, fi);
       fread(&b, 1, 1, fi);
       idx_stk[index_entry].s_bk = (short) ((unsigned int)b * 256 + (unsigned int)a);

read_num = (short) fread(&idx_stk[index_entry].cand_code[0], 1,
SIZE_ALL_CATEGORY, fi);

if (read_num < SIZE_ALL_CATEGORY)
       {
          printf ("Error read in f_read_idx %s index_entry=%2d read_num=%d\n", fname,
index_entry, read_num);
          exit (0);
       }
    } fclose (fi);

}

/*--------------------------------------------------------------------*/
/*   union idx_a [entry_a] and idx_b [entry_a] ---> idx_o              */
```

```c
/*------------------------------------------------------------------*/
void union_index(i)
short       i;
{
  short  bk;
  if ( (i>=0) && (i<SIZE_idx_stk) )
  {
  for (bk = 0; bk < SIZE_ALL_CATEGORY; bk++)
  {
     idx_buf.cand_code[bk] |= (unsigned char)idx_stk[i].cand_code[bk];
  }
  }

}
/*******************************************/
/* File Name: stk_idx.c                    */
/*-----------------------------------------*/
/* Const_stk_idx ()                        */
/*******************************************/ include <stdio.h>
include <memory.h>
include <stdlib.h> include "extern.c"

void Const_stk_idx ()
{
FILE     *fi;
static char fname1 [] = "c:\\pda\\ref_db\\standstk.tab";
static char fname2 [] = "c:\\pda\\ref_db\\vari_stk.tab";
short       stkno, bk, item;
short       code, StartCode, EndCode;

printf ("Reading index information from text file: %s %s\n", fname1, fname2);
   for (stkno = 0; stkno < SIZE_idx_stk; stkno++)
   {
     for (bk = 0; bk < SIZE_ALL_CATEGORY; bk++)
     {
        idx_stk [stkno].cand_code [bk] = (unsigned char) 0;
     }
   } fi = fopen (fname1, "r");
   while (1)
     {
```

```
      fscanf (fi, "%hi", &stkno);   if (feof (fi) != 0)   break;
      fscanf (fi, "%hi", &StartCode);
      fscanf (fi, "%hi", &EndCode);

for (code=StartCode; code<=EndCode; code++)
         {
         bk = code/8; item = code % 8;
         idx_stk [stkno-1].cand_code [bk] |= (unsigned char) c_BIT [item];
         }
      }
   fclose (fi);

fi = fopen (fname2, "r");
   while (1)
      {
      fscanf (fi, "%hi", &code);   if (feof (fi) != 0)   break;
      fscanf (fi, "%hi", &stkno);

bk = code/8; item = code % 8;
      idx_stk [stkno-1].cand_code [bk] |= (unsigned char) c_BIT [item];
      }
   fclose (fi);

}

/****************************************************************
 *
 * MODULE NAME: Stroke Correspondence
 *
 ***************************************************************/

/*************************************************************/
/* File Name: middle1.c                                      */
/*-----------------------------------------------------------*/
/* short MiddleClassification(short RealCode, short *Score, short *Length) */
/*-----------------------------------------------------------*/
/*                                                           */
/* void RefForeSegProcess (RealCode, DRulePtr, Score, TotalScore, Length ) */
/* unsigned char R1( CRulePtr )                              */
/* unsigned char R2( CRulePtr )                              */
/*-----------------------------------------------------------*/
/*                                                           */
/* char  CutComponent (Range)                                */
/* char  ReleaseComponent (Range)                            */
/*-----------------------------------------------------------*/
```

```
/*                                                                  */
/* void DeleteUnusedPossStroke( poss_stk_id )                       */
/* void UpdateSpEp_sort_stroke_id( FeaType )                        */
/*------------------------------------------------------------------*/
/*                                                                  */
/* void RecordCutPossStkId (comp_idx, CutPossStk, PossibleStrokeCount) */
/*                                                                  */
/********************************************************************/ include <stdio.h>
include <memory.h>
#include "extern.c"

/*--- Constant definition ---*/ define   FAULT_THRESH    10
define   ON              1
#define   OFF             2
#define   ONE_CHAR_SIZE   100

/* DEFINE */
#define   FORE_FORE       1
#define   BACK_FORE       2
#define   NULL_FORE       4
#define   BACK_BACK       6
#define   BACK_POINT      10
define   FORE_NULL       13 short         kb_read ();
void          crt_srcp    ();
char          CutComponent (),
char          ReleaseComponent ();
void          RefForeSegProcess (),
unsigned char R1 (COMP_CRULES_STRUCT *),
unsigned char R2 (COMP_CRULES_STRUCT *),
void          DeleteUnusedPossStroke ();
void          UpdateSpEp_sort_stroke_id (),
void          BackSegProcess(short*, short*, short*),
void          RecordCutPossStkId ();

short         MiddleClassification(short RealCode, short *Score, short *Length)
{
    unsigned char    i, k, CompCnt;   /* No. of Component */
    short            DSetPtr,
    short            DRulePtr;
    short            Offset,
    short            Start;
    short            TotalScore,
```

```
    unsigned char    Range [4];
    char             CutComponentInLoopFlag;
    unsigned char    CutFea_x, CutFea_y;

/*--- Reset poss_stk_rd [i].status ---*/ for (i = 1; i <= PossibleStrokeCount; i++)
    {
       poss_stk_rd[i].status = 0;

} for (i = 0; i < SIZE_correspond_feature; i++)
       {
       Sp_sort_stroke_id[i] = 1;
       Ep_sort_stroke_id[i] = PossibleStrokeCount;
       }

/*--- Computing the entry address of the character structural decomposing rule. ---*/

CompCnt = (unsigned char)((long )char_dsp[RealCode].st_frame_code /
(long )100000000);
    Start = (unsigned short )idx_st_frame_array [CompCnt].sp;
    Offset = (short )(((long )char_dsp[RealCode].st_frame_code / (long )1000000) %
(long )100);

Offset += Start;
    Offset--;

DSetPtr = (short )(((long )char_dsp[RealCode].st_frame_code % (long )1000000) /
(long )1000) - 1;
    DRulePtr = RuleSet_st_frame_array[Offset].drule_sp + (CompCnt * DSetPtr);

TotalScore = 0;
    Score = 0;
    *Length = 0;
    memset(RefMapToInput, 0, sizeof(RefMapToInput));
    memset(RS_StkMapRecord, 0, sizeof(RS_StkMapRecord));
    memset(UsedCRulePtr, -1, sizeof(UsedCRulePtr));
    memset(CutPossStk, 0, sizeof(CutPossStk));

/*--- Fore Segment ---*/

/* Each fore segment in the reference pattern will map to */
    /* the fore segment or null in the input pattern.         */
```

```c
for (k = 0; k < CompCnt; k++)
  {
  /* Boundaries: partition possible strokes in a component. */

CutFea_x = st_frame_drule[DRulePtr + k].CutFea_x;
  CutFea_y = st_frame_drule[DRulePtr + k].CutFea_y;
  Range[0] = st_frame_drule[DRulePtr + k].xmin;
  Range[1] = st_frame_drule[DRulePtr + k].xmax;
  Range[2] = st_frame_drule[DRulePtr + k].ymin;
  Range[3] = st_frame_drule[DRulePtr + k].ymax;

CutComponentInLoopFlag = CutComponent (CutFea_x, CutFea_y, Range);

RefForeSegProcess( RealCode, (DRulePtr + k), Score, &TotalScore, Length);
  ReleaseComponent (CutFea_x, CutFea_y, Range);
  }

} void RefForeSegProcess (RealCode, DRulePtr, Score, TotalScore, Length )
short          RealCode;
short          DRulePtr;
short          *Score;
short          *TotalScore;
short          *Length;
{
short          CompPtr, CompCode;
unsigned char  i, m, comp_idx, stroke_idx;
unsigned char  match_poss_stk_id, RuleNum;
POSSIBLE_STROKE_RECORD *pp;
COMP_CRULES_STRUCT *rp;
short          crule_ptr;
unsigned char  FeaType_0, FeaType_1;

comp_idx = (unsigned char) st_frame_drule [DRulePtr].comp_ord_idx;
CompCode = comp_elm[char_dsp [RealCode].sp_comp_elm + comp_idx].comp_code;
CompPtr  = idx_comp_rule_array [CompCode/1000] sp + (CompCode%1000) - 1;

RecordCutPossStkId (comp_idx, CutPossStk, PossibleStrokeCount);

for (m = 0; m < comp_rule_array[CompPtr] stk_cnt; m++, *Length++)
  {
  crule_ptr = (short) (comp_rule_array [CompPtr].crule_ptr + m);
  rp = &comp_crules [crule_ptr];
  RuleNum = (unsigned char) (rp->Rule_Stk_idx & 0xe0);
  stroke_idx = (unsigned char) (rp->Rule_Stk_idx & 0x1f);
```

```
switch (RuleNum){
case 0x00: {    /* Rule 1 */
    match_poss_stk_id = R1 ( rp );
    FeaType_0 = (unsigned char) (rp->ScanSeq_FeaType[0] & 0x1f);
    break;
    } case 0x20: {    /* Rule 2 */
    match_poss_stk_id = R2 ( rp );
    FeaType_0 = (unsigned char) (rp->ScanSeq_FeaType[0] & 0x1f);
    FeaType_1 = (unsigned char) (rp->ScanSeq_FeaType[1] & 0x1f);
    break;
    }
}

RetMapToInput [comp_idx][stroke_idx] = match_poss_stk_id;
RS_StkMapRecord [comp_idx][m] = match_poss_stk_id;
UsedCRulePtr [comp_idx][m] = crule_ptr;

if (match_poss_stk_id == 0)
    {  /*--- CASE 13: No matched input possible stroke. ---*/
    :
    } else {      /*--- CASE 1: FORE_FORE ---*/ poss_stk_rd [match_poss_stk_id].status = -1;

DeleteUnusedPossStroke ( match_poss_stk_id );
    UpdateSpEp_sort_stroke_id( FeaType_0 );
    if (RuleNum == 0x20)
       UpdateSpEp_sort_stroke_id( FeaType_1 );

}
  }
} unsigned char R1( CRulePtr )
COMP_CRULES_STRUCT *CRulePtr;
{
unsigned char allow_poss_stk_id [SIZE_OF_POSS_STK];
short       lp_allow, i, ij;
unsigned char poss_stk_id, stk_id;
unsigned char p, ps, pe, FeaType, CandNum;
char        stroke_type;
```

68

```
for (i=1, lp_allow=-1; i<=(short)PossibleStrokeCount; i++)
  {
  if (poss_stk_rd [i].status > 0)
    {
    stroke_type = poss_stk_rd [i].stroke_type;
    if ((CRulePtr->bit_stk_type & s_BIT[stroke_type]) != 0)
      {
      for (ij=lp_allow; ij>=0; ij--)
        {
        poss_stk_id = allow_poss_stk_id [ij];
        if (poss_stk_rd [i].input_stroke_no == poss_stk_rd [poss_stk_id].input_stroke_no)
          {
          if (((poss_stk_rd [i].fv_sp <= poss_stk_rd [poss_stk_id].fv_ep) &&
              (poss_stk_rd [i].fv_ep >= poss_stk_rd [poss_stk_id].fv_sp)) ||
              ((poss_stk_rd [poss_stk_id].fv_sp <= poss_stk_rd [i].fv_ep) &&
              (poss_stk_rd [poss_stk_id].fv_ep >= poss_stk_rd [i].fv_sp)) )

{   /* overlap */
            if (poss_stk_rd [i].length > poss_stk_rd [poss_stk_id].length)
              allow_poss_stk_id [ij] = (unsigned char) i;
            break;
            }
          }
        }
      if (ij < 0)
        {
        lp_allow ++;
        allow_poss_stk_id [lp_allow] = (unsigned char) i;
        }
      }
    }
  }

CandNum = CRulePtr->CandNum [0];
poss_stk_id = 0;
FeaType = (unsigned char) (CRulePtr->ScanSeq_FeaType[0] & 0x1f);

if (( CRulePtr->ScanSeq_FeaType[0] & 0x80) == 0 )
{  /* Select the minimum value */
   p = Sp_sort_stroke_id[FeaType];
   while ( p <= Ep_sort_stroke_id[FeaType] )
   {
     stk_id = sort_stroke_id [FeaType][p];
     if (poss_stk_rd[stk_id].status == 1)
```

```
            {
            for (ij=0; ij<=lp_allow; ij++)
                {
                if (allow_poss_stk_id [ij] == stk_id)
                    {
                    poss_stk_id = stk_id;    /* match */
                    goto rt;
                    }
                }
            }
        p++;
        }
    } else {    /* Select the maximum value */
        p = Ep_sort_stroke_id[FeaType];
        while ( p >= Sp_sort_stroke_id[FeaType] )
            {
            pe = p;
            while ( (relation_sort_stroke_id[FeaType][p] & c_BIT [1]) == 0x02)
                {    /* Search the maximum stroke type for the same feature value. */
                if ( p > Sp_sort_stroke_id[FeaType] )
                    {
                    p--;
                    }
                else break;
                }
            ps=p;

for (p=ps; p<=pe; p++)
                {
                stk_id = sort_stroke_id [FeaType][p];
                if (poss_stk_rd[stk_id].status == 1)
                    {
                    for (ij=0; ij<=lp_allow; ij++)
                        {
                        if (allow_poss_stk_id [ij] == stk_id)
                            {
                            poss_stk_id = stk_id;    /* match */
                            goto rt;
                            }
                        }
                    }
                } p=(unsigned char)(ps-1);
            }
        }
```

```
rt:
    return( poss_stk_id );
} unsigned char R2( CRulePtr )
COMP_CRULES_STRUCT *CRulePtr;
{
unsigned char allow_poss_stk_id [SIZE_OF_POSS_STK];
short         lp_allow, i, ij;
unsigned char poss_stk_id, stk_id;
unsigned char p, ps, pe;
char j, k, k_cnt;
unsigned char FeaType_0, FeaType_1, CandNum [2];
unsigned char buf_sort_stroke_id [10], fea_buf [10];
unsigned char min_value, min_idx;
unsigned char temp_poss_stk_id, temp_fea;
char          stroke_type;

for (i=1, lp_allow=-1; i<=(short)PossibleStrokeCount; i++)
      {
        if (poss_stk_rd [i].status == 1)
          {
            stroke_type = poss_stk_rd [i].stroke_type;
            if ((CRulePtr->bit_stk_type & s_BIT[stroke_type]) != 0)
              {
                for (ij=lp_allow; ij>=0; ij--)
                  {
                    poss_stk_id = allow_poss_stk_id [ij];
                    if (poss_stk_rd [i].input_stroke_no == poss_stk_rd [poss_stk_id].input_stroke_no)
                      {
                        if (((poss_stk_rd [i].fv_sp <= poss_stk_rd [poss_stk_id].fv_ep) &&
                            (poss_stk_rd [i].fv_ep >= poss_stk_rd [poss_stk_id].fv_sp)) ||
                           ((poss_stk_rd [poss_stk_id].fv_sp <= poss_stk_rd [i].fv_ep) &&
                            (poss_stk_rd [poss_stk_id].fv_ep >= poss_stk_rd [i].fv_sp)) )

{  /* overlap */
                            if (poss_stk_rd [i].length > poss_stk_rd [poss_stk_id].length)
                                allow_poss_stk_id [ij] = (unsigned char) i;
                            break;
                          }
                      }
                  }
              }
```

70

```
            if (ij < 0)
                {
                lp_allow ++;
                allow_poss_stk_id [lp_allow] = (unsigned char) i;
                }
            }
        }
    }

CandNum[0] = CRulePtr->CandNum [0];
CandNum[1] = CRulePtr->CandNum [1];
poss_stk_id = 0;
FeaType_0 = (unsigned char) (CRulePtr->ScanSeq_FeaType[0] & 0x1f);
FeaType_1 = (unsigned char) (CRulePtr->ScanSeq_FeaType[1] & 0x1f);

if (( CRulePtr->ScanSeq_FeaType[0] & 0x80) == 0 )
    {   /*--- Select k strokes with the minimum k values according to CandNum[0] ---*/
    p = Sp_sort_stroke_id[FeaType_0];
    k = 0;
    while ( p <= Ep_sort_stroke_id[FeaType_0] )
        {
        stk_id = sort_stroke_id [FeaType_0][p];
        if (poss_stk_rd[stk_id].status == 1)
            {
            for (ij=0; ij<=lp_allow; ij++)
                {
                if (allow_poss_stk_id [ij] == stk_id)
                    {
                    buf_sort_stroke_id [k] = stk_id;
                    k++;
                    if (k >= (char) CandNum[0])      goto comp_sel;
                    }
                }
            }
        p++;
        }
    } else {  /*--- Select k strokes with the maximum k values according to CandNum[0] ---*/
    p = Ep_sort_stroke_id[FeaType_0];
    k = 0;
    while ( p >= Sp_sort_stroke_id[FeaType_0] )
        {
        pe = p;
        while ( (relation_sort_stroke_id[FeaType_0][p] & c_BIT [1]) == 0x02)
            {   /* Search the maximum stroke type for the same feature value */
            if ( p > Sp_sort_stroke_id[FeaType_0] )
```

```
                {
                p--;
                }
            else break;
            }
        ps=p;

for (p=ps; p<=pe; p++)
            {
            stk_id = sort_stroke_id [FeaType_0][p];
            if (poss_stk_rd[stk_id].status == 1)
                {
                for (ij=0; ij<=lp_allow; ij++)
                    {
                    if (allow_poss_stk_id [ij] == stk_id)
                        {
                        buf_sort_stroke_id [k] = stk_id;
                        k++;
                        if (k >= (char) CandNum[0])   goto comp_sel;
                        }
                    }
                }
            }
        p=(unsigned char) (ps-1);

}
    } comp_sel:
    k_cnt = k;

/*--- Sorting the poss_stk_id in buf_sort_stroke_id [] by FeaType_1 ---*/ for (k=0; k < k_cnt; k++)
        {
        stk_id = buf_sort_stroke_id [k];
        fea_buf [k] = poss_stk_rd [stk_id].length;
        } for (k=0; k < (char) (k_cnt-1); k--)
        { min_value = 250;
        for (j=k; j<k_cnt; j++)
            {
            if (min_value > fea_buf [j])
                {
                min_value = fea_buf [j];
```

```
            min_idx = j;
            }
        }

/*--- Change position ---*/ temp_poss_stk_id = buf_sort_stroke_id [k];
    temp_fea     = fea_buf [k];

buf_sort_stroke_id [k] = buf_sort_stroke_id [min_idx];
    fea_buf        [k] = min_value;

buf_sort_stroke_id [min_idx] = temp_poss_stk_id;
    fea_buf        [min_idx] = temp_fea;

}

/*--- Select the stroke with the mth minimum value or mth maximum value from
buf_sort_stroke_id ---*/ if (( CRulePtr->ScanSeq_FeaType[1] & 0x80) == 0 )
{   /*--- Select the strokes with the jth minimum value ---*/ j = 0;
    p = Sp_sort_stroke_id[FeaType_1];
    while ( p <= Ep_sort_stroke_id[FeaType_1] )
        {
        stk_id = sort_stroke_id [FeaType_1][p];
        for (k=(char) (k_cnt-1); k >=0; k--)
            {
            if ( (poss_stk_rd[stk_id].status == 1) &&
                 (buf_sort_stroke_id [k] == stk_id) )
                {
                poss_stk_id = buf_sort_stroke_id [k];   /* match */
                goto rt;
                }
            if ( buf_sort_stroke_id [k] == stk_id)   j++;
            } if ( j > (char) CandNum[1] )   goto rt;
        p++;
        }
} else
{   /*--- Select the strokes with the jth maximum value ---*/
```

```
        j = 0;

p = Ep_sort_stroke_id[FeaType_1];
        while ( p >= Sp_sort_stroke_id[FeaType_1] )
           {
           pe = p;
           while ( (relation_sort_stroke_id[FeaType_1][p] & c_BIT [1]) == 0x02)
              {  /* Search the maximum stroke type for the same feature value. */
              if ( p > Sp_sort_stroke_id[FeaType_1] )
                 {
                 p--;
                 }
              else break;
              }
           ps=p;

for (p=ps; p<=pe; p++)
              {
              stk_id = sort_stroke_id [FeaType_1][p];
              for (k=(char) (k_cnt-1); k >=0; k--)
                 {
                 if ( (poss_stk_rd[stk_id].status == 1) &&
                    (buf_sort_stroke_id [k] == stk_id) )
                    {
                    poss_stk_id = buf_sort_stroke_id [k];   /* match */
                    goto rt;
                    }
                 if ( buf_sort_stroke_id [k] == stk_id)   j++;
                 }
              } if ( j > (char) CandNum[1] )   goto rt;
           p=(unsigned char) (ps-1);
           }
        } rt:
   return( poss_stk_id );
}

/*------------------------------------------------------------------*/
/* Select the possible stroke segments included in the current component */
/* according to the boundary predefined in the rule.                */
/*------------------------------------------------------------------*/ char CutComponent (CutFea_x, CutFea_y, Range)
```

```
    unsigned char    CutFea_x, CutFea_y;
    unsigned char    Range [4];
{
    unsigned char         i;
    POSSIBLE_STROKE_RECORD    *r;
    char              InLoopFlag;

InLoopFlag = OFF;
    for (i = 1; i <= PossibleStrokeCount; i++)
    {
        r = &poss_stk_rd [i];
        if ( (r->feature[CutFea_x] >= Range[0]) && (r->feature[CutFea_x] <= Range[1]) &&
             (r->feature[CutFea_y] >= Range[2]) && (r->feature[CutFea_y] <= Range[3]) &&
             (r->status >= 0) )
        {
            r->status++;    /*--- The stroke is located in the restricted area. ---*/
            InLoopFlag = ON;
        }
    } return (InLoopFlag);
}

/*----------------------------------------------------------------*/
/* Releasing the nonmatched possible stroke included in the boundary    */
/* predefined in the rule for another mappings.                    */
/*----------------------------------------------------------------*/ char ReleaseComponent (CutFea_x, CutFea_y, Range)
unsigned char    CutFea_x, CutFea_y;
unsigned char    Range[4];
{
    unsigned char         i;
    POSSIBLE_STROKE_RECORD    *r;
    char              InLoopFlag;

InLoopFlag = OFF;
    for (i = 1; i <= PossibleStrokeCount; i++)
    {
        r = &poss_stk_rd[i];
        if ( (r->feature[CutFea_x] >= Range[0]) && (r->feature[CutFea_x] <= Range[1]) &&
             (r->feature[CutFea_y] >= Range[2]) && (r->feature[CutFea_y] <= Range[3]) &&
             (r->status > 0) )
        {
            r->status = 0;   /*--- The stroke released for another mappings ---*/
                             /*--- is located in the restricted area.     ---*/
```

```
        InLoopFlag = ON;
    }
  } return (InLoopFlag);
} void DeleteUnusedPossStroke( poss_stk_id )
unsigned char poss_stk_id;
{
unsigned char i_s, i_e, j_s, j_e;
short         i, j;
unsigned char inp_stk_idx, stk_id;

inp_stk_idx = poss_stk_rd [poss_stk_id].input_stroke_no;

/*---------------------------------------------------------------*/
/* Delete the possible strokes containing the mapped possible stroke. */
/*---------------------------------------------------------------*/ i_s = input_stroke [inp_stk_idx].fv_sp;
  i_e = poss_stk_rd [poss_stk_id].fv_sp;
  j_s = poss_stk_rd [poss_stk_id].fv_ep;
  j_e = input_stroke [inp_stk_idx].fv_ep;
  for (i=(short) i_s; i<=(short) i_e; i++)
    for (j=(short) j_s; j<=(short) j_e; j--)
    {
    stk_id = stk_substring [i][j].stroke_id;
    if ( stk_id > 0 )
        poss_stk_rd[ stk_id ].status = -1;
    }

/*---------------------------------------------------------------*/
/* Delete the possible strokes belonging to the mapped possible stroke. */
/*---------------------------------------------------------------*/ i_s = poss_stk_rd[ poss_stk_id ].fv_sp;
  i_e = poss_stk_rd[ poss_stk_id ].fv_ep;
  j_e = poss_stk_rd[ poss_stk_id ].fv_ep;
  for (i=(short) i_s; i<=(short) i_e; i++)
    for (j=i; j<=(short) j_e; j++)
    {
    stk_id = stk_substring [i][j].stroke_id;
    if ( stk_id > 0 )
```

```
        poss_stk_rd[ stk_id].status = -1;
    }

/*------------------------------------------------------------*/
/* Delete the possible strokes having the substrings of the mapped  */
/* possible stroke in the prefix.                                   */
/*------------------------------------------------------------*/ i_s = poss_stk_rd [poss_stk_id].fv_sp;
    i_e = poss_stk_rd [poss_stk_id].fv_ep;
    j_s = poss_stk_rd [poss_stk_id].fv_ep;
    j_e = input_stroke [inp_stk_idx].fv_ep;

for (i=(short) i_s; i<=(short) i_e; i++)
      for (j=(short) j_s; j<=(short) j_e; j++)
      {
        stk_id = stk_substring [i][j].stroke_id;
        if ( stk_id > 0 )
           poss_stk_rd[ stk_id].status = -1;
      }

/*------------------------------------------------------------*/
/* Delete the possible strokes having the substrings of the mapped  */
/* possible stroke in the suffix                                    */
/*------------------------------------------------------------*/ i_s = input_stroke [inp_stk_idx].fv_sp;
    i_e = poss_stk_rd [poss_stk_id].fv_sp;
    j_s = poss_stk_rd [poss_stk_id].fv_sp;
    j_e = poss_stk_rd [poss_stk_id].fv_ep;

for (i=(short) i_s; i<=(short) i_e; i++)
      for (j=(short) j_s; j<=(short) j_e; j++)
      {
        stk_id = stk_substring [i][j].stroke_id;
        if ( stk_id > 0 )
           poss_stk_rd[ stk_id].status = -1;
      }

} void UpdateSpEp_sort_stroke_id( FeaType )
unsigned char FeaType;
{
unsigned char p, stk_id;
```

```
   p = Sp_sort_stroke_id[FeaType];
   while (p<=Ep_sort_stroke_id[FeaType])
   {
     stk_id = sort_stroke_id [FeaType][p];
     if (poss_stk_rd[ stk_id].status == -1)
        Sp_sort_stroke_id[FeaType] = p;
     else break;
     p++;
   } p= Ep_sort_stroke_id[FeaType];
   while (p>=Sp_sort_stroke_id[FeaType])
   {
     stk_id = sort_stroke_id [FeaType][p];
     if (poss_stk_rd[ stk_id].status == -1)
        Ep_sort_stroke_id[FeaType] = p;
     else break;
     p--;
   }

} void RecordCutPossStkId (comp_idx, CutPossStk, PossibleStrokeCount)
unsigned char       comp_idx;
CUT_POSSIBLE_STK_RECORD CutPossStk[10];
unsigned char       PossibleStrokeCount;
{
unsigned char       i;
unsigned char       bk, bit;

for (i=1; i<=PossibleStrokeCount; i++)
     {
     if (poss_stk_rd[i].status > 0)
        {
        bk = (unsigned char) (i/32); bit= (unsigned char) (i%32);
        CutPossStk [comp_idx].poss_stk_id [bk] |= 1_BIT [bit];
        }
     }
}

/****************************************************************/
/* File Name: map_rel.c                                         */
/*--------------------------------------------------------------*/
/* short Function_1 (CompStkCnt, RefMapToInput, PossibleStrokeCount  */
/*         poss_stk_rd, input_stroke, f_seg, primitive_map, GCount)  */
```

```c
/*****************************************************************/ include    <stdio.h>
include    <memory.h>
#include    "extern.c"

short Function_1 (CompStkCnt)
short           CompStkCnt [10]; /* 0: CompCnt */
{
   short   Count;
   short   Start, End;
   short   Flag;
   short   i, j, k;
   short   NextComp;
   short   NextStroke;
   short   MySegID;
   short   PrevSegID;
   short   NextSegID;
   short   LineUsed[200];
   unsigned char   InputMapToRefComp[SIZE_SEG_BUF];
   unsigned char   InputMapToRefStk[SIZE_SEG_BUF];

/* fore_fore, fore-null */
   memset(LineUsed, 0, sizeof(LineUsed));
   memset(InputMapToRefComp, 0, sizeof(InputMapToRefComp));
   memset(InputMapToRefStk, 0, sizeof(InputMapToRefStk));
   Count = 0;
   for (i = 1; i <= CompStkCnt[0]; i++)
   {
      for (j = 1; j <= CompStkCnt[i]; j++)
      {
         if (RefMapToInput[i][j] != 0)   /* fore-fore */
         {
            primitive_map[Count].primitive_type = FORE_FORE;
            primitive_map[Count].ref_comp1 = i;
            primitive_map[Count].ref_stk1 = j;
            primitive_map[Count].ref_comp2 = i;
            primitive_map[Count].ref_stk2 = j;
            primitive_map[Count].inp_no1 = poss_stk_rd[RefMapToInput[i][j]].fv_sp;
            primitive_map[Count].inp_no2 = poss_stk_rd[RefMapToInput[i][j]].fv_ep;
            (Count)++;
            for (k = poss_stk_rd[RefMapToInput[i][j]].fv_sp; k <=
poss_stk_rd[RefMapToInput[i][j]].fv_ep; k++)
            {
               LineUsed[k] = 1;
               InputMapToRefComp[k] = i;
               InputMapToRefStk[k] = j;
```

```
            }
        }
        else   /* fore-null */
        {
            primitive_map[Count].primitive_type = FORE_NULL;
            primitive_map[Count].ref_comp1 = i;
            primitive_map[Count].ref_stk1 = j;
            primitive_map[Count].ref_comp2 = i;
            primitive_map[Count].ref_stk2 = j;
            primitive_map[Count].inp_no1 = 0;
            primitive_map[Count].inp_no2 = 0;
            (Count)++;
        }
    }
}

/* back-back, back-point, back-fore */
for (i = 1; i <= CompStkCnt[0]; i++)
{
    for (j = 1; j <= CompStkCnt[i]; j++)
    {
        /* make next stroke */
        /* next ref-stroke no */
        if (j == CompStkCnt[i])
        {
            if (i == CompStkCnt[0])   break;
            NextComp = i + 1;
            NextStroke = 1;
        }
        else
        {
            NextComp = i;
            NextStroke = j + 1;
        }

MySegID = poss_stk_rd[RefMapToInput[i][j]].fv_ep;
        NextSegID = poss_stk_rd[RefMapToInput[NextComp][NextStroke]].fv_sp;

/* check back-back, back-point */
        /* check back-point */
        if ((f_seg[input_stroke[MySegID].fv_ep].end_pt.x ==
f_seg[input_stroke[NextSegID].fv_sp].start_pt.x)
            && (f_seg[input_stroke[MySegID].fv_ep].end_pt.y ==
f_seg[input_stroke[NextSegID].fv_sp].start_pt.y))
        {
            primitive_map[Count].primitive_type = BACK_POINT;
            primitive_map[Count].ref_comp1 = i;
            primitive_map[Count].ref_stk1 = j;
```

80

```
                    primitive_map[Count].ref_comp2 = NextComp;
                    primitive_map[Count].ref_stk2 = NextStroke;
                    primitive_map[Count].inp_no1 = MySegID;
                    primitive_map[Count].inp_no2 = NextSegID;
                    (Count)++;
                }
                /* check back-back */
                else
                {
#if RESTRICT_BACK_BACK
                    if ((NextSegID - MySegID) == 1)
#endif
                    {
                        primitive_map[Count].primitive_type = BACK_BACK;
                        primitive_map[Count].ref_comp1 = i;
                        primitive_map[Count].ref_stk1 = j;
                        primitive_map[Count].ref_comp2 = NextComp;
                        primitive_map[Count].ref_stk2 = NextStroke;
                        primitive_map[Count].inp_no1 = MySegID;
                        primitive_map[Count].inp_no2 = NextSegID;
                        (Count)++;
                    }
                } if OLD_PROGRAM
                if ((RefMapToInput[i][j] == RefMapToInput[NextComp][NextStroke]) /* the same
stroke */
                {
#if RESTRICT_BACK_FORE
                    if ((NextSegID - MySegID) == 2)
#endif
                    {
                        primitive_map[Count].primitive_type = BACK_FORE;
                        primitive_map[Count].ref_comp1 = i;
                        primitive_map[Count].ref_stk1 = j;
                        primitive_map[Count].ref_comp2 = NextComp;
                        primitive_map[Count].ref_stk2 = NextStroke;
                        primitive_map[Count].inp_no1 = MySegID;
                        primitive_map[Count].inp_no2 = NextSegID;
                        (Count)++;
                    }
                }
#endif
            }
        }

/* null-fore or back-fore */
        for (j = 1; j <= PossibleStrokeCount; j++)
```

82

```
{
    if ((poss_stk_rd[j].status == -1) || (poss_stk_rd[j].status == -2)) continue;
    Flag = 0;
    for (k = poss_stk_rd[j].fv_sp; k <= poss_stk_rd[j].fv_ep; k++)
    {
        if (LineUsed[k] != 0) Flag = 1;
    }
    if (Flag == 0)
    {
        if ((poss_stk_rd[j].fv_sp == poss_stk_rd[1].fv_sp)
           || (poss_stk_rd[j].fv_ep == poss_stk_rd[PossibleStrokeCount].fv_ep))    goto
NullForeLabel;
        PrevSegID = poss_stk_rd[j].fv_sp - 1;
        NextSegID = poss_stk_rd[j].fv_ep + 1;
        if ((PrevSegID >= 0) && (NextSegID <= poss_stk_rd[PossibleStrokeCount].fv_ep))
        {
#if RESTRICT_BACK_FORE
            if ((NextSegID - PrevSegID) != 2) goto  NullForeLabel;
#endif
            if (InputMapToRefComp[PrevSegID] == InputMapToRefComp[NextSegID])
            {
                if ((InputMapToRefStk[NextSegID] - InputMapToRefStk[PrevSegID]) == 1)
                {
                    goto BackForeLabel;
                }
            }
            else if ((InputMapToRefComp[NextSegID] - InputMapToRefComp[PrevSegID])
== 1)
            {
                if ((InputMapToRefStk[PrevSegID] ==
CompStkCnt[InputMapToRefStk[PrevSegID]])
                   && (InputMapToRefStk[NextSegID] == 1))
                {
                    goto BackForeLabel;
                }
            }
            goto NullForeLabel;
        }

NullForeLabel ,
        primitive_map[Count].primitive_type = NULL_FORE;
        primitive_map[Count].ref_comp1 = 0;
        primitive_map[Count].ref_stk1 = 0;
        primitive_map[Count].ref_comp2 = 0;
        primitive_map[Count].ref_stk2 = 0;
        primitive_map[Count].inp_no1 = poss_stk_rd[j].fv_sp;
        primitive_map[Count].inp_no2 = poss_stk_rd[j].fv_ep;
        (Count)++;
```

```
            goto    next;

BackForeLabel:;
        primitive_map[Count].primitive_type = BACK_FORE;
        primitive_map[Count].ref_comp1 = InputMapToRefComp[PrevSegID];
        primitive_map[Count].ref_stk1 = InputMapToRefStk[PrevSegID];
        primitive_map[Count].ref_comp2 = InputMapToRefComp[NextSegID];
        primitive_map[Count].ref_stk2 = InputMapToRefStk[NextSegID];
        primitive_map[Count].inp_no1 = poss_stk_rd[j].fv_sp;
        primitive_map[Count].inp_no2 = poss_stk_rd[j].fv_ep;
        (Count)++;
next:;

for (k = j + 1; k <= PossibleStrokeCount; k++)
        {
          Start = poss_stk_rd[k].fv_sp;
          End = poss_stk_rd[k].fv_ep;
          if ((Start >= poss_stk_rd[j].fv_sp) && (End <= poss_stk_rd[j].fv_ep))
          {
            poss_stk_rd[k].status = -2;
          }
        }
      }
    }

/* recover status */
    for (j = 1; j <= PossibleStrokeCount; j++)
    {
      if (poss_stk_rd[j].status == -2)
      {
        poss_stk_rd[j].status = -1;
      }
    } return(Count);
}

/****************************************************************/
/* File Name: add_comp.c                                        */
/*--------------------------------------------------------------*/
/* unsigned short   CompNoToRulePtr(CompCode)                   */
/* unsigned short   CompNoToPattPtr(CompCode)                   */
/****************************************************************/ include   <stdio.h>
include   "extern.c"
```

```
unsigned short CompNoToRulePtr(CompCode)
unsigned short CompCode;
{
   short   CompPtr;

CompPtr = (unsigned short) (idx_comp_rule_array[CompCode / 1000].sp + (CompCode
% 1000) - 1);

return(CompPtr);
} unsigned short CompNoToPattPtr(CompCode)
unsigned short CompCode;
{
   short   CompPtr;

CompPtr = (unsigned short) (idx_comp_patt_array[CompCode / 1000].sp + (CompCode
% 1000) - 1);

return(CompPtr);
}

/******************************************************************
 *
 * MODULE NAME: Computation of discrimination functions
 *
 ******************************************************************/

/**************************************************/
/* File Name: \third_p\sra\sra_mat.c              */
/*------------------------------------------------*/
/* AllPoss_InputSra (PossibleStrokeCount)         */
/* Sra_Match (match_code)                         */
/* eight_dir (xs, ys, xe, ye)                     */
/* Load_CompSRA_txt ()                            */
/**************************************************/ include   <stdio.h>
include   <stdlib.h>
#include   <memory.h>
#include   <dos.h>
#include   <errno.h>
#include   <fcntl.h>
#include   <share.h>
#include   "extern.c"
```

85

```c
void AllPoss_InputSra (PossibleStrokeCount)
unsigned char     PossibleStrokeCount;
{
unsigned char   inv_dir [9] = {4,5,6,7,0,1,2,3,8};
unsigned char   i_fv_sp, i_fv_ep, j_fv_sp, j_fv_ep;
unsigned char   dir_es, dir_ee, dir_ss, dir_se;
unsigned char   inv_dir_es, inv_dir_ee, inv_dir_ss, inv_dir_se;
unsigned char   i_xs, i_ys, i_xe, i_ye;
unsigned char   j_xs, j_ys, j_xe, j_ye;
unsigned char   i, j;

for ( i=(unsigned char) 1; i<=PossibleStrokeCount; i++)
     {
       for ( j=(unsigned char) (i+1); j<=PossibleStrokeCount; j++)
         { if (poss_stk_rd [i].input_stroke_no == poss_stk_rd [j].input_stroke_no)
            {
            if ( ((poss_stk_rd [i].fv_sp <= poss_stk_rd [j].fv_ep) &&
                  (poss_stk_rd [i].fv_ep >= poss_stk_rd [j].fv_sp)) ||
                 ((poss_stk_rd [j].fv_sp <= poss_stk_rd [i].fv_ep) &&
                  (poss_stk_rd [j].fv_ep >= poss_stk_rd [i].fv_sp)) )

{   /* overlap */
               input_sra [i][j].es = (unsigned char) 0;
               input_sra [i][j].ee = (unsigned char) 0;
               input_sra [i][j].ss = (unsigned char) 0;
               input_sra [i][j].se = (unsigned char) 0;

input_sra [j][i].es = (unsigned char) 0;
               input_sra [j][i].ee = (unsigned char) 0;
               input_sra [j][i].ss = (unsigned char) 0;
               input_sra [j][i].se = (unsigned char) 0;

goto next;
               }
            } i_fv_sp = poss_stk_rd [i].fv_sp;
         i_fv_ep = poss_stk_rd [i].fv_ep;

j_fv_sp = poss_stk_rd [j].fv_sp;
         j_fv_ep = poss_stk_rd [j].fv_ep;

i_xs = f_seg [i_fv_sp].start_pt.x;
         i_ys = f_seg [i_fv_sp].start_pt.y;
         i_xe = f_seg [i_fv_ep].end_pt.x;
```

```
            i_ye = f_seg [i_fv_ep].end_pt.y;

j_xs = f_seg [j_fv_sp].start_pt.x;
            j_ys = f_seg [j_fv_sp].start_pt.y;
            j_xe = f_seg [j_fv_ep].end_pt.x;
            j_ye = f_seg [j_fv_ep].end_pt.y;

dir_es = eight_dir (i_xe, i_ye, j_xs, j_ys);
            dir_ee = eight_dir (i_xe, i_ye, j_xe, j_ye);
            dir_ss = eight_dir (i_xs, i_ys, j_xs, j_ys);
            dir_se = eight_dir (i_xs, i_ys, j_xe, j_ye);

inv_dir_es = inv_dir [dir_es];
            inv_dir_ee = inv_dir [dir_ee];
            inv_dir_ss = inv_dir [dir_ss];
            inv_dir_se = inv_dir [dir_se];

input_sra [i][j].es = (unsigned char) c_BIT [dir_es];
            input_sra [i][j].ee = (unsigned char) c_BIT [dir_ee];
            input_sra [i][j].ss = (unsigned char) c_BIT [dir_ss];
            input_sra [i][j].se = (unsigned char) c_BIT [dir_se];

input_sra [j][i].es = (unsigned char) c_BIT [inv_dir_se];
            input_sra [j][i].ee = (unsigned char) c_BIT [inv_dir_ee];
            input_sra [j][i].ss = (unsigned char) c_BIT [inv_dir_ss];
            input_sra [j][i].se = (unsigned char) c_BIT [inv_dir_es];
next:
            }
        }
} short Sra_Match (match_code)
short           match_code;
{
short       CompCnt, StkCnt, SraCnt;
short       CompRuleCode, CompPattCode;
short       CompRulePtr, CompSraPtr, cp_sra;
short       comp_idx, stroke_idx;
short       match_poss_stk_id, next_poss_stk_id;
short       err_count;

CompCnt = (unsigned char)((long) char_dsp [match_code] st_frame_code /
(long)100000000);
    for (comp_idx=0, err_count=0; comp_idx<CompCnt; comp_idx++)
        {
```

```
        CompRuleCode = comp_elm [char_dsp [match_code].sp_comp_elm +
comp_idx].comp_code;
        CompRulePtr = CompNoToRulePtr(CompRuleCode);
        CompPattCode = Rule_to_PattCode [CompRulePtr];
        CompSraPtr = (unsigned short) (idx_comp_patt_array [CompPattCode / 1000].sp +
(CompPattCode % 1000) - 1);
        StkCnt = CompPattCode / 1000;
        SraCnt = StkCnt - 1;
        cp_sra = comp_sra_array [CompSraPtr].sra_ptr;

if ((SraCnt > 0) && (cp_sra == -1))   {err_count = 200; goto rt;} for (stroke_idx=0; stroke_idx<SraCnt; stroke_idx++, cp_sra++)
            {
            match_poss_stk_id = RefMapToInput [comp_idx][stroke_idx];
            next_poss_stk_id  = RefMapToInput [comp_idx][stroke_idx+1];

if ((match_poss_stk_id == 0) || (next_poss_stk_id == 0)) continue;

if ((input_sra [match_poss_stk_id][next_poss_stk_id].es & comp_sra [cp_sra].es) ==
0)  err_count ++;
            if ((input_sra [match_poss_stk_id][next_poss_stk_id].ee & comp_sra [cp_sra].ee) ==
0)  err_count ++;
            if ((input_sra [match_poss_stk_id][next_poss_stk_id].ss & comp_sra [cp_sra].ss) == 0)
err_count ++;
            if ((input_sra [match_poss_stk_id][next_poss_stk_id].se & comp_sra [cp_sra].se) ==
0)  err_count ++;
            }
        } rt:
    return (err_count);
}

/*--------------------------------------------------------------*/
/* Function Name: eigth_dir (xs, ys, xe, ye)                    */
/*--------------------------------------------------------------*/
/* Description of Arguments:                                    */
/*      xs, ys:   the location of the start point               */
/*      xe, ye:   the location of the end point                 */
/*--------------------------------------------------------------*/
/* Description:  evaluate direction in 8-direction code         */
/*--------------------------------------------------------------*/ eight_dir (xs, ys, xe, ye)
short      xs, ys, xe, ye;
```

88

```
{
float detax, detay;
float ftan;
short plane;
short dir_8;

detax=xe - xs;
detay=ye - ys;

if ((detax == 0) && (detay == 0))  dir_8 = 8;

else if ((detax == 0) && (detay != 0))
        {
        if (detay > 0)   dir_8=2;
        else       dir_8=6;
        } else if ((detax != 0) && (detay == 0))
        {
        if (detax > 0) dir_8=0;
        else      dir_8=4;
        } else {   /*--- (detax != 0) && (detay != 0) ---*/ ftan = detay/detax;

if (detax > 0)
        {
        if (detay > 0)    plane=1;
        else       plane=4;
        }
    else {if (detay > 0)   plane=2;
        else      plane=3;
        } if (ftan > 0)
        {
           if (ftan >= 2.4142)     dir_8=2;
        else {if (ftan > 0.4142)    dir_8=1;
           else      dir_8=0;
           }
        } else {     if (ftan < -2.4142)     dir_8=6;
```

```
            else {if (ftan <= -0.4142)   dir_8=7;
                else            dir_8=0;
                }
            } if ((plane == 2) || (plane == 3))
            {
            if (dir_8 < 4)    dir_8 += 4;
            else        dir_8 -= 4;
            }
        } return (dir_8);
} void Load_CompSRA_txt ()
{
    static char   sra_fname [] = "c:\\pda\\comp_sra\\sra   ";
    static char   stk_fname [] = "c:\\pda\\comp_stk\\stk   ";
    char          ChangeDir = 4;

FILE          *fi1, *fi2, *fo;
    COMP_CRULES_STRUCT    *q;
    COMPONENT_STRUCT *r;
    short         Comp_PattCode, stk_type;
    unsigned short  comp_ptr, sra_ptr;
    unsigned char  Dir_8 [20][4], dir_num;
    char          line_buffer [300], string [10];
    unsigned char    stkno, seqno;
    unsigned char    sra_no, sra_sub_type;
    unsigned char    i, j, k, l;
    short         n;
    short         lost_stk=0, lost_sra=0;
    char    valid[10];
    char    ch;
    unsigned char temp;

printf( "\nLoad Stroke SRA information...  " );

fo = fopen ("sra.err", "w");
    fclose (fo);

mask_initial ();

sra_ptr = 0;
```

```c
for ( stkno=2; stkno<SIZE_IDX_COMP_ARRAY; stkno++ )
{
  for (seqno=1; seqno<=idx_comp_patt_array [stkno].count; seqno++ )
  {
    Comp_PattCode = stkno*1000 + seqno;

comp_ptr = idx_comp_patt_array [stkno].sp + seqno -1;

if (comp_ptr >= SIZE_COMP_PATT_ARRAY)
      {
      printf( "\nComp_PattCode=%d\n", Comp_PattCode );
      printf( "\nError in comp_ptr=%d\n", comp_ptr );
      printf( "\nExcess SIZE_COMP_PATT_ARRAY!!!\n" );
      exit(0);
      } stk_fname [15+ChangeDir] = (char) (Comp_PattCode/10000 + '0');
    stk_fname [16+ChangeDir] = (char) ((Comp_PattCode/1000)%10 + '0');
    stk_fname [17+ChangeDir] = (char) ((Comp_PattCode/100)%10 + '0');
    stk_fname [18+ChangeDir] = (char) ((Comp_PattCode/10)%10 + '0');
    stk_fname [19+ChangeDir] = (char) (Comp_PattCode%10 + '0');

sra_fname [15+ChangeDir] = (char) (Comp_PattCode/10000 + '0');
    sra_fname [16+ChangeDir] = (char) ((Comp_PattCode/1000)%10 + '0');
    sra_fname [17+ChangeDir] = (char) ((Comp_PattCode/100)%10 + '0');
    sra_fname [18+ChangeDir] = (char) ((Comp_PattCode/10)%10 + '0');
    sra_fname [19+ChangeDir] = (char) (Comp_PattCode%10 + '0');

fi1 = fopen (stk_fname, "r");
    if (fi1 == NULL)
      {
      goto next;
      }
    fclose (fi1);

fi2 = fopen (sra_fname, "r");
    if (fi2 == NULL)
      {
      fclose (fi1);

fo = fopen ("sra.err", "a");
      fprintf(fo, "No this file: %s patt_code=%05d\n",
              sra_fname, Comp_PattCode);
      fclose (fo);
```

```
      lost_sra ++;

goto next;
      }
   fgets ( line_buffer, 250, fi2);
   fgets ( line_buffer, 250, fi2);

for ( sra_no=0; sra_no<(stkno-1); sra_no++)
      { fgets ( line_buffer, 250, fi2);

for ( sra_sub_type=0; sra_sub_type<4; sra_sub_type++)
         {
         Dir_8 [sra_no][sra_sub_type] = 0;

fgets ( line_buffer, 250, fi2);

temp = strlen(line_buffer) - 1;

k = 0, l = 0;
         while (l < temp)
            {
            for (j = l; j < temp; j++)
               {
               ch = line_buffer[j];
               if ((ch >= '0') && (ch <= '9')) break;
               continue;
               }

/*--- Fetching the substring of the numerical numbers ---*/ for (; j < temp; j++)
               {
               ch = line_buffer[j];
               if (!((ch >= '0') && (ch <= '9')))  break;
               valid[k] = ch;
               k++;
               }
            valid[k] = '\0';

if (k != 0)
               {
               dir_num = atoi(valid);
               Dir_8 [sra_no][sra_sub_type] |= c_BIT [dir_num];
               }
```

91

```
                    k = 0; l = j;
                    }

}
           } fclose (fi2);

comp_sra_array [comp_ptr].sra_ptr = sra_ptr;
       for ( sra_no=0; sra_no<(stkno-1); sra_no++, sra_ptr++)
          {
          if (sra_ptr >= SIZE_COMP_STK)
             {
             printf( "\nComp_PattCode=%d sra_ptr=%d\n",
                  Comp_PattCode, sra_ptr );
             printf( "\nExcess SIZE_COMP_STK!!!\n" );
             exit(0);
             } comp_sra [sra_ptr].es = Dir_8 [sra_no][0];
          comp_sra [sra_ptr].ee = Dir_8 [sra_no][1];
          comp_sra [sra_ptr].ss = Dir_8 [sra_no][2];
          comp_sra [sra_ptr].se = Dir_8 [sra_no][3];
          } if (sra_ptr >= SIZE_COMP_STK)
          {
          printf( "\nComp_PattCode=%d sra_ptr=%d\n",
               Comp_PattCode, sra_ptr );
          printf( "\nExcess SIZE_COMP_STK!!!\n" );
          exit(0);
          } comp_sra [sra_ptr].es = 0xff;
       comp_sra [sra_ptr].ee = 0xff;
       comp_sra [sra_ptr].ss = 0xff;
       comp_sra [sra_ptr].se = 0xff;

sra_ptr ++;

next:
       }
    } printf( "Complete!\n" );
    printf( "The last sra_ptr=%d;  ", (sra_ptr-1) );
    printf( "Lost lost sraxxxx : %2d\n", lost_sra);
```

}

```c
/*******************************************/
/* File Name: \third_p\sra\stru_mat.c       */
/*------------------------------------------*/
/* Input_CompRpInfo (CompStkCnt)            */
/* Input_CompStructInfo (CompStkCnt)        */
/* CharStruct_Match (match_code)            */
/*******************************************/ include    <stdio.h>
include    <stdlib.h>
#include    <memory.h>
#include    <dos.h>
#include    <errno.h>
#include    <fcntl.h>
include    <share.h> include    "extern.c"

void Input_CompRpInfo ();
void Input_CompStructInfo ();

void Input_CompRpInfo (CompStkCnt)
short           CompStkCnt [10];   /* 0: CompCnt */
{
short           i;
short           comp_idx, comp_idx1, stroke_idx;
unsigned char fv_sp, fv_ep, match_poss_stk_id;

for (comp_idx=0; comp_idx<CompStkCnt[0]; comp_idx++)
    {
    comp_rp [comp_idx].LB_x = 100;
    comp_rp [comp_idx].LB_y = 100;
    comp_rp [comp_idx].RT_x = -1;
    comp_rp [comp_idx].RT_y = -1;

comp_idx1 = comp_idx+1;
    for (stroke_idx=0; stroke_idx<CompStkCnt[comp_idx1]; stroke_idx++)
      {
      match_poss_stk_id = RefMapToInput [comp_idx][stroke_idx];
      if (match_poss_stk_id != 0)
        {
```

```
            fv_sp = poss_stk_rd [match_poss_stk_id].fv_sp;
            fv_ep = poss_stk_rd [match_poss_stk_id].fv_ep;

for (i=fv_sp; i<=fv_ep; i++)
               {
               if (comp_rp [comp_idx].LB_x > f_seg [i].start_pt.x)
                  comp_rp [comp_idx].LB_x = f_seg [i].start_pt.x;
               if (comp_rp [comp_idx].LB_x > f_seg [i].end_pt.x)
                  comp_rp [comp_idx].LB_x = f_seg [i].end_pt.x;

if (comp_rp [comp_idx].LB_y > f_seg [i].start_pt.y)
                  comp_rp [comp_idx].LB_y = f_seg [i].start_pt.y;
               if (comp_rp [comp_idx].LB_y > f_seg [i].end_pt.y)
                  comp_rp [comp_idx].LB_y = f_seg [i].end_pt.y;

if (comp_rp [comp_idx].RT_x < f_seg [i].start_pt.x)
                  comp_rp [comp_idx].RT_x = f_seg [i].start_pt.x;
               if (comp_rp [comp_idx].RT_x < f_seg [i].end_pt.x)
                  comp_rp [comp_idx].RT_x = f_seg [i].end_pt.x;

if (comp_rp [comp_idx].RT_y < f_seg [i].start_pt.y)
                  comp_rp [comp_idx].RT_y = f_seg [i].start_pt.y;
               if (comp_rp [comp_idx].RT_y < f_seg [i].end_pt.y)
                  comp_rp [comp_idx].RT_y = f_seg [i].end_pt.y;
               }
            }
         }
      }
   }
} void Input_CompStructInfo (CompStkCnt)
short              CompStkCnt [10];   /* 0: CompCnt */
{
short    CompStructCnt;
short    comp_idx, comp_idx1;
char  LB_x, LB_y, RT_x, RT_y;
char  next_LB_x, next_LB_y, next_RT_x, next_RT_y;
short    a_dir_8, b_dir_8, c_dir_8, d_dir_8;

CompStructCnt = CompStkCnt [0] - 1;
   for (comp_idx=0; comp_idx<CompStructCnt; comp_idx++)
      {
      comp_idx1 = comp_idx + 1;
      LB_x = comp_rp [comp_idx].LB_x;
      LB_y = comp_rp [comp_idx].LB_y;
      RT_x = comp_rp [comp_idx].RT_x;
```

```
    RT_y = comp_rp [comp_idx].RT_y;

next_LB_x = comp_rp [comp_idx1].LB_x;
    next_LB_y = comp_rp [comp_idx1].LB_y;
    next_RT_x = comp_rp [comp_idx1].RT_x;
    next_RT_y = comp_rp [comp_idx1].RT_y;

a_dir_8 = eight_dir (LB_x, LB_y, next_LB_x, next_LB_y);
    b_dir_8 = eight_dir (LB_x, LB_y, next_RT_x, next_RT_y);
    c_dir_8 = eight_dir (RT_x, RT_y, next_LB_x, next_LB_y);
    d_dir_8 = eight_dir (RT_x, RT_y, next_RT_x, next_RT_y);

input_comp_str    [comp_idx].a = c_BIT [a_dir_8];
    input_comp_str    [comp_idx].b = c_BIT [b_dir_8];
    input_comp_str    [comp_idx].c = c_BIT [c_dir_8];
    input_comp_str    [comp_idx].d = c_BIT [d_dir_8];
    }
} short CharStruct_Match (match_code)
short            match_code;
{
short     CompStkCnt [10];   /* 0. CompCnt */
short     StrCnt;
short     struct_code;
short     CharStrPtr, cp_str;
short     comp_idx;
short     err_count;

CharCompInfo      (CompStkCnt, match_code);
   Input_CompRpInfo    (CompStkCnt);
   Input_CompStructInfo (CompStkCnt);

struct_code = (short) (char_dsp [match_code].st_frame_code / 1000000);
   CharStrPtr  = (short) idx_st_frame_array [struct_code/100].sp + (struct_code%100) -1;
   cp_str = char_str_array [CharStrPtr].struct_ptr;
   StrCnt = CompStkCnt [0] - 1;
   if ((StrCnt > 0) && (cp_str == -1))    {err_count = 200; goto rt;} for (comp_idx=0, err_count=0; comp_idx<StrCnt; comp_idx++, cp_str++)
      {
      if ((input_comp_str [comp_idx].a & comp_str [cp_str].a) == 0)  err_count ++;
      if ((input_comp_str [comp_idx].b & comp_str [cp_str].b) == 0)  err_count ++;
      if ((input_comp_str [comp_idx].c & comp_str [cp_str].c) == 0)  err_count ++;
      if ((input_comp_str [comp_idx].d & comp_str [cp_str].d) == 0)  err_count ++;
      }
```

```
rt:
   return (err_count);
}

/****************************************************/
/* File Name. leng_cmp.c                            */
/*--------------------------------------------------*/
/* CalInputLength (a, b)                            */
/* Input_f_seg_ratio ( f_seg, f_seg_ratio, f_seg_cnt)   */
/*--------------------------------------------------*/
/* Comp_AllCharPattLength (sel_charcode, s_code, e_code) */
/* Length_OneCharPatt (CharCode)                    */
/****************************************************/ include   <stdio.h>
include   "extern.c"

short Length_OneCharPatt ();
float length ();

void Input_f_seg_ratio ( f_seg, f_seg_ratio, f_seg_cnt)
SEGMENT_STRUCT_1   *f_seg;
float        *f_seg_ratio;
short              f_seg_cnt;
{
short      i;
short      InputLength;

/*--------------------------------------------------*/
   /* Total length of line segments in the input script */
   /*--------------------------------------------------*/

InputLength = CalInputLength (0, (short) (f_seg_cnt-1));

for (i=0; i<f_seg_cnt; i++)
      {
      f_seg_ratio [i] = (float) f_seg [i].length;
      f_seg_ratio [i] = (float) (f_seg_ratio [i]/InputLength);
      }
} short      CalInputLength(a, b)
short      a, b;
{
short      j;
short      Length;
```

```
   Length = 0;
   for (j = a; j <= b; j++)
   {
      Length += f_seg[j].length;
   } return(Length);
} void Comp_AllCharPattLength (sel_charcode, s_code, e_code)
unsigned char      sel_charcode [SIZE_char_blk];
short              s_code, e_code;
{
short i, bk, item;

for (i=s_code; i<=e_code; i++)
      {
      bk = i/8;   item = i%8;
      if ( (sel_charcode [bk] & c_BIT [item]) == 0 )      continue;

char_dsp [i].tot_length = (short) Length_OneCharPatt (i).
      }
} short Length_OneCharPatt (CharCode)
short              CharCode;
{
float              Rate[2];
short              i, j;
COMP_PATT_LS_STRUCT *cpl;
COMP_SYN_STRUCT *sp;
short              SSetPtr;
short              Start, Offset, CompCnt;
short              NewCompSynPtr;
short              CompPattCode;
short              CompRuleCode;
short              CompPattPtr;
short              CompRulePtr, Comp_ls_cnt;
short              sx, sy, ex, ey, tot_length;

SSetPtr = (short) ((short )((long )char_dsp[CharCode].st_frame_code % (long )1000) - 1);
   CompCnt = (unsigned char)((long )char_dsp[CharCode].st_frame_code /
(long )100000000);
   Start = (unsigned short )idx_st_frame_array [CompCnt].sp;
   Offset = (short )(((long )char_dsp[CharCode].st_frame_code / (long )1000000) %
(long )100);
```

```
Offset += Start;
Offset--;
NewCompSynPtr = RuleSet_st_frame_array[Offset].comp_syn_sp + (CompCnt * SSetPtr);

tot_length = 0;
for (i=0; i<CompCnt; i++)
   {
   CompRuleCode = comp_elm[char_dsp[CharCode].sp_comp_elm + i].comp_code;

sp = &comp_syn[NewCompSynPtr + i];
   Rate[0] = (float )sp->num_x_reduce / (float )sp->den_x_reduce;
   Rate[1] = (float )sp->num_y_reduce / (float )sp->den_y_reduce;

CompRuleCode = comp_elm[char_dsp[CharCode].sp_comp_elm + i].comp_code;
   CompRulePtr = CompNoToRulePtr(CompRuleCode);
   CompPattCode = Rule_to_PattCode [CompRulePtr];
   CompPattPtr = CompNoToPattPtr(CompPattCode);
   Comp_ls_cnt = comp_patt_array [CompPattPtr].ls_cnt;

for (j=0; j<Comp_ls_cnt; j++)
      {
      cpl = &comp_patt_ls[comp_patt_array[CompPattPtr].ls_ptr + j];

sx = (short) ((Rate[0] * cpl->xs) + sp->lc_x);
      sy = (short) ((Rate[1] * cpl->ys) + sp->lc_y);
      ex = (short) ((Rate[0] * cpl->xe) + sp->lc_x);
      ey = (short) ((Rate[1] * cpl->ye) + sp->lc_y);

tot_length += (short) length (sx, sy, ex, ey);
      }
   } return (tot_length);
} short Length_OnePattStroke (CharCode, comp_idx, stroke_idx)
short              CharCode, comp_idx, stroke_idx;
{
float      Rate[2];
short      i, j;
COMP_PATT_LS_STRUCT *cpl;
COMP_SYN_STRUCT *sp;
short              SSetPtr;
short              Start, Offset, CompCnt;
short              NewCompSynPtr;
short              CompPattCode;
short              CompRuleCode;
short              CompPattPtr;
```

```
short         CompRulePtr, Comp_ls_cnt;
short         sx, sy, ex, ey, one_stroke_length;
short         stk_acc;

SSetPtr = (short) ((short )((long )char_dsp[CharCode].st_frame_code % (long )1000) - 1);
   CompCnt = (unsigned char)((long )char_dsp[CharCode].st_frame_code /
(long )100000000);
   Start = (unsigned short )idx_st_frame_array [CompCnt].sp;
   Offset = (short )(((long )char_dsp[CharCode].st_frame_code / (long )1000000) %
(long )100);
   Offset += Start;
   Offset--;
   NewCompSynPtr = RuleSet_st_frame_array[Offset].comp_syn_sp + (CompCnt * SSetPtr);

CompRuleCode = comp_elm[char_dsp[CharCode].sp_comp_elm + comp_idx].comp_code;

sp = &comp_syn[NewCompSynPtr + comp_idx];
   Rate[0] = (float )sp->num_x_reduce / (float )sp->den_x_reduce;
   Rate[1] = (float )sp->num_y_reduce / (float )sp->den_y_reduce.

CompRuleCode = comp_elm[char_dsp[CharCode].sp_comp_elm + comp_idx].comp_code;
   CompRulePtr = CompNoToRulePtr(CompRuleCode);
   CompPattCode = Rule_to_PattCode [CompRulePtr];
   CompPattPtr = CompNoToPattPtr(CompPattCode);
   Comp_ls_cnt = comp_patt_array [CompPattPtr].ls_cnt;

one_stroke_length = 0;
for (j=0, stk_acc=0; j<Comp_ls_cnt; j++)
   {
   if (stk_acc > stroke_idx)  break;

cpl = &comp_patt_ls[comp_patt_array[CompPattPtr].ls_ptr + j];

if (stk_acc == stroke_idx)
      { sx = (short) ((Rate[0] * cpl->xs) + sp->lc_x);
      sy = (short) ((Rate[1] * cpl->ys) + sp->lc_y);
      ex = (short) ((Rate[0] * cpl->xe) + sp->lc_x);
      ey = (short) ((Rate[1] * cpl->ye) + sp->lc_y);

one_stroke_length += (short) length (sx, sy, ex, ey);
      } if (cpl->flag == 0)   stk_acc++;
```

}
   return (one_stroke_length);
}

```
/**********************************************************/
/* File Name: wei_dist.c                                   */
/*---------------------------------------------------------*/
/* Dist_A      (match_code)                                */
/* Dist_B (match_code, InputTotalScore)                    */
/* Dist_C (match_code, InputTotalScore)                    */
/*---------------------------------------------------------*/
/*---------------------------------------------------------*/
/* CharCompInfo   (CompStkCnt, CharCode)                   */
/* Count_Fore_Null (CompStkCnt)                            */
/* Count_Null_Fore (CompStkCnt, primitive_map_cnt)         */
/*---------------------------------------------------------*/
/* Count_Ref_TotalScore (s_code, e_code)                   */
/* Count_InputTotalScore (SL, SU)                          */
/* CountWeight_Fore_Null (match_code, CompStkCnt, TotalScore) */
/* CountWeight_Null_Fore (CompStkCnt, TotalScore)          */
/**********************************************************/ include   <stdio.h>
include   "extern.c"

void  CharCompInfo ();
void  CharCompInfo ();
short Count_Fore_Null (),
short Count_Null_Fore ();
short Count_Ref_TotalScore ();
short Count_InputTotalScore ();
short CountWeight_Fore_Null ();
short CountWeight_Null_Fore ();
short Count_FeasibleMap     ();
float CorrectMapRatio       ();

short Dist_A (match_code)
short       match_code;
{
short       CompStkCnt [10],   /* 0: CompCnt */
short       tot_error, sra_error, fore_null_error, null_fore_error;
short       primitive_map_cnt;

CharCompInfo (CompStkCnt, match_code);

sra_error = (short) Sra_Match (match_code);
```

```
    primitive_map_cnt = Function_1 (CompStkCnt);

fore_null_error = Count_Fore_Null (CompStkCnt);
    null_fore_error = Count_Null_Fore (CompStkCnt, primitive_map_cnt);

tot_error = sra_error + fore_null_error + null_fore_error;

return (tot_error);
} short Dist_B (match_code, InputTotalScore)
    short       match_code;
    short       InputTotalScore;
{
    short       CompStkCnt [10];    /* 0: CompCnt */
    short       tot_error, sra_error, fore_null_error, null_fore_error;
    short       primitive_map_cnt;

CharCompInfo (CompStkCnt, match_code);

sra_error = (short) Sra_Match (match_code);
    primitive_map_cnt = Function_1 (CompStkCnt);

fore_null_error = (short) CountWeight_Fore_Null (match_code, CompStkCnt);
    null_fore_error = (short) CountWeight_Null_Fore (CompStkCnt, InputTotalScore,
primitive_map_cnt);

if (sra_error < 0)       {printf ("sra_error < 0\n"); exit (0);}
    if (fore_null_error < 0) {printf ("fore_null_error < 0\n"); exit (0);}
    if (null_fore_error < 0) {printf ("null_fore_error < 0\n"); exit (0);} tot_error = sra_error + fore_null_error + null_fore_error;

if (tot_error < 0) {printf ("tot_error < 0\n"); exit (0);} return (tot_error);
} short Dist_C (match_code, InputTotalScore)
    short       match_code,
    short       InputTotalScore,
{
    short       CompStkCnt [10];    /* 0: CompCnt */
    short       tot_error, sra_error, str_error, fore_null_error, null_fore_error;
    short       primitive_map_cnt;
```

```
    CharCompInfo (CompStkCnt, match_code);

sra_error = (short) Sra_Match (match_code);

str_error = CharStruct_Match (match_code);

primitive_map_cnt = Function_1 (CompStkCnt);

fore_null_error = (short) CountWeight_Fore_Null (match_code, CompStkCnt);

null_fore_error = (short) CountWeight_Null_Fore (CompStkCnt, InputTotalScore,
primitive_map_cnt);

if (sra_error < 0)      {printf ("sra_error < 0\n"); exit (0);}
    if (fore_null_error < 0) {printf ("fore_null_error < 0\n"); exit (0);}
    if (null_fore_error < 0) {printf ("null_fore_error < 0\n"); exit (0);} tot_error = sra_error + str_error + fore_null_error + null_fore_error;

if (tot_error < 0) {printf ("tot_error < 0\n"); exit (0);} return (tot_error);
} short Dmp_Dist_C (match_code, InputTotalScore, ErrCount)
short      match_code;
short      InputTotalScore;
short      ErrCount [4];
{
short      CompStkCnt [10];    /* 0: CompCnt */
short      tot_error, sra_error, str_error, fore_null_error, null_fore_error;
short      primitive_map_cnt;

CharCompInfo (CompStkCnt, match_code);

sra_error = (short) Sra_Match (match_code);

str_error = CharStruct_Match (match_code);

primitive_map_cnt = Function_1 (CompStkCnt);

fore_null_error = (short) CountWeight_Fore_Null (match_code, CompStkCnt);
```

```c
    null_fore_error = (short) CountWeight_Null_Fore (CompStkCnt, InputTotalScore,
primitive_map_cnt);

if (sra_error < 0)      {printf ("sra_error < 0\n"); exit (0);}
    if (fore_null_error < 0) {printf ("fore_null_error < 0\n"); exit (0);}
    if (null_fore_error < 0) {printf ("null_fore_error < 0\n"); exit (0);} tot_error = sra_error + str_error + fore_null_error + null_fore_error;

if (tot_error < 0) {printf ("tot_error < 0\n"); exit (0);}

ErrCount [0] = sra_error;
    ErrCount [1] = str_error;
    ErrCount [2] = fore_null_error;
    ErrCount [3] = null_fore_error;

return (tot_error);
} short Dist_D (match_code, InputTotalScore)
short       match_code;
short       InputTotalScore;
{
short       CompStkCnt [10];    /* 0: CompCnt */
short       tot_error, sra_error, str_error, fore_null_error, null_fore_error;
short       primitive_map_cnt;
float   CorrectRatio;

CharCompInfo (CompStkCnt, match_code);

primitive_map_cnt = Function_1 (CompStkCnt);
    CorrectRatio = CorrectMapRatio (primitive_map_cnt);
    if (CorrectRatio < 0.75)
       {
       tot_error = 200;
       goto rt;
       } sra_error = (short) Sra_Match (match_code);

str_error = CharStruct_Match (match_code);

fore_null_error = (short) CountWeight_Fore_Null (match_code, CompStkCnt);
```

```
    null_fore_error = (short) CountWeight_Null_Fore (CompStkCnt, InputTotalScore,
primitive_map_cnt);

if (sra_error < 0)      {printf ("sra_error < 0\n"); exit (0);}
    if (fore_null_error < 0) {printf ("fore_null_error < 0\n"); exit (0);}
    if (null_fore_error < 0) {printf ("null_fore_error < 0\n"); exit (0);} tot_error = sra_error + str_error + fore_null_error + null_fore_error;

if (tot_error < 0) {printf ("tot_error < 0\n"); exit (0);} return (tot_error);
} float Filter_A (match_code)
short       match_code;
{
short       CompStkCnt [10];    /* 0: CompCnt */
short       primitive_map_cnt, FeasibleCount;
float       ratio;

CharCompInfo (CompStkCnt, match_code);

primitive_map_cnt = Function_1 (CompStkCnt);

FeasibleCount = Count_FeasibleMap (primitive_map_cnt);

ratio = FeasibleCount;
    ratio = (float) (ratio / primitive_map_cnt);

return (ratio);
} float CorrectMapRatio (primitive_map_cnt)
short           primitive_map_cnt;
{
short       FeasibleCount;
float       ratio;

FeasibleCount = Count_FeasibleMap (primitive_map_cnt);

ratio = FeasibleCount;
    ratio = (float) (ratio / primitive_map_cnt);

return (ratio);
}
```

105

```
/*-------- Functions ------------------------------------------------*/
void CharCompInfo (CompStkCnt, CharCode)
short           CompStkCnt [10];   /* 0: CompCnt */
short           CharCode;
{
short           i;
short           CompCnt;
short           CompRuleCode;

CompCnt = ((long )char_dsp[CharCode].st_frame_code / (long )100000000);
   CompStkCnt [0] = CompCnt;
   for (i=0; i<CompCnt; i++)
      {
      CompRuleCode = comp_elm[char_dsp[CharCode].sp_comp_elm + i].comp_code;
      CompStkCnt [i+1] = (short) (CompRuleCode/1000);
      }

} short Count_Fore_Null (CompStkCnt)
short           CompStkCnt [10];   /* 0: CompCnt */
{
short weight, err_count;
short comp_idx, comp_idx1, stroke_idx;

weight = 5;
   for (comp_idx=0, err_count=0, comp_idx<CompStkCnt[0], comp_idx++)
      {
      comp_idx1 = comp_idx+1;
      for (stroke_idx=0; stroke_idx<CompStkCnt[comp_idx1]; stroke_idx++)
         {
         if (RefMapToInput [comp_idx][stroke_idx] == 0)   err_count +=weight;
         }
      } return (err_count);
} short Count_Null_Fore (CompStkCnt, primitive_map_cnt)
short           CompStkCnt [10];   /* 0: CompCnt */
short           primitive_map_cnt;
{
short weight, err_count;
```

```c
short i;

weight = 5;
    for (i=0, err_count=0; i<primitive_map_cnt; i++)
       {
       if (primitive_map[i] primitive_type == NULL_FORE)   err_count +=weight;
       }
    return (err_count);
}

/*------- Length Weighted ----------------------------------------*/ short Count_Ref_TotalScore (s_code, e_code)
short                 s_code, e_code;
{
short CompCnt, TotalStkCnt;
short CompRuleCode;
short i, j, comp_idx;
short weight;

printf ("\nComputing Reference total score ...");

weight = 5;
    for (i=s_code; i<=e_code; i++)
       {
       CompCnt = (unsigned char)((long) char_dsp [i] st_frame_code / (long)100000000);
       TotalStkCnt = 0;
       for (comp_idx=0; comp_idx<CompCnt; comp_idx++)
          {
          CompRuleCode = comp_elm [char_dsp [i].sp_comp_elm + comp_idx] comp_code;
          TotalStkCnt += (short) (CompRuleCode/1000);
          } char_dsp [i] TotalScore = (short) (TotalStkCnt * weight).
       }
} short Count_InputTotalScore (SL, SU)
short                 SL, SU;
{
short TotalScore, weight;

weight = 5;
    TotalScore = ((SL+SU)/2) * weight;
    return (TotalScore);
}
```

```c
short CountWeight_Fore_Null (match_code, CompStkCnt)
short           match_code;
short           CompStkCnt [10];   /* 0: CompCnt */
{
short err_count;
short comp_idx, comp_idx1, stroke_idx;
float weight;

for (comp_idx=0, err_count=0; comp_idx<CompStkCnt[0]; comp_idx++)
      {
      comp_idx1 = comp_idx+1;
      for (stroke_idx=0; stroke_idx<CompStkCnt[comp_idx1]; stroke_idx++)
         {
         if (RefMapToInput [comp_idx][stroke_idx] == 0)
            {
            weight = (float) Length_OnePattStroke (match_code, comp_idx, stroke_idx);

if (char_dsp [match_code].tot_length == 0)
{printf ("match_code=%4d  tot_length=%d\n", match_code, char_dsp
[match_code].tot_length);
exit (0);}
            weight = (float) (weight / char_dsp [match_code].tot_length);

weight = (float) ((char_dsp [match_code].TotalScore * weight) + 0.5);

err_count += (short) weight;
            }
         }
      } return (err_count);
} short CountWeight_Null_Fore (CompStkCnt, TotalScore, primitive_map_cnt)
short            CompStkCnt [10];   /* 0: CompCnt */
short            TotalScore;
short            primitive_map_cnt;
{
short err_count;
float weight, one_err_count;
short i, j;
short fv_sp, fv_ep;

for (i=0, err_count=0; i<primitive_map_cnt; i++)
```

```
    {
    if (primitive_map[i].primitive_type == NULL_FORE)
        {
        fv_sp = primitive_map[i].inp_no1;
        fv_ep = primitive_map[i].inp_no2;

for (j=fv_sp, weight=0.0; j<=fv_ep; j++)
            {
            weight += f_seg_ratio [j];
            } one_err_count = (float) ((weight * TotalScore) + 0.5);

err_count += one_err_count;
            }
    } return (err_count);
} short Count_FeasibleMap (primitive_map_cnt)
short           primitive_map_cnt;
{
short FeasibleCount;
short i;

for (i=0, FeasibleCount=0; i<primitive_map_cnt; i++)
    {
    if ( (primitive_map[i].primitive_type == FORE_FORE)  ||
         (primitive_map[i].primitive_type == BACK_BACK)  ||
         (primitive_map[i].primitive_type == BACK_FORE)  ||
         (primitive_map[i].primitive_type == BACK_POINT) )
         FeasibleCount++;
    } return (FeasibleCount);
}
```

What is claimed is:

1. A stroke-order-free and stroke-number-free method for the on-line recognition of Chinese characters comprising the steps of:

(a) obtaining a database of template characters, each template character being represented by a set of stroke correspondence rules for describing its constituent basic strokes;

(b) obtaining a database of spatial relationships between strokes of characters and a database of character patterns;

(c) inputting a handwritten input script on an on-line basis;

(d) preprocessing said input script to select candidate template characters for matching against said input script;

(e) performing a basic stroke recognition procedure to identify all basic strokes contained in said input script using a database of basic strokes;

(f) classifying said strokes into fore strokes, back strokes, and points, wherein said fore strokes are strokes that actually appear in the character, said back strokes are fictitious strokes to allow for stroke connections that do not appear in said database of template characters, and said points are provided to allow for truncated back strokes in said input script;

(g) for each candidate template character, performing a stroke correspondence for each stroke correspondence rule contained therein until all the stroke correspondence rules contained in said template character are exhausted, so as to identify all fore stroke→fore stroke correspondence;

(h) performing stroke matchings in accordance with an input stroke order to find other strokes correspondences including: back→point, back→fore, fore→null, null→fore, back→null, and null→back; and (i) performing computation of discrimination functions to find a template character with a minimum distance.

2. A stroke-order-free and stroke-number-free method for the on-line recognition of Chinese characters according to claim 1 which further comprises the steps of recording the stroke order of said input script and rearranging the stroke order provided of said template character according to said stroke order of said input script.

3. A stroke-order-free and stroke-number-free method for the on-line recognition of Chinese characters according to claim 1 wherein each of said stroke correspondence rules comprises:

(a) basic stroke types that are allowed in said input script; and (2) at least one geometric feature measure associated with said stroke.

4. A stroke-order-free and stroke-number-free method for the on-line recognition of Chinese characters according to claim 3 wherein said geometric feature measure is an x-coordinate y-coordinate, length, or distance, associated with said stroke.

5. A stroke-order-free and stroke-number-free method for the on-line recognition of Chinese characters according to claim 1 which allows stroke correspondences of: (a) fore→fore, (2) back→back, (3) back→fore, (4) back→point, (5) back→null, (6) null→back, (7) fore→null, and (8) null→fore.

6. A stroke-order-free and stroke-number-free method for the on-line recognition of Chinese characters according to claim 1 wherein each of said spatial relationships between strokes of characters consists of four vectors of $ss(i, i+1)$, $se(i, i+1)$, $es(i, i+1)$, and $ee(i, i+1)$, for which s represents the starting point and e represents the end point of strokes i and i+1.

7. An apparatus for on-line recognition of Chinese characters which is constrained by neither the stroke order nor the stroke number of said Chinese character, said apparatus comprising:

(a) memory means for storing a database of template characters, each template character being represented by a set of stroke correspondence rules for describing its constituent basic strokes;

(b) memory means for storing a database of spatial relationships between strokes of characters and memory means for storing a database of character patterns;

(c) means for inputting a handwritten input script on an on-line basis;

(d) means for preprocessing said input script to select candidate template characters for matching against said input script;

(e) means for performing a basic stroke recognition procedure to identify all basic strokes contained in said input script using a database of basic strokes;

(f) means for classifying strokes into fore strokes, back strokes, and points, wherein said fore strokes are strokes that actually appear in the character, said back strokes are fictitious strokes to allow for stroke connections that do not appear in said database of template characters, and said points are provided to allow for truncated back strokes in said input script;

(g) means for performing a stroke correspondence for each and every stroke correspondence rule contained in each candidate template character until all the stroke correspondence rules contained in said template character are exhausted, so as to identify all fore stroke→fore stroke correspondence;

(h) means for performing stroke matchings in accordance with an input stroke order to find other strokes correspondences including: back→point, back→fore, fore→null, null→fore, back→null, and null→back; and (i) means for performing computation of discrimination functions to find a template character with a minimum distance.

8. An apparatus for on-line recognition of Chinese characters according to claim 7 which further comprises means for recording the stroke order of said input script and means for rearranging the stroke order provided of said template character according to said stroke order of said input script.

9. An apparatus for on-line recognition of Chinese characters according to claim 7 wherein each of said stroke correspondence rules comprises:

(a) basic stroke types that are allowed in said input script; and (2) at least one geometric feature measure associated with said stroke.

10. An apparatus for on-line recognition of Chinese characters according to claim 9 wherein said geometric feature measure is an x-coordinate y-coordinate, length, or distance, associated with said stroke.

11. An apparatus for on-line recognition of Chinese characters according to claim 7 which allows stroke correspondences of: (a) fore→fore, (2) back→back, (3) back→fore, (4) back→point, (5) back→null, (6) null→back, (7) fore→null, and (8) null→fore.

12. An apparatus for on-line recognition of Chinese characters according to claim 7 wherein each of said spatial relationships between strokes of characters consists of four vectors of ss(i, i+1), se(i, i+1), es(i, i+1), and ee(i, i+1), for which s represents the starting point and e represents the end point of strokes i and i+1.

13. A computer readable medium having a program for on-line recognition of Chinese characters which is constrained by neither the stroke order nor the stroke number of said Chinese character, said computer program comprising:

(a) code means for storing and retrieving data from a database of template characters, each template character being represented by a set of stroke correspondence rules for describing its constituent basic strokes;

(b) code means for storing and retrieving data from a database of spatial relationships between strokes of characters and a database of character patterns;

(c) code means for inputting a handwritten input script on an on-line basis;

(d) code means for preprocessing said input script to select candidate template characters for matching against said input script;

(e) code means for performing a basic stroke recognition procedure to identify all basic strokes contained in said input script using a database of basic strokes;

(f) code means for classifying said strokes into fore strokes, back strokes, and points, wherein said fore strokes are strokes that actually appear in the character, said back strokes are fictitious strokes to allow for stroke connections that do not appear in said database of template characters, and said points are provided to allow for truncated back strokes in said input script;

(g) code means for performing a stroke correspondence for each and every stroke correspondence rule contained in each candidate template character until all the stroke correspondence rules contained in said template character are exhausted, so as to identify all fore stroke→fore stroke correspondence;

(h) code means for performing stroke matchings in accordance with an input stroke order to find other strokes correspondences including: back→point, back→fore, fore→null, null→fore, back→null, and null→back; and (i) code means for performing computation of discrimination functions to find a template character with a minimum distance.

14. The computer readable medium having a program for on-line recognition of Chinese characters according to claim 13 which further comprises code means for recording the stroke order of said input script and code means for rearranging the stroke order provided of said template character according to said stroke order of said input script.

15. The computer readable medium having a program for on-line recognition of Chinese characters according to claim 13 wherein each of said stroke correspondence rules comprises:

(a) basic stroke types that are allowed in said input script; and (b) at least one geometric feature measure associated with said stroke.

16. The computer readable medium having a program for on-line recognition of Chinese characters according to claim 15 wherein said geometric feature measure is an x-coordinate y-coordinate, length, or distance, associated with said stroke.

17. The computer readable medium having a program for on-line recognition of Chinese characters according to claim 13 which allows stroke correspondences of: (a) fore→fore, (2) back→back, (3) back→fore, (4) back→point, (5) back→null, (6) null→back, (7) fore→null, and (8) null→fore.

18. The computer readable medium having a program for on-line recognition of Chinese characters according to claim 13 wherein each of said spatial relationships between strokes of characters consists of four vectors of ss(i, i+1), se(i, i+1), es(i, i+1), and ee(i, i+1), for which s represents the starting point and e represents the end point of strokes i and i+1.

* * * * *